United States Patent
Ahuja et al.

(10) Patent No.: US 9,306,881 B1
(45) Date of Patent: Apr. 5, 2016

(54) METHODS AND SYSTEMS FOR OBSCURING TEXT IN A CONVERSATION

(71) Applicant: Glu Mobile, Inc., San Francisco, CA (US)

(72) Inventors: Sourabh Ahuja, San Francisco, CA (US); Liang Wu, San Francisco, CA (US); Michael Andrew Mok, San Francisco, CA (US)

(73) Assignee: Glu Mobile Inc., San Francisco, CA (US)

( * ) Notice: Subject to any disclaimer, the term of this patent is extended or adjusted under 35 U.S.C. 154(b) by 0 days.

(21) Appl. No.: 14/497,242

(22) Filed: Sep. 25, 2014

(51) Int. Cl.
| | | |
|---|---|---|
| *G06F 3/048* | (2013.01) | |
| *H04L 12/58* | (2006.01) | |
| *G06F 3/0481* | (2013.01) | |
| *G06F 3/0485* | (2013.01) | |
| *G06F 3/0488* | (2013.01) | |

(52) U.S. Cl.
CPC ............ *H04L 51/046* (2013.01); *G06F 3/0481* (2013.01); *G06F 3/0485* (2013.01); *G06F 3/0488* (2013.01)

(58) Field of Classification Search
CPC .................................. G06F 21/60; G06F 21/10
USPC ......................................................... 715/753
See application file for complete search history.

(56) References Cited

U.S. PATENT DOCUMENTS

| | | | | |
|---|---|---|---|---|
| 5,388,194 | A * | 2/1995 | Vogel ............................. | 715/235 |
| 2003/0038820 | A1* | 2/2003 | Purpura ......................... | 345/629 |
| 2007/0209021 | A1* | 9/2007 | Chien et al. ................... | 715/808 |
| 2007/0299925 | A1* | 12/2007 | Kirkland ........................ | 709/206 |
| 2009/0315895 | A1* | 12/2009 | Pahud et al. ................... | 345/473 |
| 2014/0181634 | A1* | 6/2014 | Compain et al. .............. | 715/234 |
| 2014/0201844 | A1* | 7/2014 | Buck .............................. | 726/26 |

OTHER PUBLICATIONS

"Ciper Machine" Published at http://web.archive.org/web/20120205020527/http://ciphermachines.com/codes on Feb. 15, 2012.*

Chris Smith, This app will let you delete all your drunk texts once you sober up, http://bgr.com/2014/07/25/wiper-ios-and-android-messaging-app/, Jul. 25, 2014, 1, BGR Media, LLC.

Steven Tweedie, If You've Ever Wanted to Erase Your Texts from Someone Else's Phone, Then You Should Try Wiper, http://www.businessinsider.com/wiper-app-completely-erase-conversations-2014-7, Jul. 24, 2014, 1, Business Insider Inc.

Wiper Inc., "Wiper is fun, fast music sharing with private texting and calling", p. 1-5, Last Accessed: Aug. 22, 2014, https://gowiper.com/.

Wiper Inc.,"Inviting and Connecting to Friends", p. 1-9, Last Accessed: Aug. 22, 2014, https://gowiper.com/faq/.

(Continued)

*Primary Examiner* — Peiyong Weng
(74) *Attorney, Agent, or Firm* — Morgan, Lewis & Bockius LLP

(57) ABSTRACT

A method at a first electronic device with a display and an input device includes: receiving a message from a second electronic device, the message comprising a first text and a text effect applied to the message; displaying a first representation of the message in accordance with the text effect; receiving a user input with respect to the first representation; and in response to the user input with respect to the first representation, displaying a second representation of the message in accordance with the text effect.

17 Claims, 49 Drawing Sheets

(56) References Cited

OTHER PUBLICATIONS

Apple Inc., "Wiper Meesenger: Share YouTube Videos", p. 1-2, Last Accessed: Aug. 22, 2014, https://itunes.apple.com/us/app/wiper-messenger/id828356683?Is=1&mt=8.

Google, "Wiper Messenger: Share YouTube", p. 1-2, Last Accessed: Aug. 25, 2014, https://play.google.com/store/apps/details?id=com.gowiper.android.

Confide, "Your Off-the-Record Messenger," 2014, located at https://web.archive.org/web/20140919052648/https:/getconfide.com/, accessed on Dec. 18, 2015, 2 pages.

Confide, "Your Off-The-Record Messenger," 2015, located at https://getconfide.com/, accessed on Dec. 18, 2015, 6 pages.

Lawler, R., "Confide Raises $1.9 Million in Seed Funding to Bring Disappearing Messages to Enterprise Users," Feb. 4, 2014, located at http://techcrunch.com/2014/02/04/confide-1-9m/, accessed on Dec. 18, 2015, 4 pages.

Ovide, S., "Capitalizing on the Sony Hack, a Secret Messaging App is Pitching Hollywood," *The Wall Street Journal,* Dec. 23, 2014, located at http://blogs.wsj.com/digits/2014/12/23/capitalizing-on-sony-hack-secret-messaging-app-pitches-hollywood/tab/print/, accessed on Dec. 18, 2015, 3 pages.

Reisinger, D., "App maker pitches self-destruct messaging to Hollywood," Dec. 23, 2014, located at http://www.cnet.com/news/confide-targets-sony-pictures-celebs-in-new-pitch-to-hollywood/, accessed on Dec. 18, 2015, 3 pages.

\* cited by examiner

METHODS AND SYSTEMS FOR OBSCURING TEXT IN A CONVERSATION

TECHNICAL FIELD

The present application generally describes messaging, and more particularly obscuring text in a message conversation.

BACKGROUND

With the growth of the Internet and wireless communication technologies, mobile messaging, such as texting and instant messaging (e.g., chatting) have become a ubiquitous form of communication. As mobile messaging has grown, new features have been developed to enhance the messaging experience. For example, users can send emoji, share photos and videos, send an audio message, and/or send a virtual sticker. However, these experience-enhancing features have mostly left the body text of the messages undisturbed. Features targeted to the message body text opens up new avenues of enhancement and refreshment of the messaging experience.

SUMMARY

In accordance with some implementations, a method is performed at a first electronic device with a display and an input device. The method includes: receiving a message from a second electronic device, the message including a first text and a text effect applied to the message; displaying a first representation of the message in accordance with the text effect; receiving a user input with respect to the first representation; and in response to the user input with respect to the first representation, displaying a second representation of the message in accordance with the text effect.

In accordance with some implementations, a method is performed at a first electronic device with a display and an input device. The method includes: receiving user selection of a text effect; receiving user input of a message, including a text of the message; sending the message to a second electronic device; displaying a first representation of the message in accordance with the text effect; receiving a user input with respect to the first representation; and in response to the user input with respect to the first representation, displaying a second representation of the message in accordance with the text effect.

In accordance with some implementations, an electronic device includes a display, an input device, one or more processors, memory, and one or more programs. The one or more programs are stored in the memory and configured to be executed by the one or more processors. The one or more programs include instructions for performing the operations of any of the methods described above. In accordance with some implementations, a graphical user interface on an electronic device with a display, an input device, a memory, and one or more processors to execute one or more programs stored in the memory includes one or more of the elements displayed in any of the methods described herein, which are updated in response to inputs, as described in any of the methods described herein. In accordance with some implementations, a computer readable storage medium has stored therein instructions, which, when executed by an electronic device with a display, an input device, and one or more processors, cause the device to perform the operations of any of the methods described above. In accordance with some implementations, an electronic device includes a display, an input device, and means for performing the operations of any of the methods described above.

BRIEF DESCRIPTION OF THE DRAWINGS

FIG. 4A, FIG. 4B, FIG. 4C, FIG. 4D, FIG. 4E, FIG. 4F, FIG. 4G, FIG. 4H, FIG. 4I, FIG. 4J, FIG. 4K, FIG. 4L, FIG. 4M, FIG. 4N, FIG. 4O, FIG. 4P, FIG. 4Q, FIG. 4R, FIG. 4S, FIG. 4T, FIG. 4U, FIG. 4V, FIG. 4W, FIG. 4X, FIG. 4Y, FIG. 4Z, FIG. 4AA, FIG. 4BB, FIG. 4CC, FIG. 4DD, FIG. 4EE, FIG. 4FF, FIG. 4GG, FIG. 4HH FIG. 4II, FIG. 4JJ, FIG. 4KK, FIG. 4LL, FIG. 4MM, FIG. 4NN, FIG. 4OO, and FIG. 4PP illustrate example user interfaces in accordance with some implementations.

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
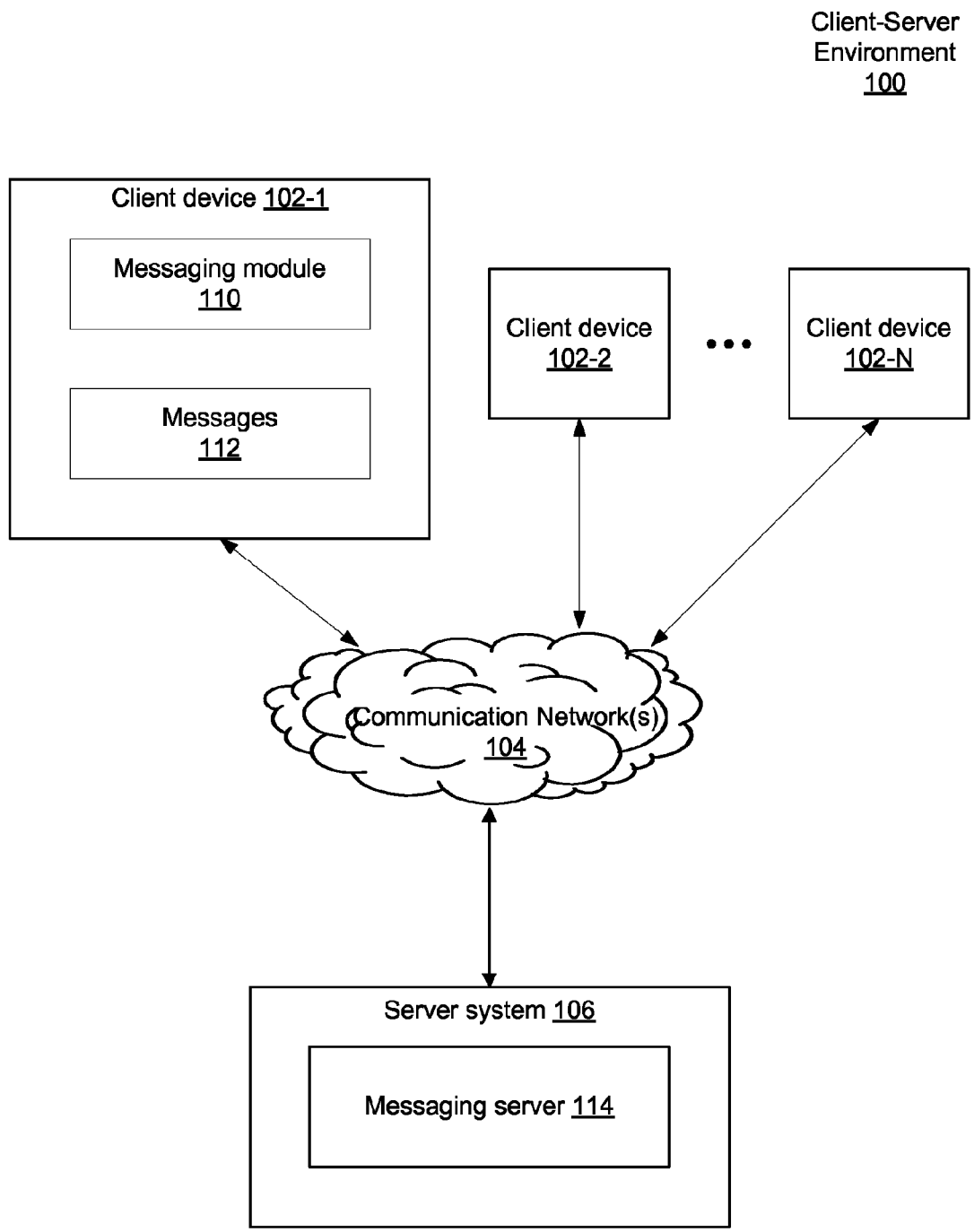
FIG. 1 is a diagram illustrating a client-server system in accordance with some implementations.

FIG. 1 illustrates a client-server environment 100 in accordance with some implementations. The client-server environment 100 includes multiple client devices 102 and a server system 106. The client devices 102 and server system 106 are communicatively coupled by one or more communication networks 104.

In some implementations, the client-server environment 100 is a messaging environment, in which client devices 102 can send messages (e.g., chat messages, text messages, instant messaging messages, email messages) to each other through the server system 106. A message includes one or more of: text, hyperlinks, emoji, virtual stickers, image(s), audio, and video. The server system 106 operates a messaging service that facilitates the sending and receiving of messages by the client devices 102.

The communication network(s) 104 can be any wired or wireless local area network (LAN) and/or wide area network (WAN), such as an intranet, an extranet, or the Internet. It is sufficient that the communication network 104 provides communication capability between the client devices 102, the server system 106, and optional other devices and systems. In some implementations, the communication network(s) 104 uses the HyperText Transport Protocol (HTTP) to transport information using the Transmission Control Protocol/Internet Protocol (TCP/IP). HTTP permits client devices 102 to access various resources available via the communication network(s) 104. The various implementations described herein, however, are not limited to the use of any particular protocol.

The client-server environment includes multiple client devices 102 (e.g., clients 102-1 thru 102-N in FIG. 1). A respective client device 102 is any suitable computing device that, in some implementations, is capable of connecting to the communication network(s) 104, receiving from the server system 106 messages originating from other client devices 102, sending to the server system 106 messages intended for other client devices 102, and presenting, managing, and inputting/editing messages. In some implementations, the client device 102 is a smartphone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook computer, a gaming device, a multimedia player device, or any other device that is capable of sending and receiving messages, as well as presenting (e.g., displaying), managing, and inputting/editing messages. In some implementations, the client device 102 includes an image capture device (e.g., a camera).

In some implementations, the client device 102 includes a messaging module 110, and one or more messages 112. The client device 102 stores received and sent messages 112. The client device 102 is configured to, with user input, manage, input/edit, and present the messages 112 using the messaging module 110. The client device 102 is configured to send and receive messages and content to/from other client devices 102 using the messaging module 110. In some implementations, the client device 102 also includes other modules, such as a content sharing module. In some implementations, the messaging module 110 is a client application (e.g., a messaging application).

Messages sent by a client device 102 are sent to the server system 106, which sends the messages to respective destination client devices 102. In some implementations, the server system 106 includes a messaging server 114. The messaging server 114 operates a messaging service in which client devices 102 can send and receive messages to/from each other. The messaging server 114 facilitates connections between client devices 102 for sending and receiving messages, receiving messages from client devices 102, sending the messages and content to destination client devices 102, and maintains user accounts and data with respect to the messaging service. The messaging server 114 also stores, in the server system 106, copies of the messages exchanged by the client devices 102. In some implementations, the servers system 106 operates a social network service, of which the messaging service and the messaging server 114 are parts.

The server system 106 is described herein as a single server computer for sake of convenience and ease of understanding. It should be appreciated, however, that the server system 106 may be implemented as a single server computer or as multiple server computers (e.g., in a distributed server system).

Figure 2:
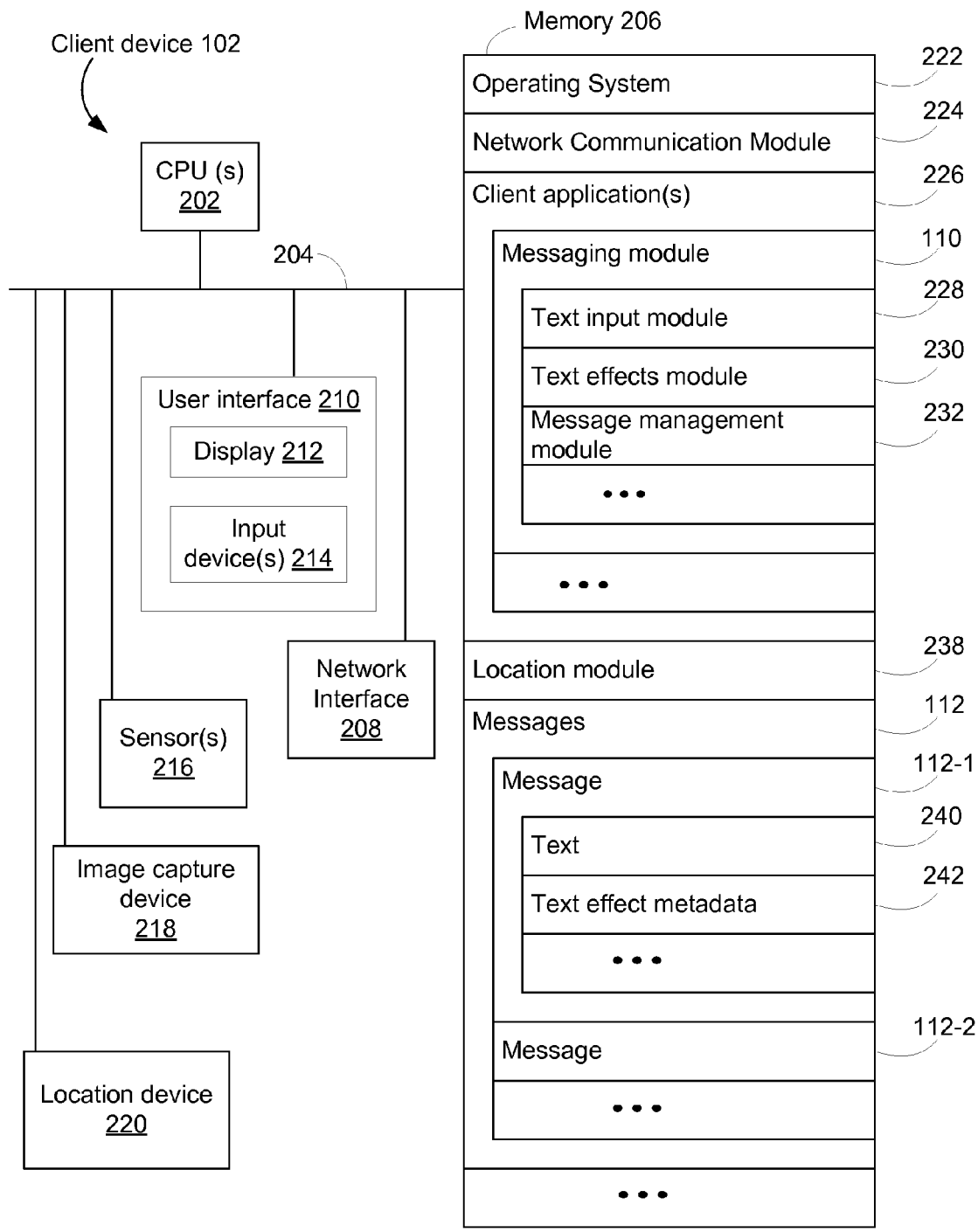
FIG. 2 is a block diagram illustrating a client device in accordance with some implementations.

FIG. 2 is a block diagram illustrating a client device 102 in accordance with some implementations. The client device 102 typically includes one or more processing units (CPU's) 202, one or more network or other communications interfaces 208, memory 206, and one or more communication buses 204, for interconnecting these and other components. The communication buses 204 optionally include circuitry (sometimes called a chipset) that interconnects and controls communications between system components. The client device 102 also includes a user interface 210. The user interface 210 includes a display device 212 and one or more input devices 214.

In some implementations, the display device 212 is integrated with the device (e.g., housed in the same chassis as the CPU and memory, such as with a smartphone or an all-in-one desktop computer). In some other implementations, the display device 212 is separate from other components of the client device 102 (e.g., a separate device from the device that houses the CPUs 202 and memory 206, such as with a desktop computer with a "tower" chassis housing the CPU and memory and a separate display device).

In some implementations, the input device(s) 214 include one or more of: a mouse or similar pointing device, a keyboard, a touch-sensitive surface (e.g., a touch pad, a touch-sensitive display), a joystick, and one or more buttons. In some implementations, the display device 212 is a touch screen (i.e., a touch-sensitive display).

In some implementations, the client device 102 includes additional input devices, such as an audio input device (e.g., a microphone). In some implementations, the client device 102 includes an audio output device (e.g., a speaker, headphones).

In some implementations, the client device 102 also includes one or more of: one or more sensors 216 (e.g., accelerometer, magnetometer, proximity sensor, gyroscope), an image capture device 218 (e.g., a camera device or module and related components), and a location module 220 (e.g., a Global Positioning System (GPS) receiver or other navigation or geolocation device and related components).

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some implementations, memory 206 or the computer readable storage medium of memory 206 store the following programs, modules and data structures, or a subset thereof, including operation system 222, network communication module 224, one or more client applications 226, a location module 238, and messages 112.

The operating system 222 includes procedures for handling various basic system services and for performing hardware dependent tasks, as well as obtaining readings from sensors 216.

The network communication module 224 facilitates communication with other devices and computers (e.g., other client devices 102, server system 106) via the one or more communication network interfaces 208 (wired or wireless) and one or more communication networks 104, such as the Internet, other wide area networks, local area networks, metropolitan area networks, and so on.

The client application(s) 226 perform various operations. In some implementations, the client applications 108 include a messaging module 110. The messaging module 110 is configured to, in conjunction with the messaging service operated by the server system 106, send and receive messages. The messaging module 110 includes a text input module 228, a text effects module 230, and message management module 232. The text input module is configured to present user interfaces (e.g., graphical user interfaces and input fields) for user input of text for a message and user selection of a text effect, and receiving that user input and user selection. The text effects module 230 is configured to apply a text effect to a message, including generating corresponding metadata for the message and displaying the message in accordance with the text effect. The message management module 232 is configured to manage messages 112 in accordance with user direction, including deleting, archiving, and organizing messages 112.

In some implementations, the location module 238 determines the location of the client device 102 (e.g., using GPS or other similar systems, location identification by IP address, etc.).

The client device 102 stores messages 112 (e.g., messages 112-1 and 112-2) sent and received by the messaging module 110. In some implementations, the messages 112 are a time-limited set or number-limited set of the messages (e.g., last one months' worth, last two months worth, last 100 messages for each message conversation with a respective user) sent and received by the client device 102; a complete archive or repository of the messages is stored at the server system 106. For any given message that includes text, such as message 112-1, the message 112-1 includes the message text 240 and text effect metadata 242. The text effect metadata indicates whether a text effect is applied to the message (more particularly, the text 240), and a text effect is applied, which text effect is applied. Further details regarding text effects are described below.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2 shows a client device, FIG. 2 is intended more as functional description of the various features which may be present in a client device than as a structural schematic of the implementations described herein. In practice, and as recognized by those of ordinary skill in the art, items shown separately could be combined and some items could be separated.

Figure 3:
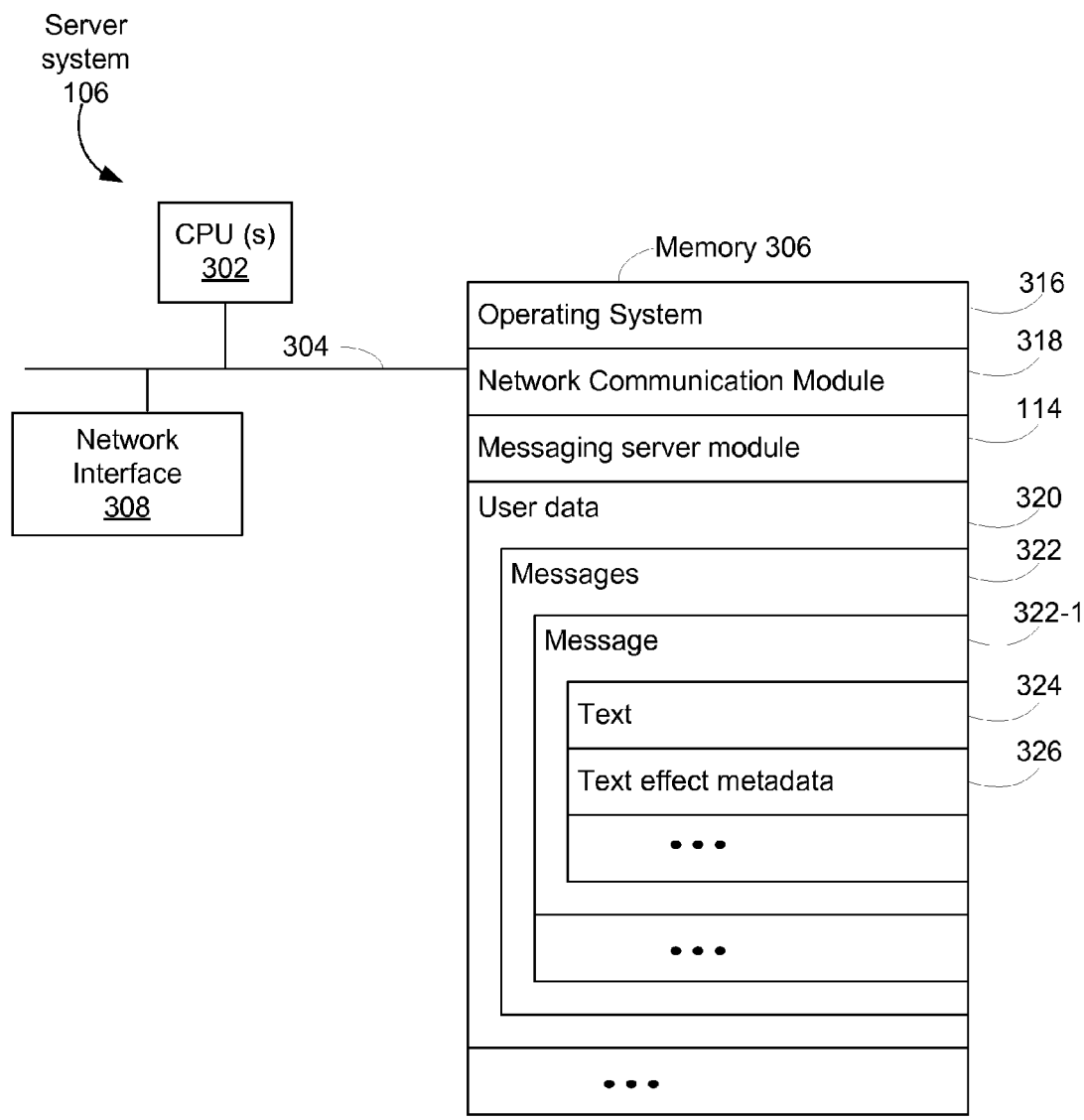
FIG. 3 is a block diagram illustrating a server system in accordance with some implementations.

FIG. 3 is a block diagram illustrating a server system 106, in accordance with some implementations. The server system 106 typically includes one or more processing units (CPU's) 302, one or more network or other communications interfaces 308, memory 306, and one or more communication buses 304 for interconnecting these components. The communication buses 304 optionally include circuitry (sometimes called a chipset) that interconnects and controls communications between system components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, memory 306 includes one or more storage devices remotely located from the CPU(s) 302. Memory 306, including the non-volatile and volatile memory device(s) within memory 306, comprises a non-transitory computer readable storage medium. In some implementations, memory 306 or the non-transitory computer readable storage medium of memory 306 stores the following programs, modules and data structures, or a subset thereof, including an operation system 316, a network communication module 318, a messaging server module 114, and user data 320.

The operating system 316 includes procedures for handling various basic system services and for performing hardware dependent tasks.

The network communication module 318 facilitates communication with other devices and computers (e.g., client devices 102) via the one or more communication network interfaces 308 (wired or wireless) and one or more communication networks 104, such as the Internet, other wide area networks, local area networks, metropolitan area networks, and so on.

The messaging server module 114 operates a messaging service and performs operations related to the messaging service. In some implementations, the messaging server module 114 connects client devices 102, receives messages and content from client devices 102 and sends the messages and content to their destination client devices 102, and manages the user data 320 for the messaging service.

User data 320 is the data associated with the users of the messaging service. User data 320 includes user account and profile information (e.g., username, password) (not shown), and, for each user, messages 322 sent and received by the users. The messages 322 are a complete archive or repository of the messages send and received by the client device 102 using the messaging service. For any given message that includes text, such as message 322-1, the message 322-1 includes the message text 324 (analogous to text 240 of message 112-1) and text effect metadata 326 (analogous to text effect metadata 242 of message 112-1).

Each of the above identified elements may be stored in one or more of the previously mentioned memory devices, and each of the modules or programs corresponds to a set of instructions for performing a function described above. In some embodiments, the set of instructions is executed by one or more processors (e.g., the CPUs 302). The above identified modules or programs need not be implemented as separate software programs, procedures or modules, and thus, in some implementations, various subsets of these modules is combined or otherwise re-arranged. In some implementations, memory 306 stores a subset of the modules and data structures identified above. Furthermore, in some embodiments, memory 306 stores additional modules and data structures not described above.

Although FIG. 3 shows a server system, FIG. 3 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 316 and network communication module 318) shown separately in FIG. 3 could be implemented on single servers and single items could be implemented by one or more servers. The actual number of servers used to implement the server system 106 and how features are allocated among them will vary from one implementation to another, and, in some instances, depends in part on the amount of data traffic that the system must handle during peak usage periods as well as during average usage periods.

Figure 4A:
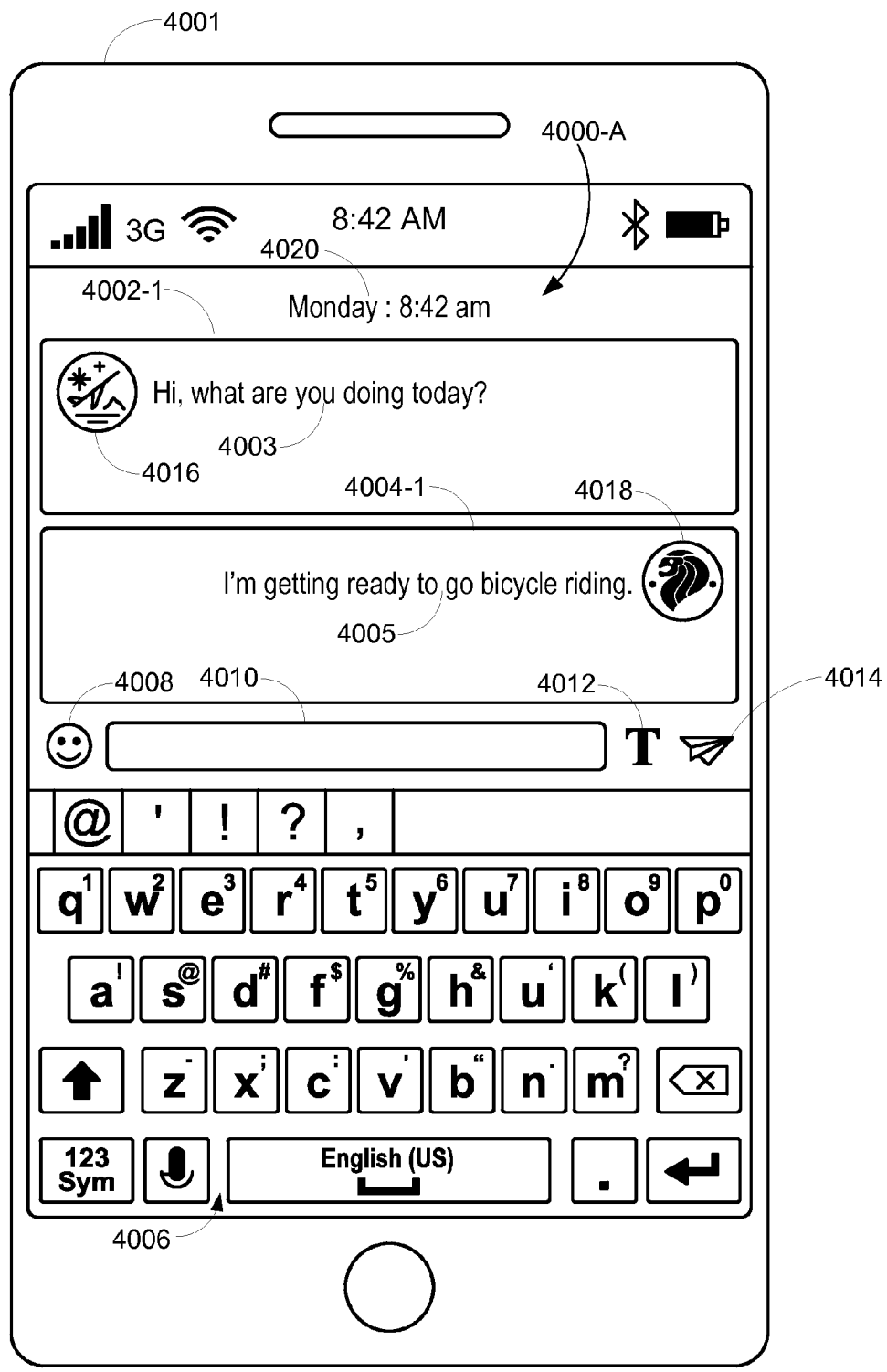
Figure 4B:
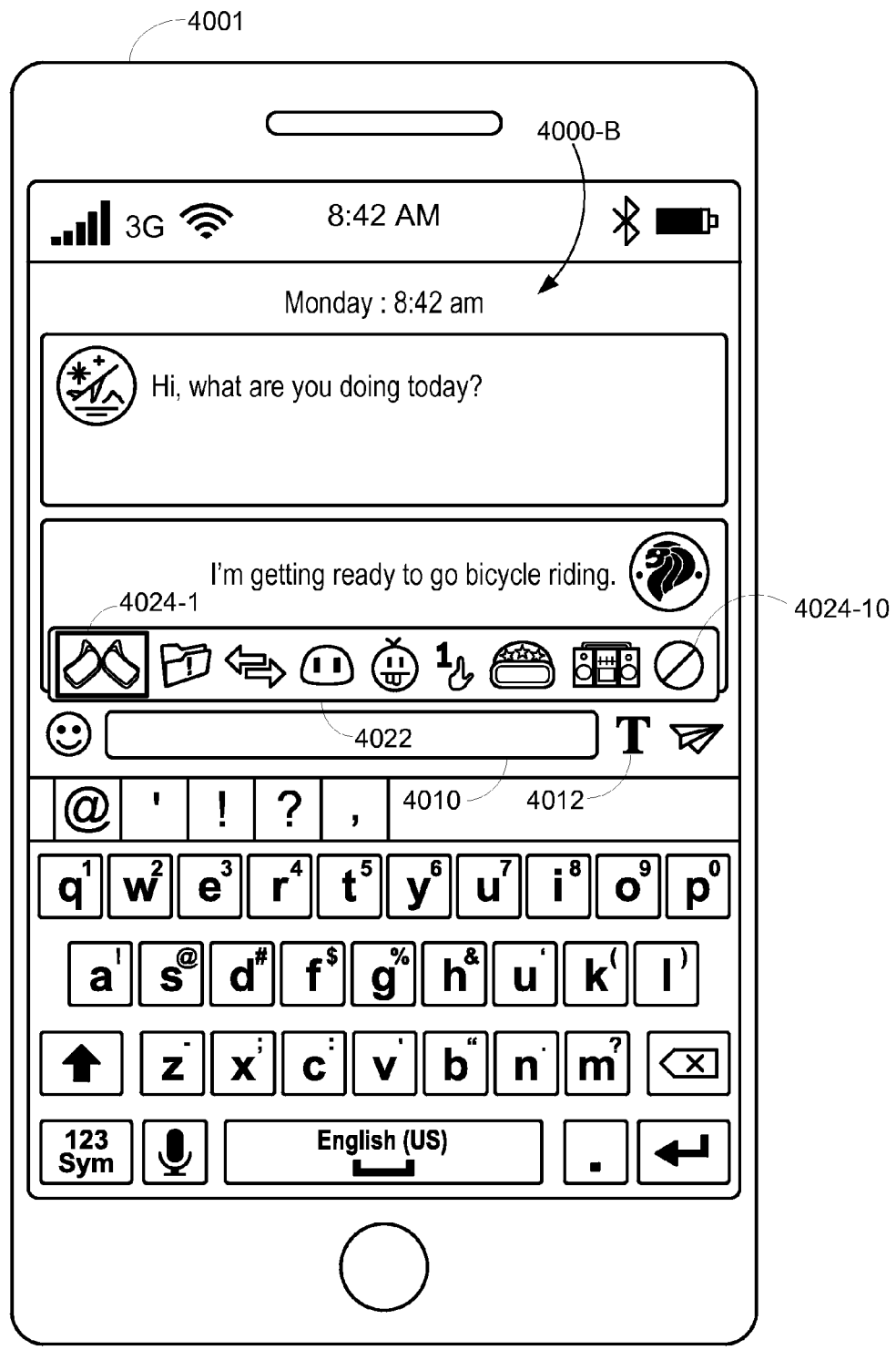
Figure 4C:
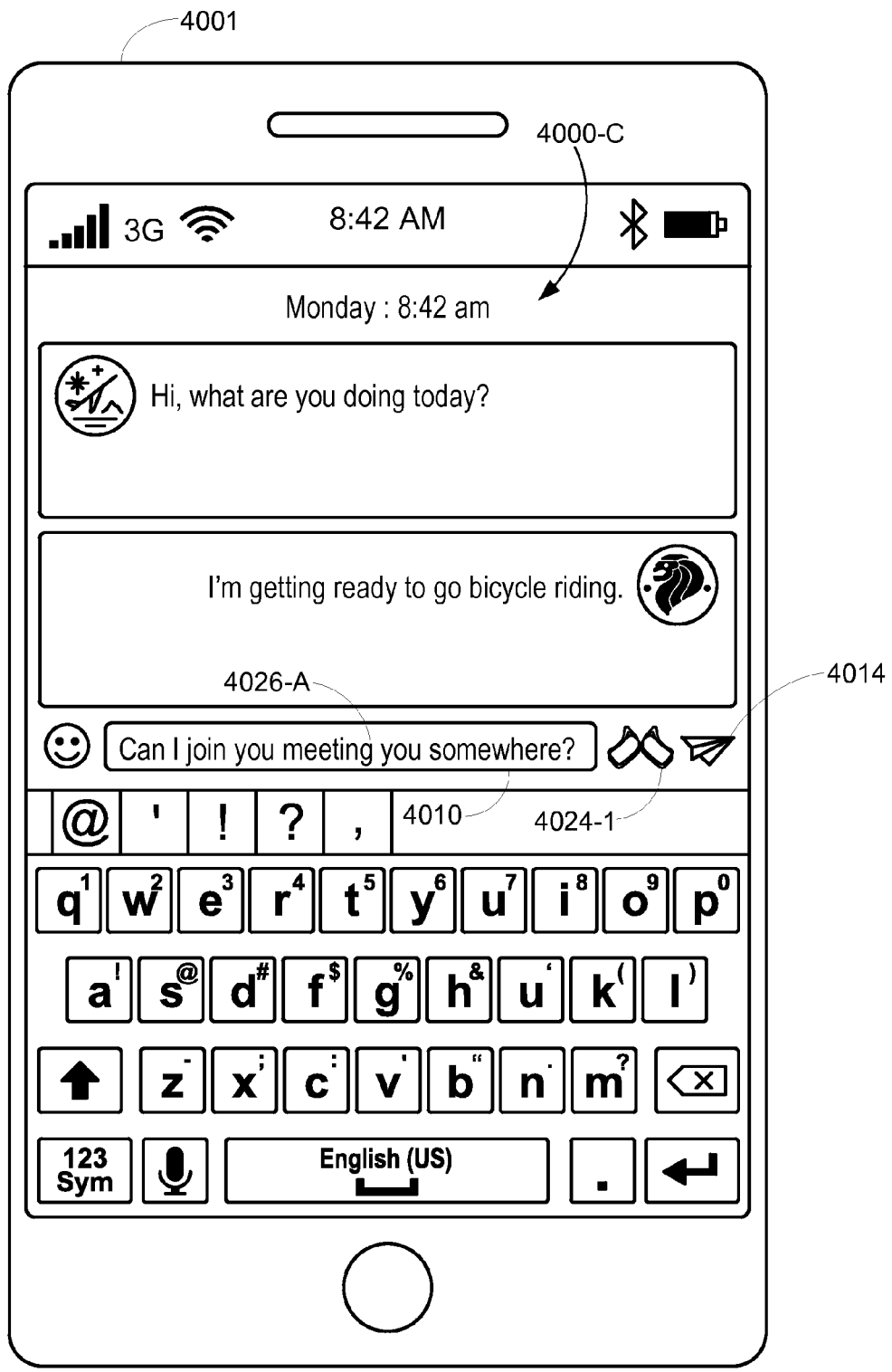
Figure 4D:
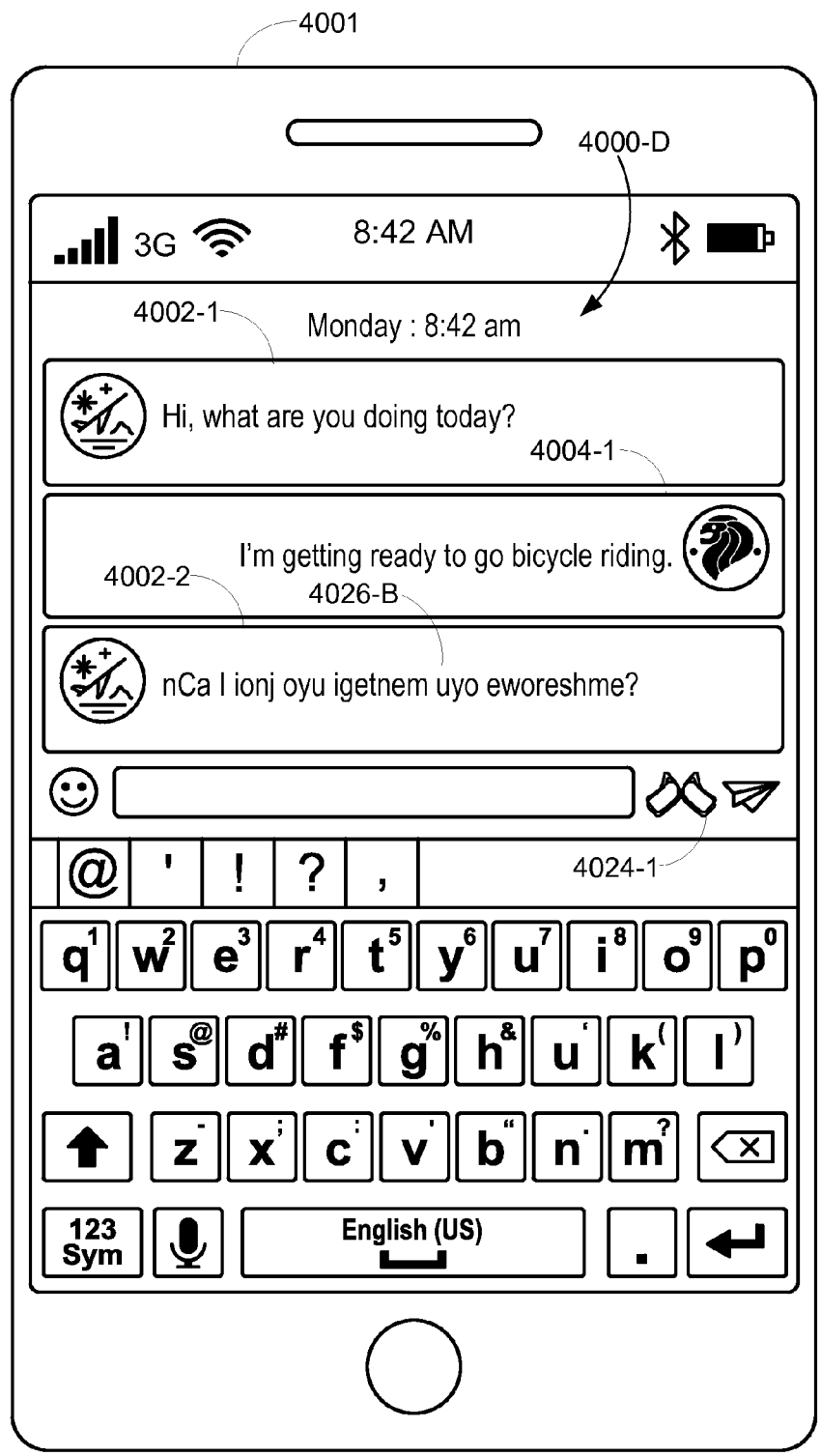
Figure 4E:
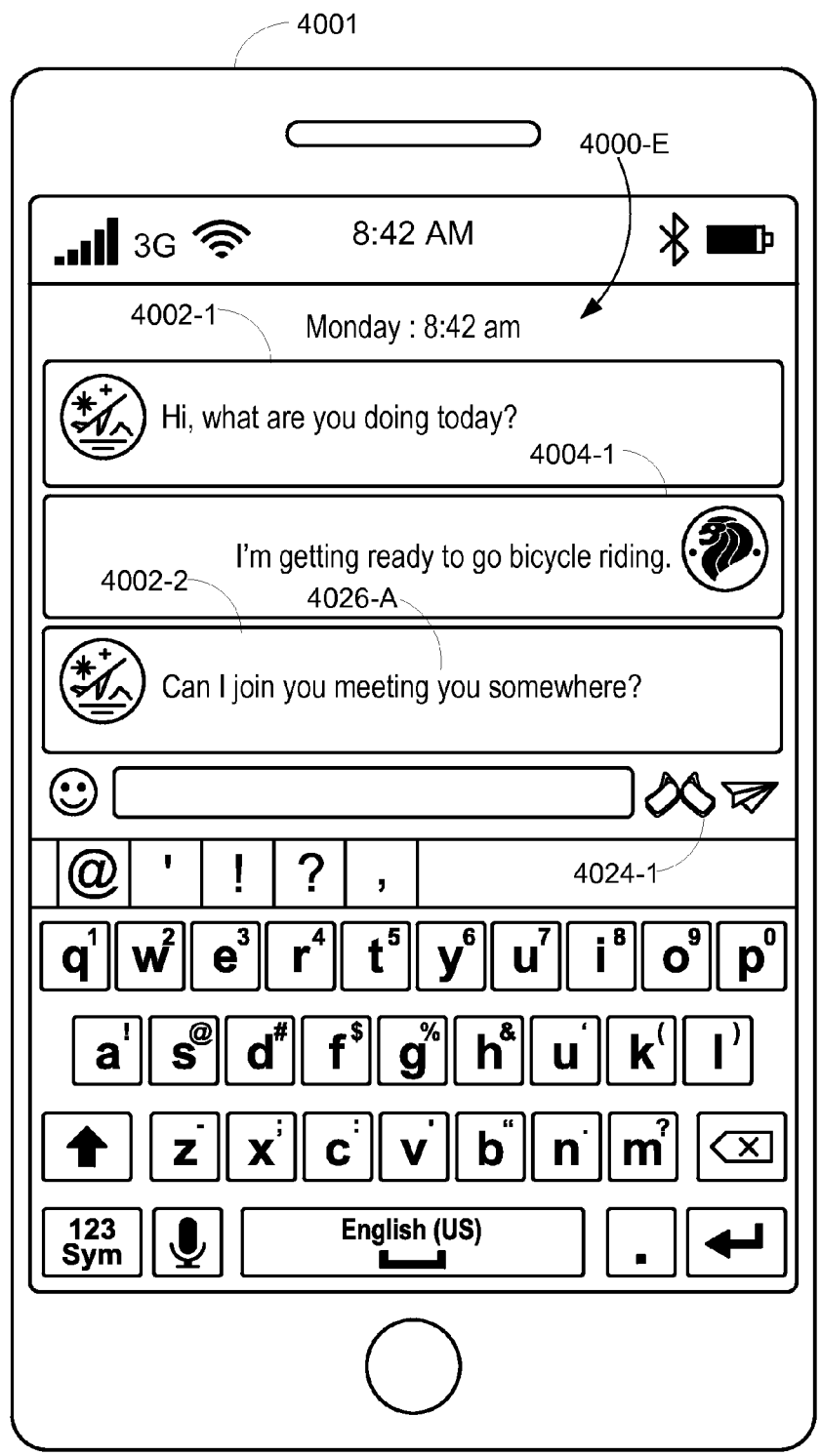
Figure 4F:
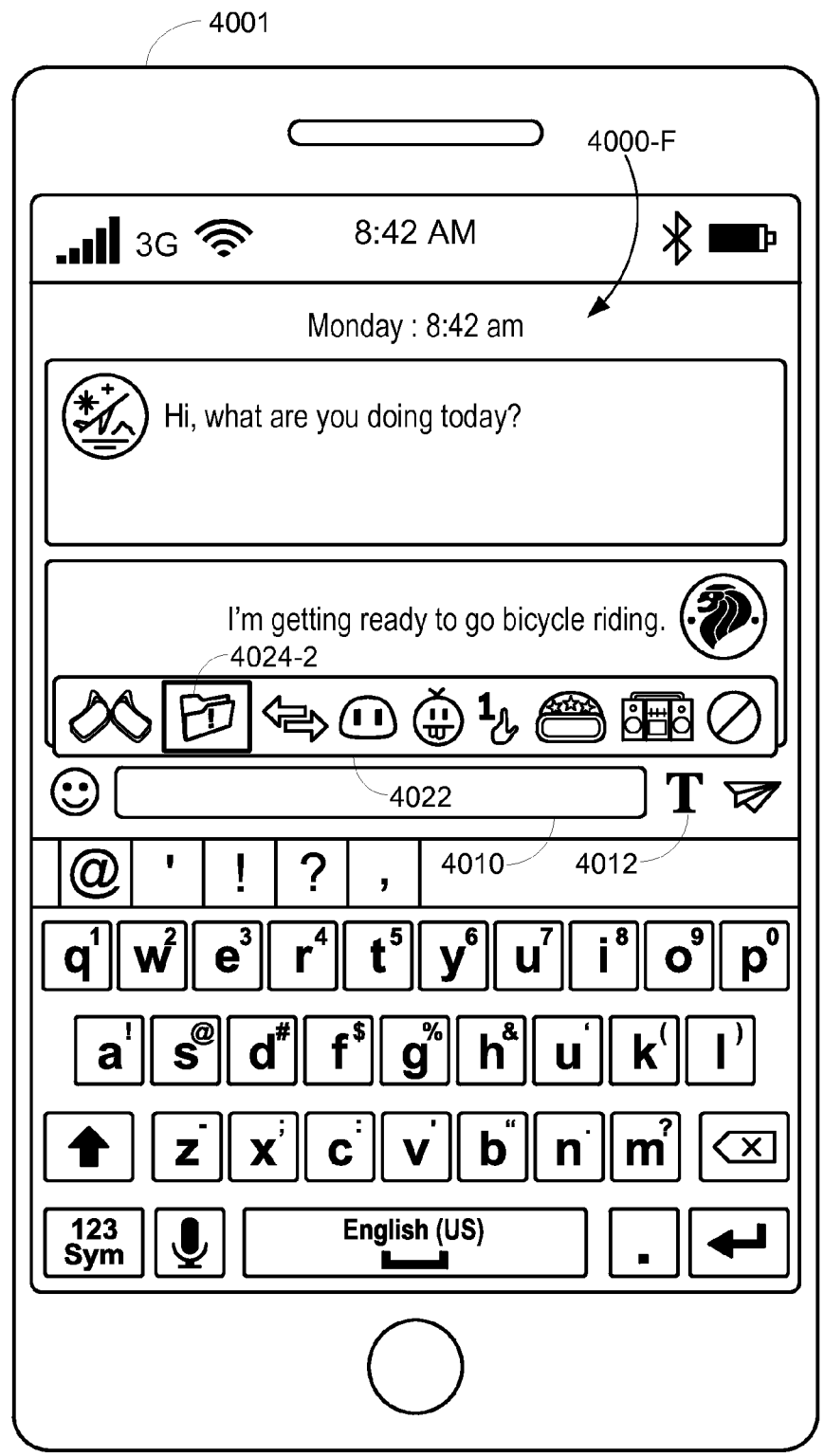
Figure 4G:
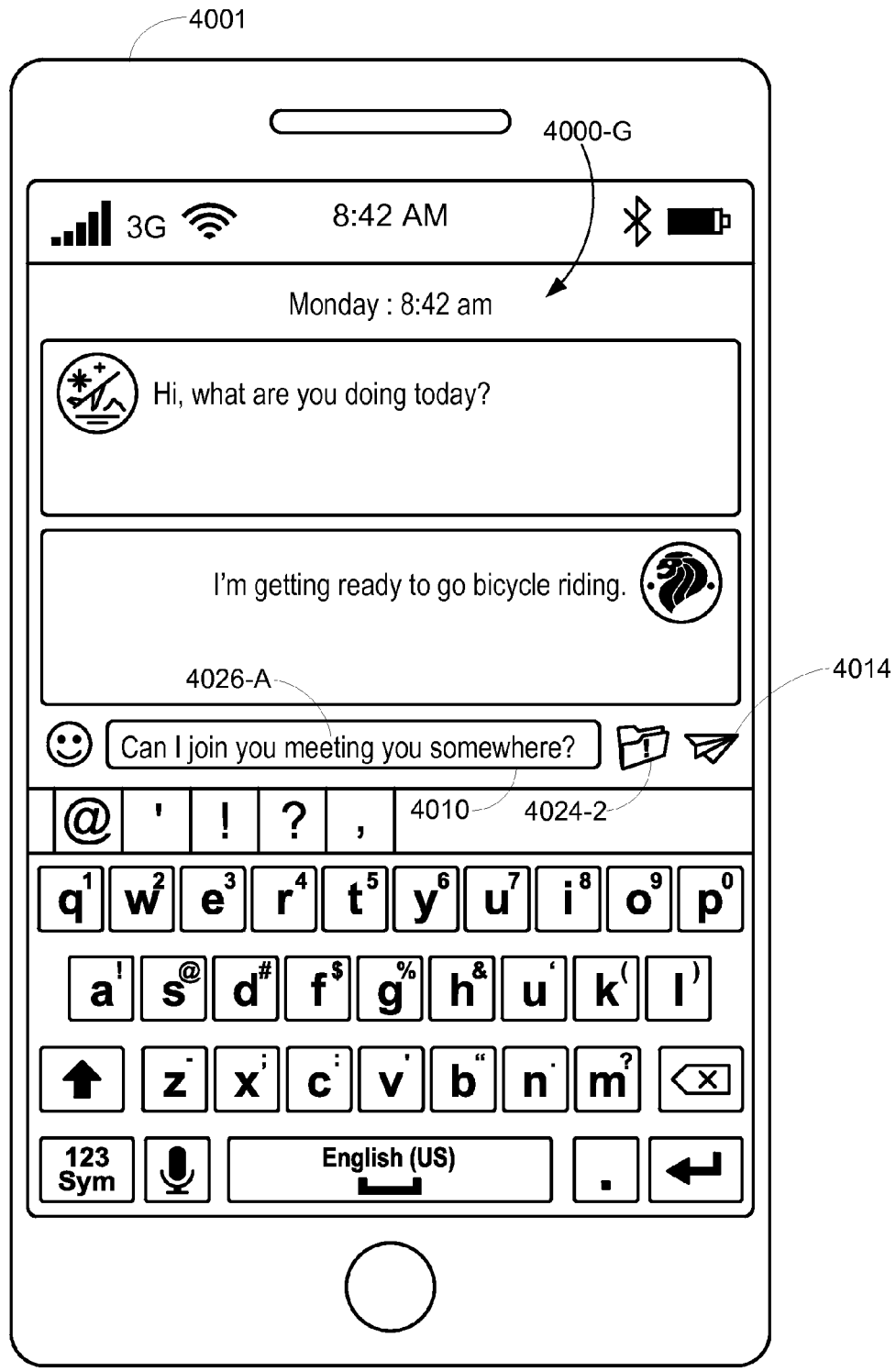
Figure 4H:
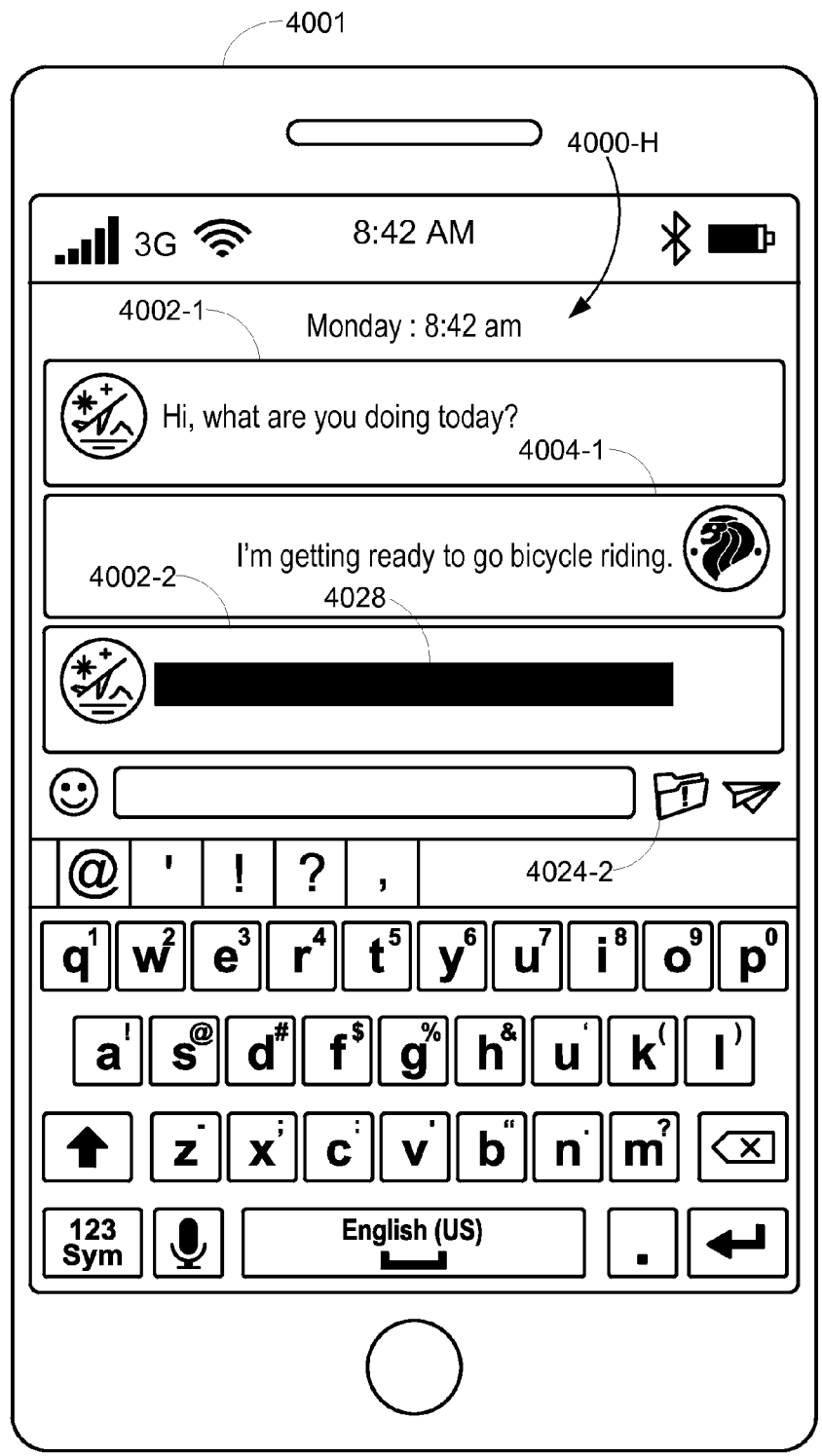
Figure 4I:
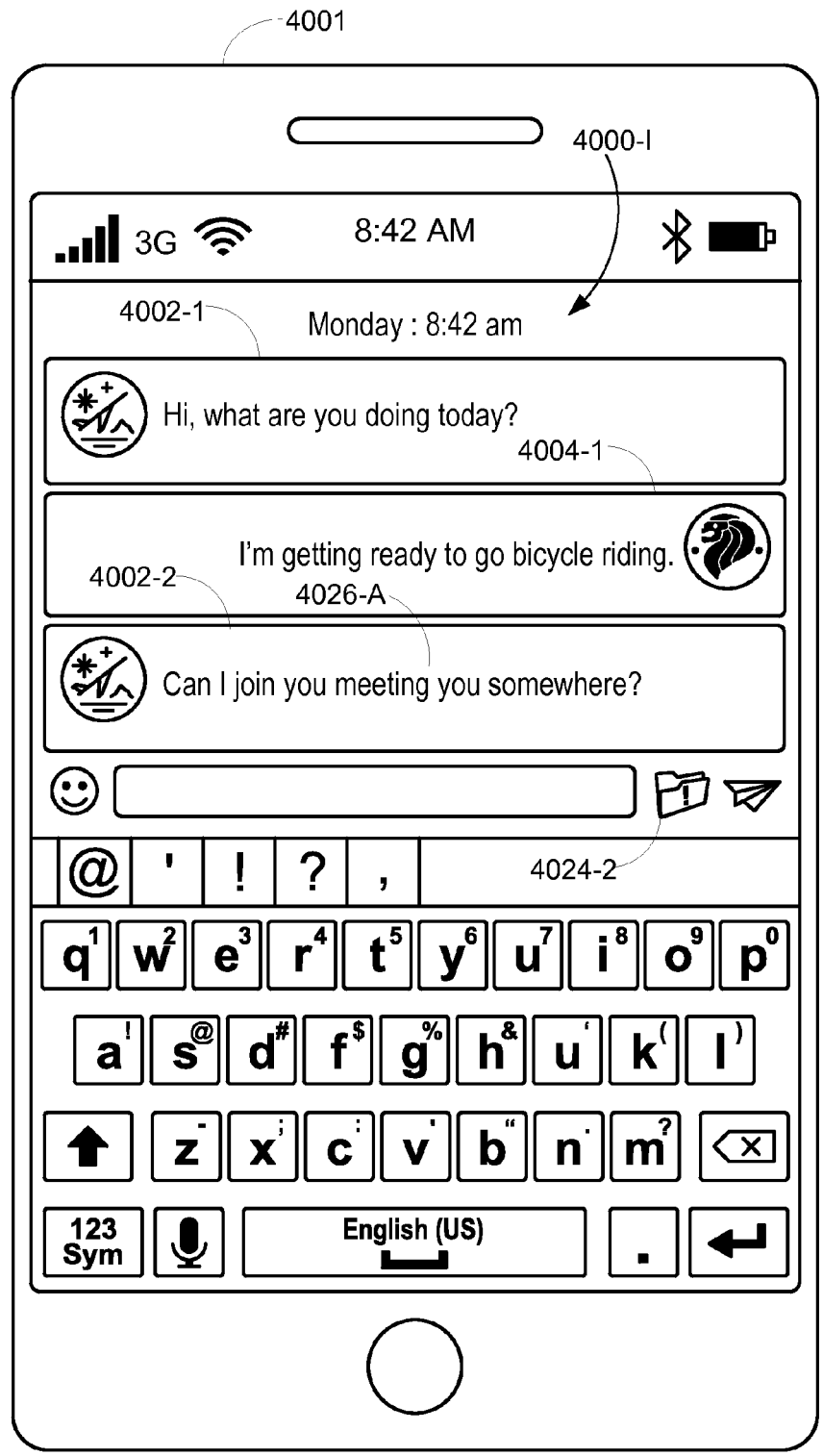
Figure 4J:
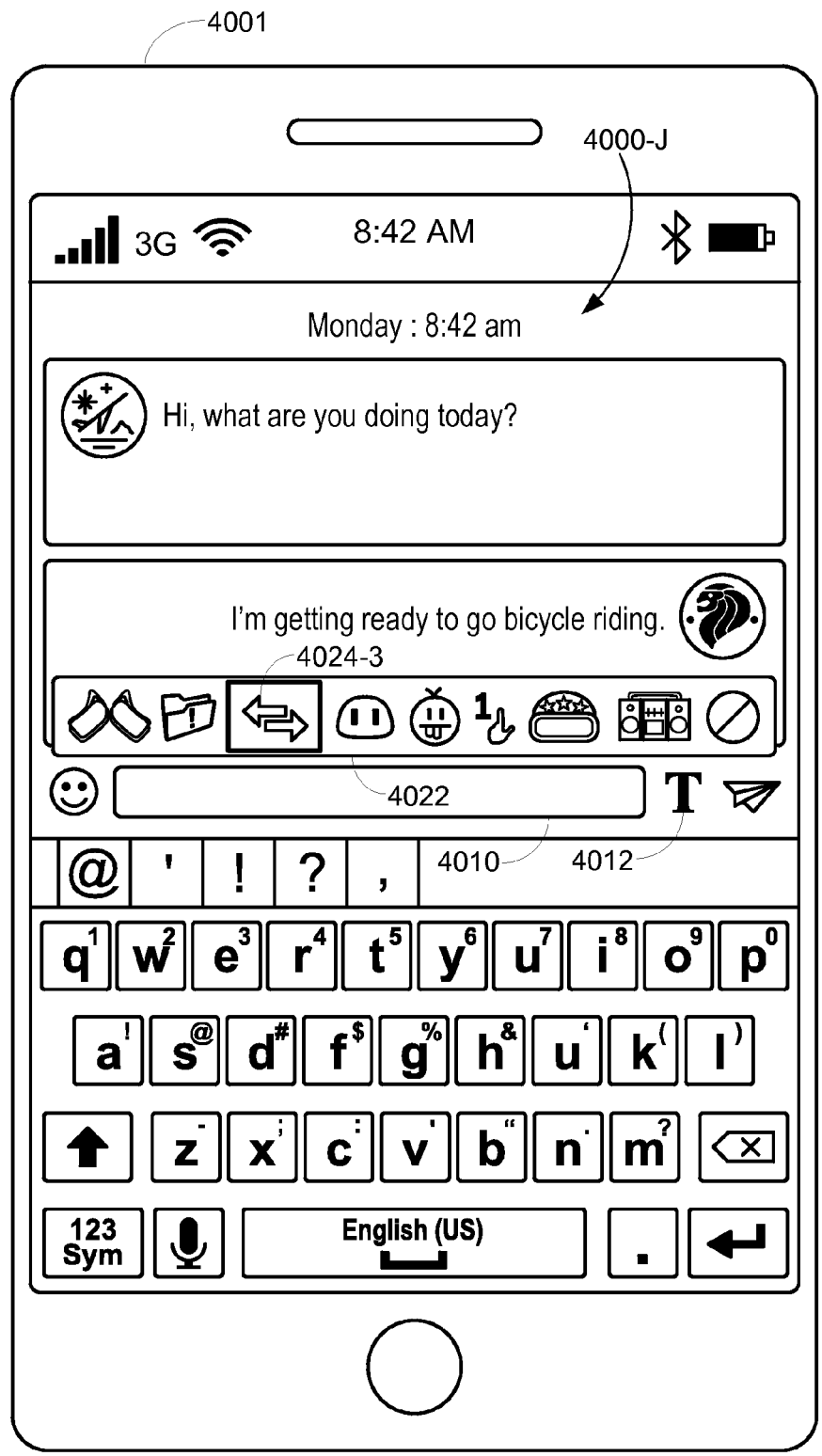
Figure 4K:
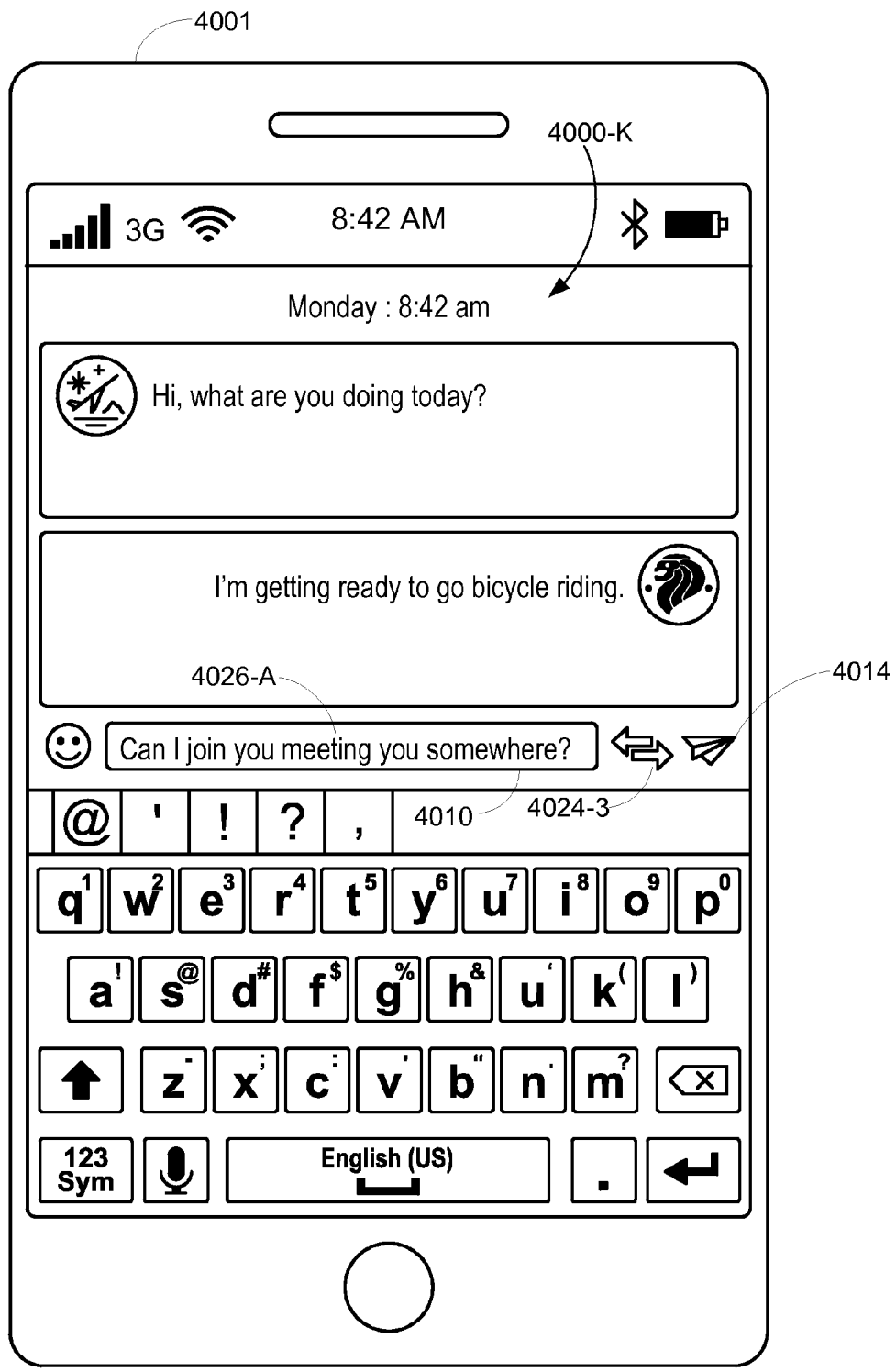
Figure 4L:
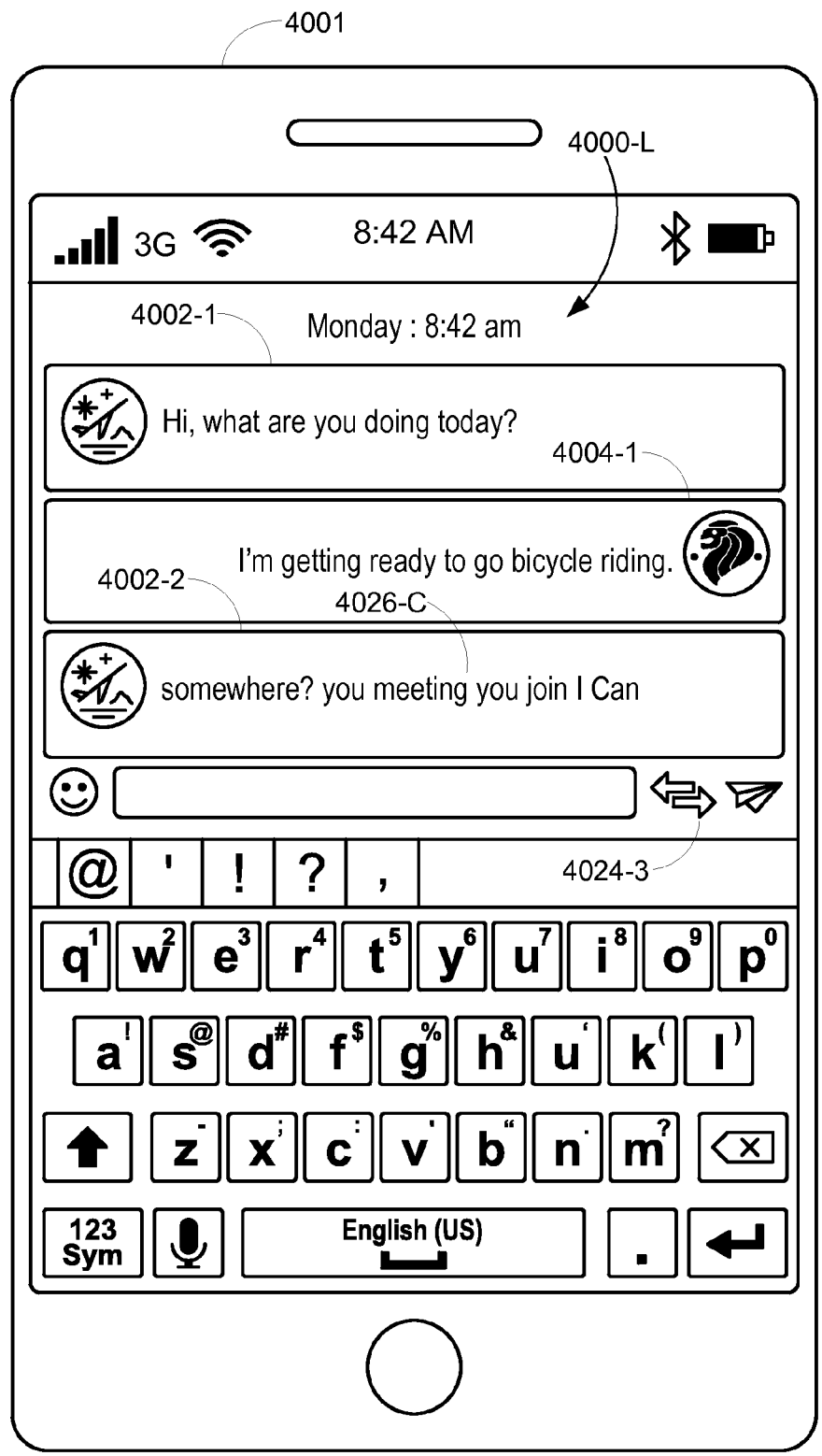
Figure 4M:
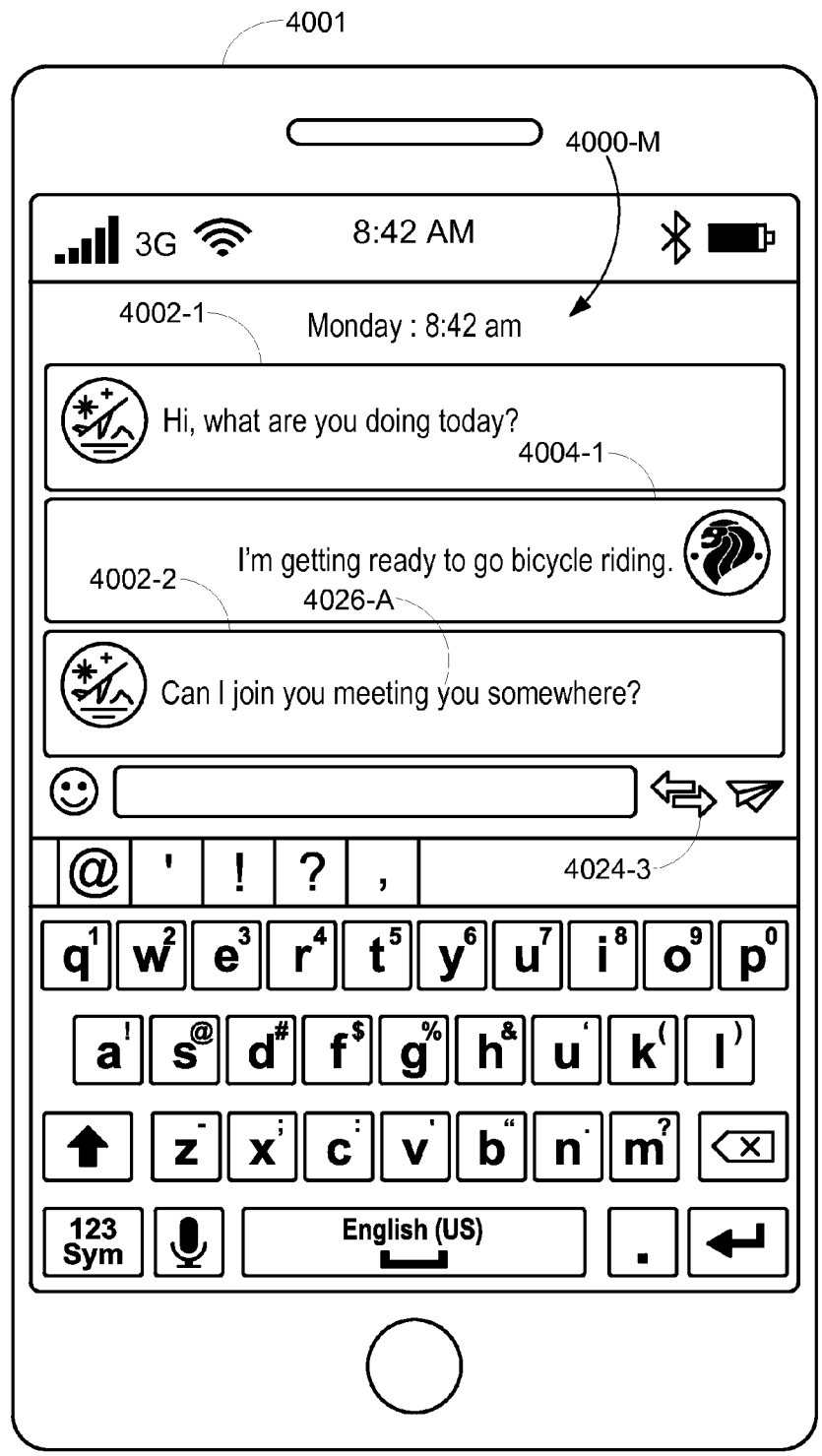
Figure 4N:
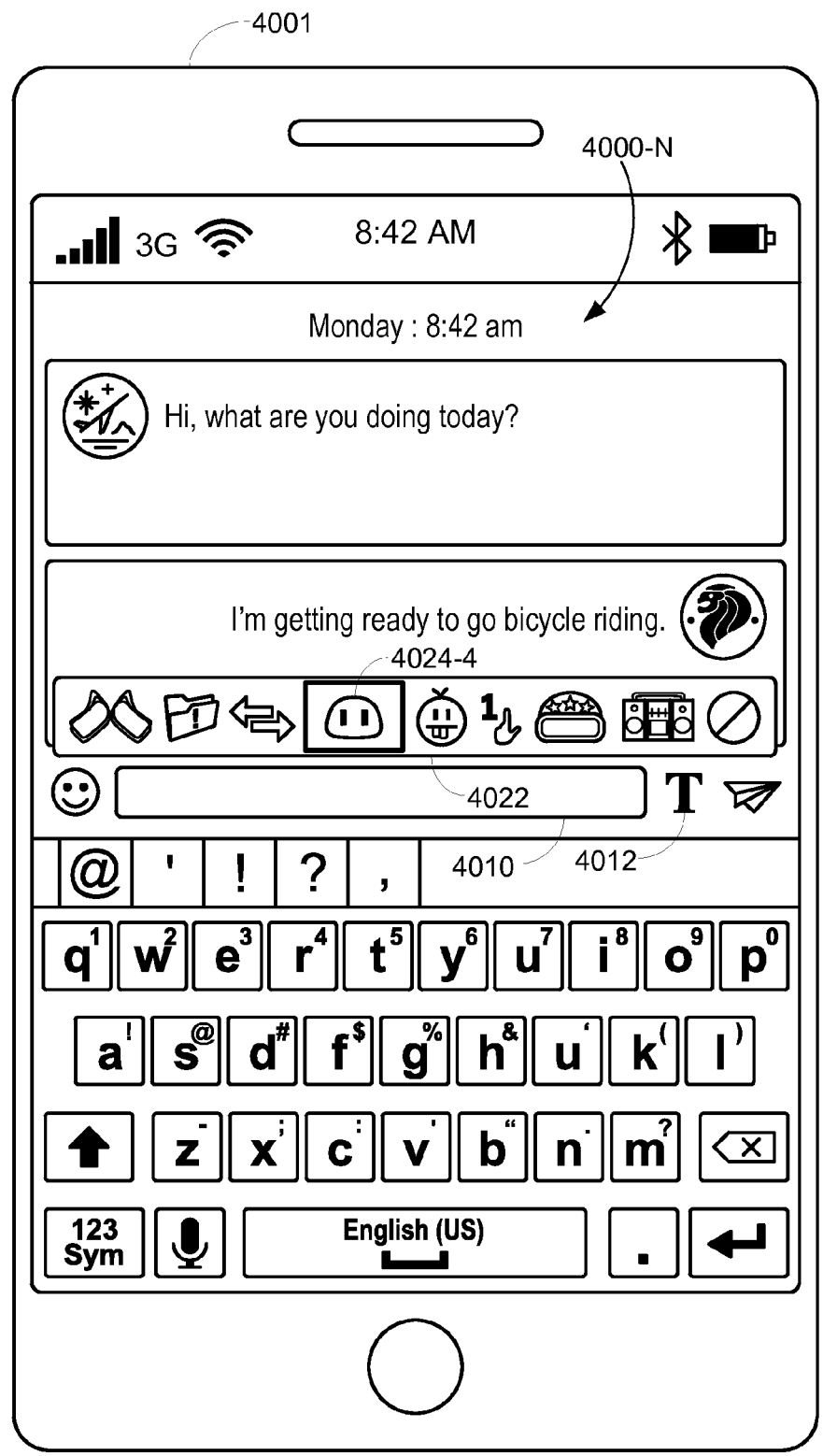
Figure 4O:
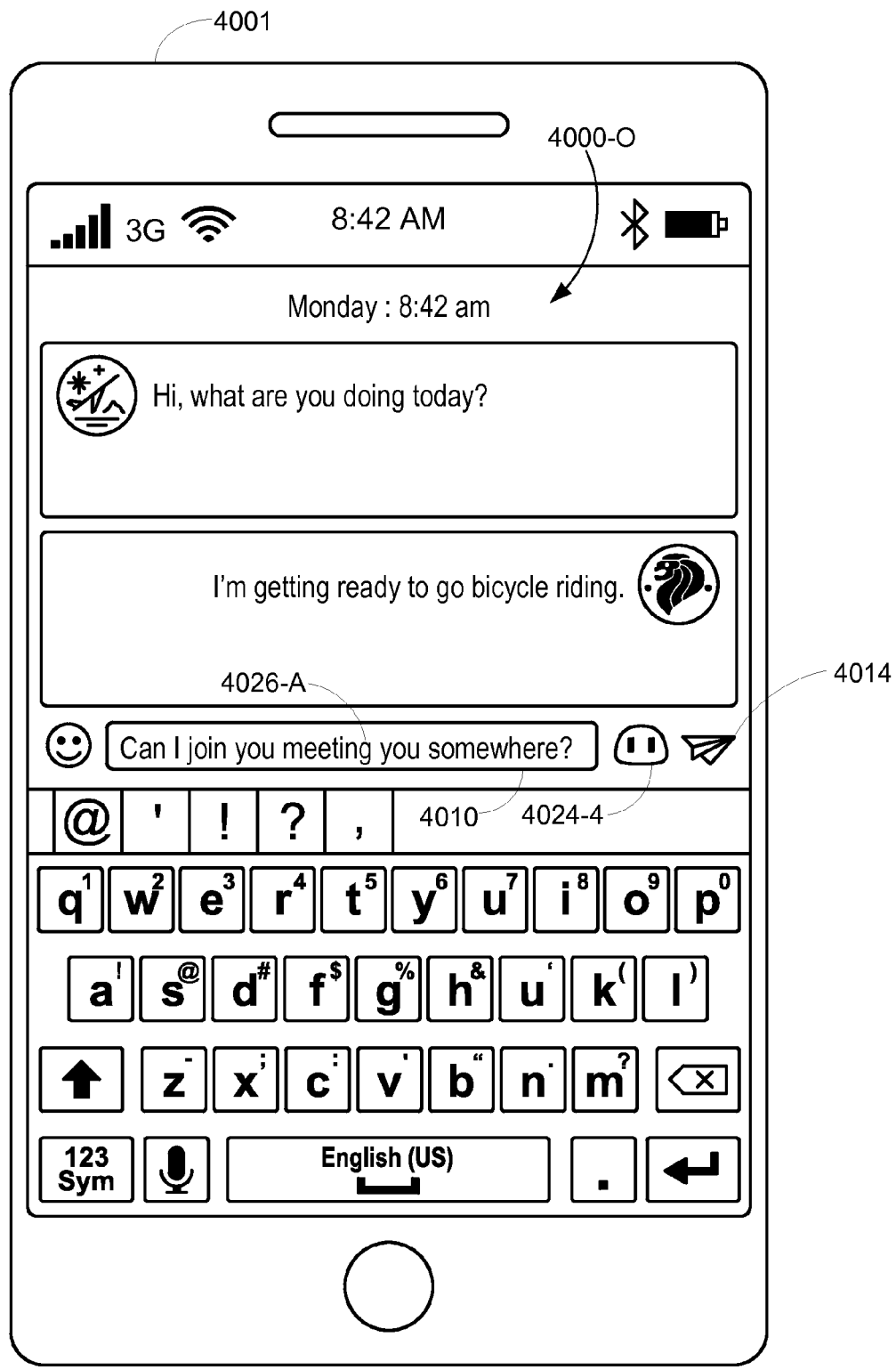
Figure 4P:
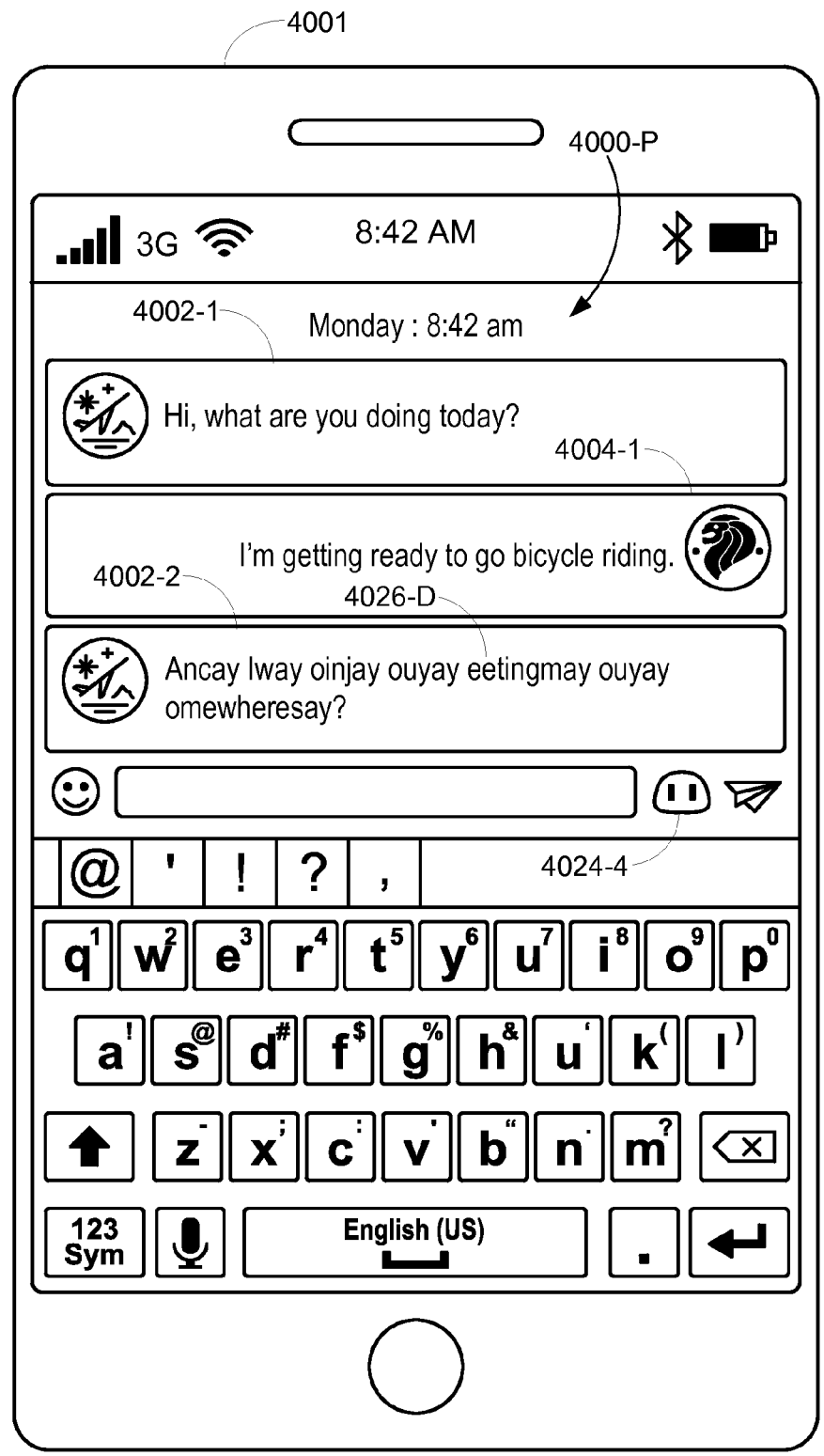

FIGS. 4A-4PP illustrate example user interfaces, including messages with text effects applied, in accordance with some implementations. The user interfaces shown in FIGS. 4A-4PP are example user interfaces for a messaging module 110 in a client device 102. For sake of convenience and as an example of the described implementations, the user interfaces are described below as user interfaces for a messaging application (e.g., messaging module 112) on a client device 4001 (e.g., client device 102-1) that includes a touch-sensitive display (e.g., a smartphone). The messaging application is associated with a messaging service operated by the server system 106. The user interfaces are displayed on the touch-sensitive display of the client device 4001. It should be appreciated that the user interfaces, operations, and interactions described below are applicable to other types of client devices and input devices (e.g., a laptop computer with keyboard and touch pad, a desktop computer with a mouse and keyboard, a tablet device with a touch screen).

FIG. 4A illustrates a messaging user interface 4000-A for a messaging conversation between a user of the device 4001 (e.g. client device 102-1) (hereinafter "User A" for convenience) and a user of another client device (e.g., client device 102-2) (hereinafter "User B" for convenience). The messaging user interface 4000-A includes one or more messages 4002 composed by User A and sent from the device 4001, and one or more messages 4004 composed by User B and sent from a client device associated with User B. In some implementations, each respective message 4002 and 4004 is displayed in respective user interface objects (e.g., message balloons). For example, in user interface 4000-A, message 4002-1 (or more particularly, the text 4003 of message 4002-1) is displayed in one message balloon, and message 4004-1 (or more particularly, the text 4005 of message 4004-1) is displayed in another message balloon. In the description below, for convenience, the term "message" may refer to a message or to its corresponding message balloon. In some implementations, within a message balloon 4002, an avatar or profile picture 4016 for User A is displayed. In some implementations, within a message balloon 4004, an avatar or profile picture 4018 for User B is displayed.

The user interface 4000-A also includes a virtual keyboard 4006, an emoji icon 4008, an input field 4010, a text effects icon 4012, a send icon 4014, and a time 4020 of the start of the most recent message exchange between User A and User B. User A inputs text into the input field 4010 by activating (e.g., with tap gestures, tap and hold gesture, etc.) various keys of the virtual keyboard 4006. User A can also toggle between the virtual keyboard 4006 and an emoji input interface (e.g., an emoji keyboard, an emoji selection interface) by activating the emoji icon 4008. User A can activate the text effects icon 4012 to open an interface for selecting a text effect for the text input field 4010, further details of which are described below. When User A is ready to send a message, User A activates the send icon 4014. Whatever text and emoji is input into input field 4010 is sent as a message to the server system 106, which sends the message to the device of User B.

In response to activation by User A of the text effects icon 4012, an interface for selecting a text effect for the text input field 4010 is displayed. FIG. 4B illustrates messaging user interface 4000-B, which includes an example of such a text effect selection interface. In user interface 4000-B, a pop-up 4022 of text effects icons 4024 is displayed. In some implementations, pop-up 4022 is scrollable, to reveal text effects icons 4024 that may not have been in view due to the number of text effects icons 4024 and the size of the pop-up 4022. User A selects one of the icons 4024 (e.g., by tapping on the icon) to select a text effect to be applied to text that is input into input field 4010, or select icon 4024-10 to cancel any previously selected text effect. For example, in FIG. 4B, "character jumble" icon 4024-1 is selected. In response to User A selecting the "character jumble" icon 4024-1, the text effects icon 4012 is replaced on-screen with the "character jumble" icon 4024-1 to indicate that the "character jumble" effect is active for the input field 4010.

FIG. 4C illustrates user interface 4000-C, which shows "character jumble" icon 4024-1 in place of text effects icon 4010, indicating that the "character jumble" effect is active. FIG. 4C also shows text 4026-A input by User A into input field 4010. With the "character jumble" effect active and original text 4026-A "Can I join you meeting you somewhere?" input in the input field 4010, User A activates the send icon 4014 to send the text 4026-A as a message 4002-2, with the "character jumble" effect applied, as a message to the server system 106, which sends the message to User B's device.

FIG. 4D illustrates user interface 4000-D, after the message 4002-2 is sent. At User A's device 4001, the sent message 4002-2 is displayed in another balloon. The text 4026 is displayed in the message 4002-2 in accordance with the "character jumble" effect, and thus is displayed as text 4026-B, in which, within each multi-character word (or more generally, multi-character sequences separated by spaces) of the original text 4026-A, the characters are rearranged into a different order. For example, for the first word "Can" in the original text 4026-A, the characters are rearranged into "nCa" in text 4026-B. For the last word "somewhere" in the original text 4026-A, the characters are rearranged into "eworeshme" in text 4026-B. In some implementations, the rearrangement is random or in accordance with predefined rules (e.g., the first character swaps places with fourth character and the second character swaps places with the fifth character and so on). In some implementations, punctuation characters are left as they are, at their original position in the text 4026. Single character words, such as "I" or "a," are left as they are.

In some implementations, the character rearranging within the message text 4026 is word-by-word (as shown in FIG. 4D). In some other implementations, the character rearranging is across the whole text 4026 of the message.

While text 4026-B is displayed in the message 4002-2, User A may make an input with respect to the message 4002-2 (e.g., make a tap gesture on the message 4002-2). In response to the tap on the message 4002-2, the original text 4026-A is displayed in the message 4002-2, as shown in FIG. 4E. FIG. 4E illustrates user interface 4000-E, which includes original text 4026-A displayed in the message 4002-2 after User A has made the input with respect to the message 4002-2. In some implementations, the display of the original text 4026-A is temporary. For example, the original text 4026-A is displayed for five seconds after User A's input with respect to the message 4002-2, after which text 4026-B is re-displayed in message 4002-2.

Returning to, and continuing from FIG. 4A, FIG. 4F illustrates messaging user interface 4000-F, which includes the pop-up 4022 of text effects icons 4024 displayed after User A activated the text effects icon 4012. User A selects the "top secret" icon 4024-2 (e.g., by tapping on the icon). In response to User A selecting the "top secret" icon 4024-2, the text effects icon 4012 is replaced on-screen with the "top secret" icon 4024-2 to indicate that the "top secret" effect is active for the input field 4010.

FIG. 4G illustrates user interface 4000-G, which shows "top secret" icon 4024-2 in place of text effects icon 4010, indicating that the "top secret" effect is active. FIG. 4G also shows text 4026-A input by User A into input field 4010. With the "top secret" effect active and original text 4026-A "Can I join you meeting you somewhere?" input in the input field 4010, User A activates the send icon 4014 to send the text 4026-A as a message 4002-2, with the "top secret" effect applied, as a message to the server system 106, which sends the message to User B's device.

FIG. 4H illustrates user interface 4000-H, after the message 4002-2 is sent. At User A's device 4001, the sent message 4002-2 is displayed in another balloon. The text 4026 in the message 4002-2 is, in accordance with the "top secret" effect, obscured by a censoring graphic 4028. Two exemplary types of censoring graphics are censoring mosaics and solid bars (e.g., black bars as in classified documents). In some implementations, the censoring graphic 4028 obscures the entirety of the text 4026. In some other implementations, the censoring graphic 4028 obscures a portion, or portions, of the text 4026-A (e.g., the first three words, every other word). In some other implementations, the censoring graphic 4028 is semi-transparent.

While the text 4026 is obscured by the censoring graphic 4028, User A may make an input with respect to the message 4002-2 (e.g., make a tap gesture on the message 4002-2). In response to the tap on the message 4002-2, the original text 4026-A is displayed in the message 4002-2, as shown in FIG. 4I; the censoring graphic 4028 is removed. FIG. 4I illustrates user interface 4000-I, which includes original text 4026-A displayed in the message 4002-2 after User A has made the input with respect to the message 4002-2. In some implementations, the removal of the censoring graphic 4028 is temporary. For example, the censoring graphic 4028 is removed for five seconds after User A's input with respect to the message 4002-2, after which the censoring graphic 4028 is re-displayed and re-obscures the text 4026.

Returning to, and continuing from FIG. 4A, FIG. 4J illustrates messaging user interface 4000-J, which includes the pop-up 4022 of text effects icons 4024 displayed after User A activated the text effects icon 4012. User A selects the "reverse" icon 4024-3 (e.g., by tapping on the icon). In response to User A selecting the "reverse" icon 4024-3, the text effects icon 4012 is replaced on-screen with the "reverse" icon 4024-3 to indicate that the "reverse" effect is active for the input field 4010.

FIG. 4K illustrates user interface 4000-K, which shows "reverse" icon 4024-3 in place of text effects icon 4010, indicating that the "reverse" effect is active. FIG. 4K also shows text 4026-A input by User A into input field 4010. With the "reverse" effect active and original text 4026-A "Can I join you meeting you somewhere?" input in the input field 4010, User A activates the send icon 4014 to send the text 4026-A as a message 4002-2, with the "reverse" effect applied, as a message to the server system 106, which sends the message to User B's device.

FIG. 4L illustrates user interface 4000-L, after the message 4002-2 is sent. At User A's device 4001, the sent message 4002-2 is displayed in another balloon. The text 4026 is displayed in the message 4002-2 in accordance with the "reverse" effect, and thus is displayed as text 4026-C, in which the words of the original text 4026-A are presented in reverse order. For example, in FIG. 4L, the words in original text 4026-A "Can I join you meeting you somewhere?" are re-ordered into "somewhere? you meeting you join I Can" in text 4026-C. More generally, the words in the original text 4026-A may be reordered randomly or in accordance with one or more predefined rules (e.g., reverse order as described above, alternating words switch places). In some implementations, punctuation characters are left at their relative positions, following the word they were respectively following in the original 4026-A (e.g., the question mark follows the word "somewhere" in text 4026-C).

While text 4026-C is displayed in the message 4002-2, User A may make an input with respect to the message 4002-2 (e.g., make a tap gesture on the message 4002-2). In response to the tap on the message 4002-2, the original text 4026-A is displayed in the message 4002-2, as shown in FIG. 4M. FIG. 4M illustrates user interface 4000-M, which includes original text 4026-A displayed in the message 4002-2 after User A has made the input with respect to the message 4002-2. In some implementations, the display of the original text 4026-A is temporary. For example, the original text 4026-A is displayed for five seconds after User A's input with respect to the message 4002-2, after which text 4026-C is re-displayed in message 4002-2.

Returning to, and continuing from FIG. 4A, FIG. 4N illustrates messaging user interface 4000-N, which includes the pop-up 4022 of text effects icons 4024 displayed after User A activated the text effects icon 4012. User A selects the "pig latin" icon 4024-4 (e.g., by tapping on the icon). In response to User A selecting the "pig latin" icon 4024-4, the text effects icon 4012 is replaced on-screen with the "pig latin" icon 4024-4 to indicate that the "pig latin" effect is active for the input field 4010.

FIG. 4O illustrates user interface 4000-O, which shows "pig latin" icon 4024-4 in place of text effects icon 4010, indicating that the "pig latin" effect is active. FIG. 4O also shows text 4026-A input by User A into input field 4010. With the "pig latin" effect active and original text 4026-A "Can I join you meeting you somewhere?" input in the input field 4010, User A activates the send icon 4014 to send the text 4026-A as a message 4002-2, with the "pig latin" effect applied, as a message to the server system 106, which sends the message to User B's device.

FIG. 4P illustrates user interface 4000-P, after the message 4002-2 is sent. At User A's device 4001, the sent message 4002-2 is displayed in another balloon. The text 4026 is displayed in the message 4002-2 in accordance with the "pig latin" effect, and thus is displayed as text 4026-D, in which the original text 4026-A is converted to its Pig Latin version. In some implementations, the conversion includes, for each word in the text 4026-A, the initial consonant or consonant cluster is moved to the end of the word, and then "ay" added. For a word that begins with a vowel sound or a silent letter, "way" is added to the word. For example, in text 4026-D, "Ancay" is the Pig Latin version of "Can" in original text 4026-A, and "Iway" is the Pig Latin version of "I" in original text 4026-A, In some implementations, punctuation characters are left as they are, at their original position in the text 4026.

Figure 4Q:
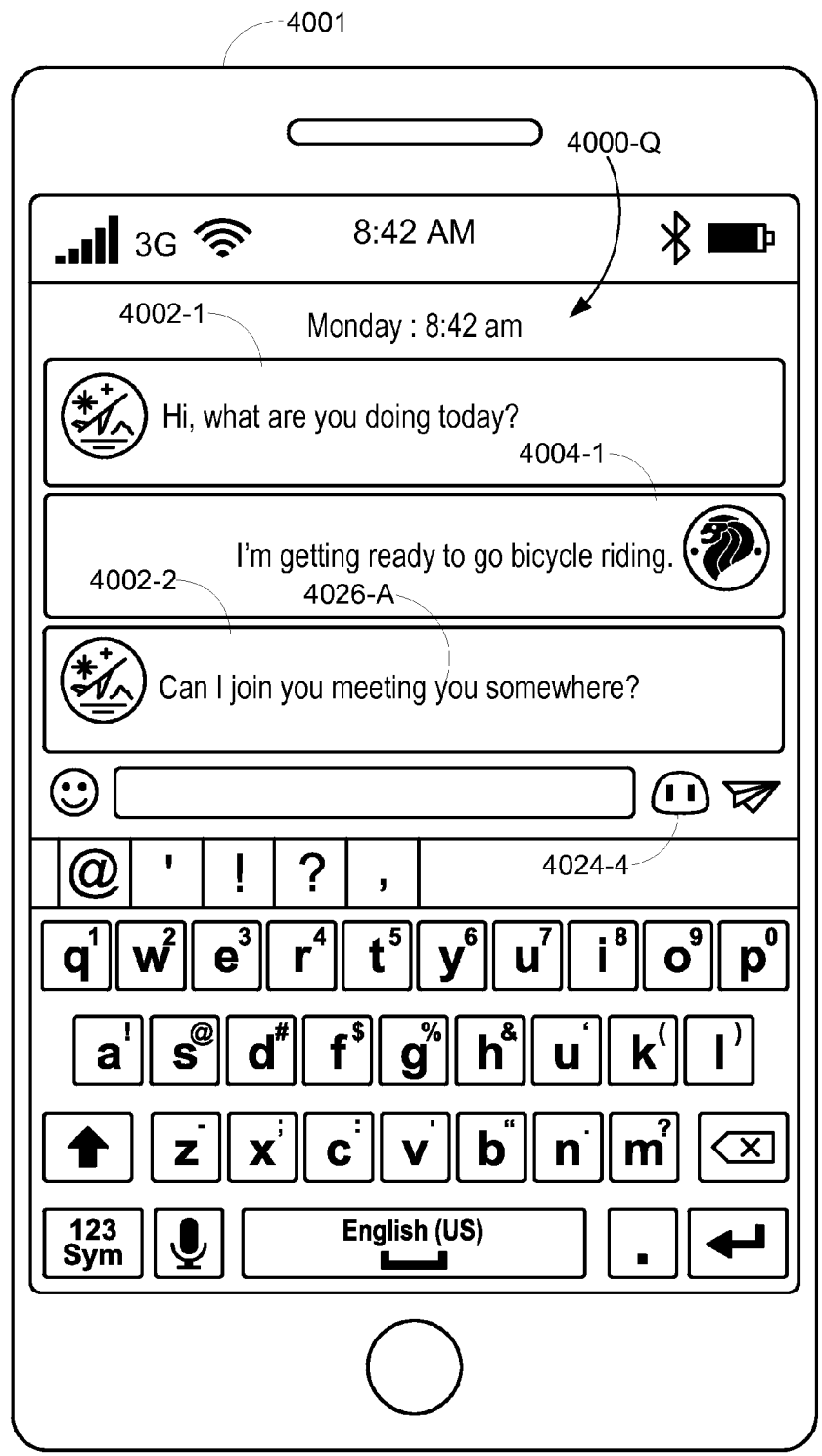

While text 4026-D is displayed in the message 4002-2, User A may make an input with respect to the message 4002-2 (e.g., make a tap gesture on the message 4002-2). In response to the tap on the message 4002-2, the original text 4026-A is displayed in the message 4002-2, as shown in FIG. 4Q. FIG. 4Q illustrates user interface 4000-Q, which includes original text 4026-A displayed in the message 4002-2 after User A has made the input with respect to the message 4002-2. In some implementations, the display of the original text 4026-A is temporary. For example, the original text 4026-A is displayed for five seconds after User A's input with respect to the message 4002-2, after which text 4026-D is re-displayed in message 4002-2.

Figure 4R:
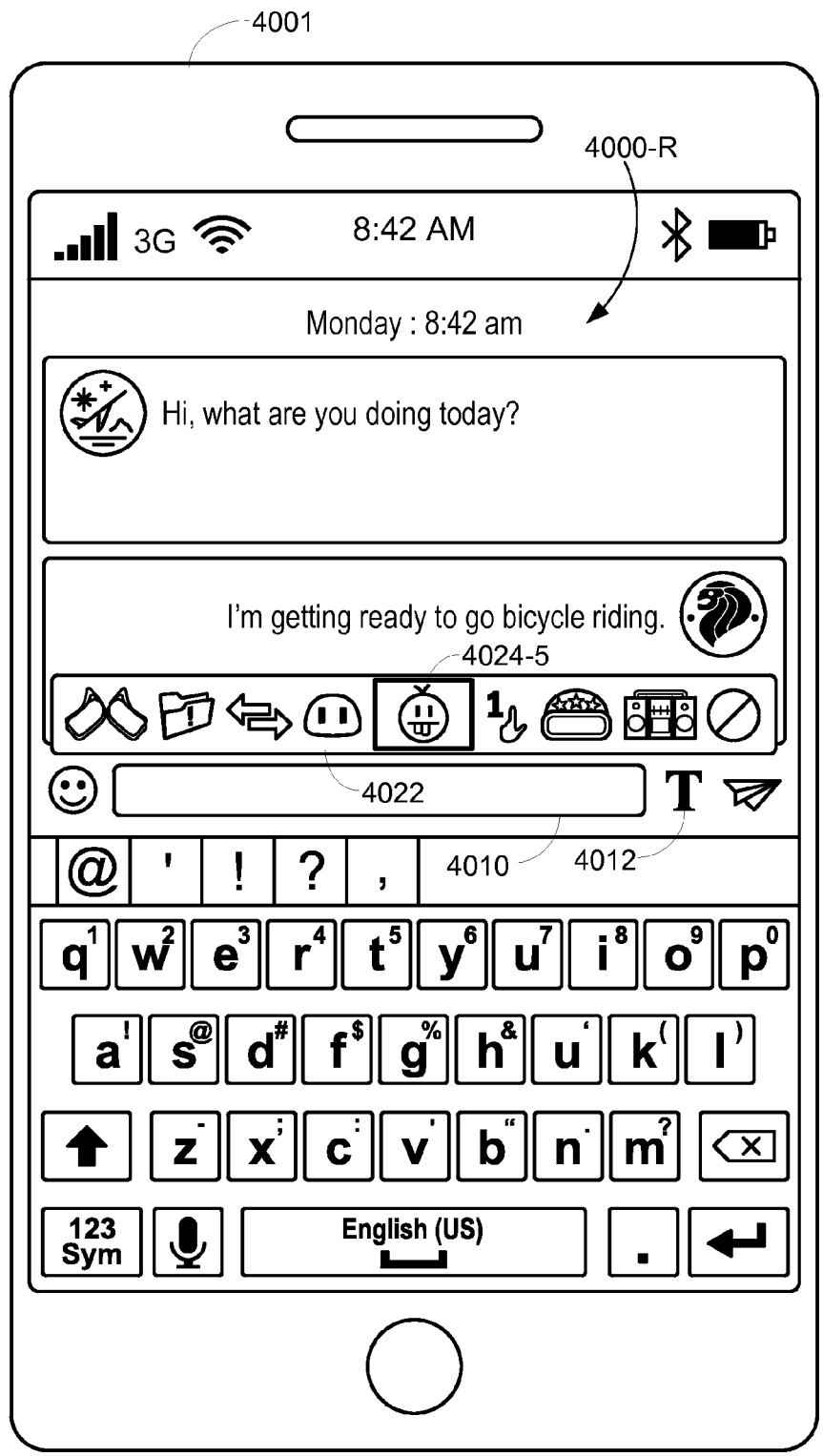

Returning to, and continuing from FIG. 4A, FIG. 4R illustrates messaging user interface 4000-R, which includes the pop-up 4022 of text effects icons 4024 displayed after User A activated the text effects icon 4012. User A selects the "toddler talk" icon 4024-5 (e.g., by tapping on the icon). In response to User A selecting the "toddler talk" icon 4024-5, the text effects icon 4012 is replaced on-screen with the "toddler talk" icon 4024-5 to indicate that the "toddler talk" effect is active for the input field 4010.

Figure 4S:
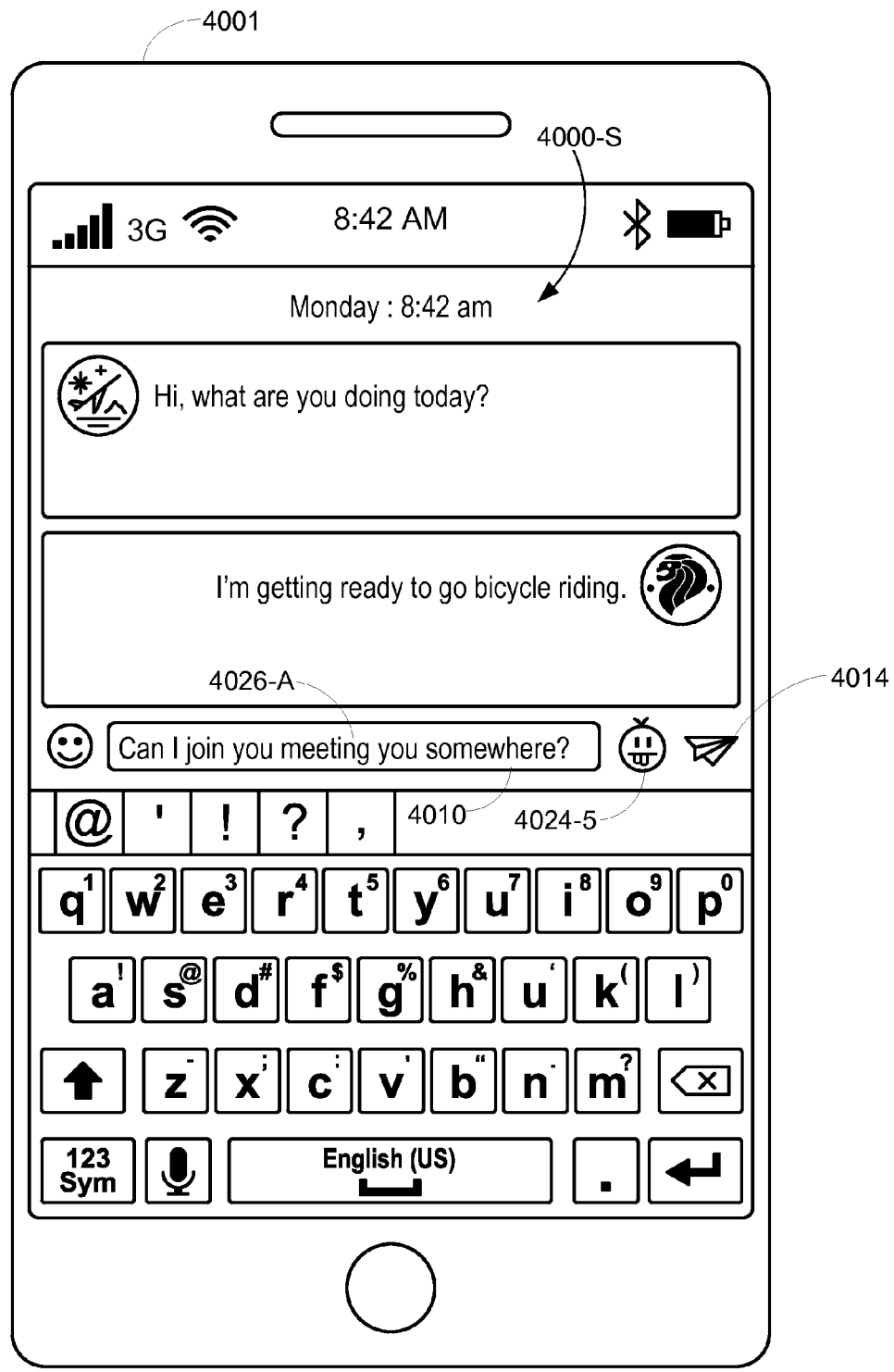

FIG. 4S illustrates user interface 4000-S, which shows "toddler talk" icon 4024-5 in place of text effects icon 4010, indicating that the "toddler talk" effect is active. FIG. 4S also shows text 4026-A input by User A into input field 4010. With the "toddler talk" effect active and original text 4026-A "Can I join you meeting you somewhere?" input in the input field 4010, User A activates the send icon 4014 to send the text 4026-A as a message 4002-2, with the "toddler talk" effect applied, as a message to the server system 106, which sends the message to User B's device.

Figure 4T:
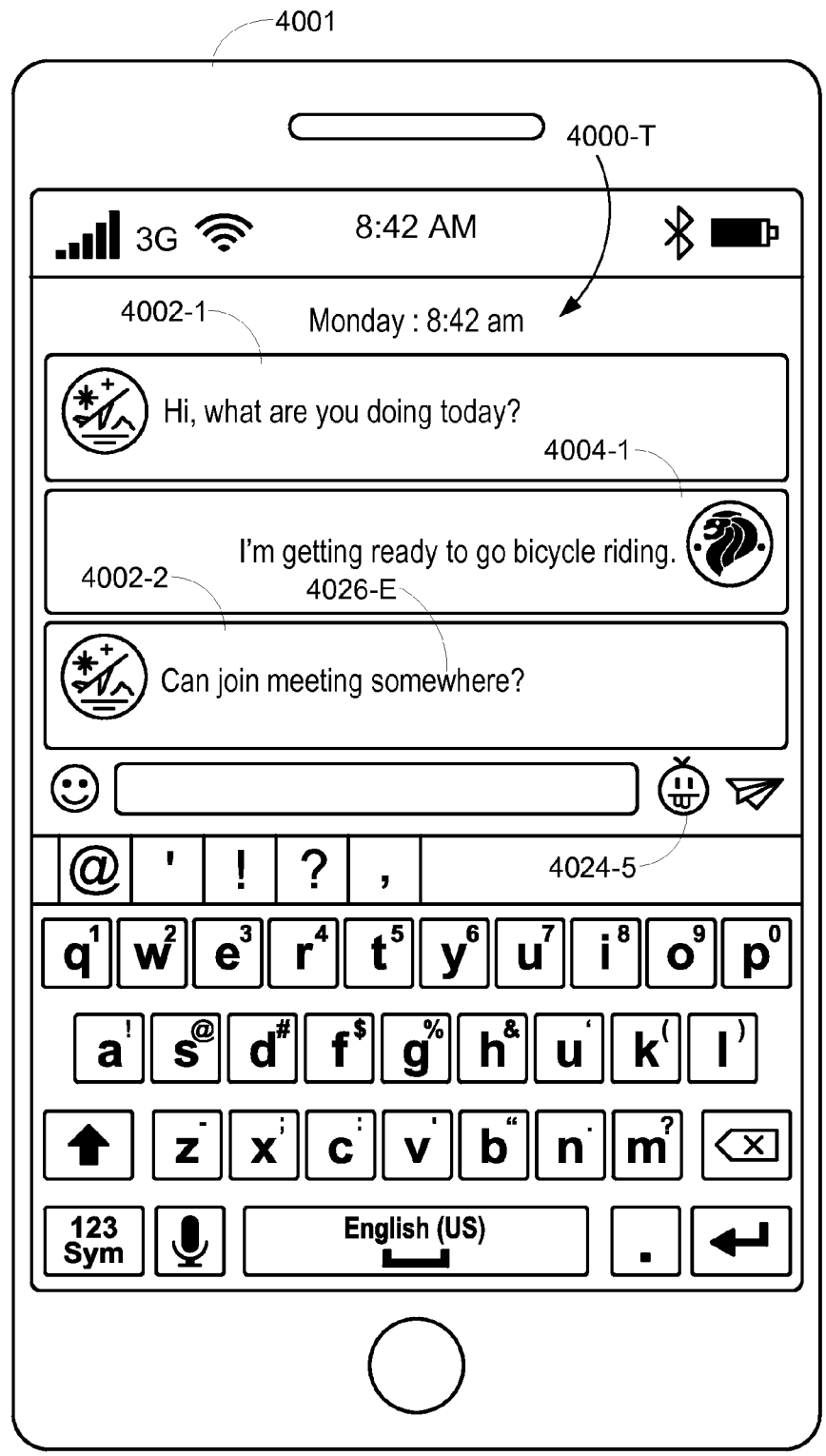

FIG. 4T illustrates user interface 4000-T, after the message 4002-2 is sent. At User A's device 4001, the sent message 4002-2 is displayed in another balloon. The text 4026 is displayed in the message 4002-2 in accordance with the "toddler talk" effect, and thus is displayed as text 4026-E, in which some of the words in the original text 4026-A are removed. In some implementations, the words that are removed are words that are in one or more predefined categories. In some implementations, the predefined categories include articles (such as "a" and "the"), pronouns, prepositions, or a "connector words" category that includes two or more of articles, pronouns, and prepositions. Text 4026-E, with the connector words (e.g., "I," "you"), simulates the talking style of a very young child (e.g., a baby, a toddler). In some implementations, punctuation characters are left as they are.

Figure 4U:
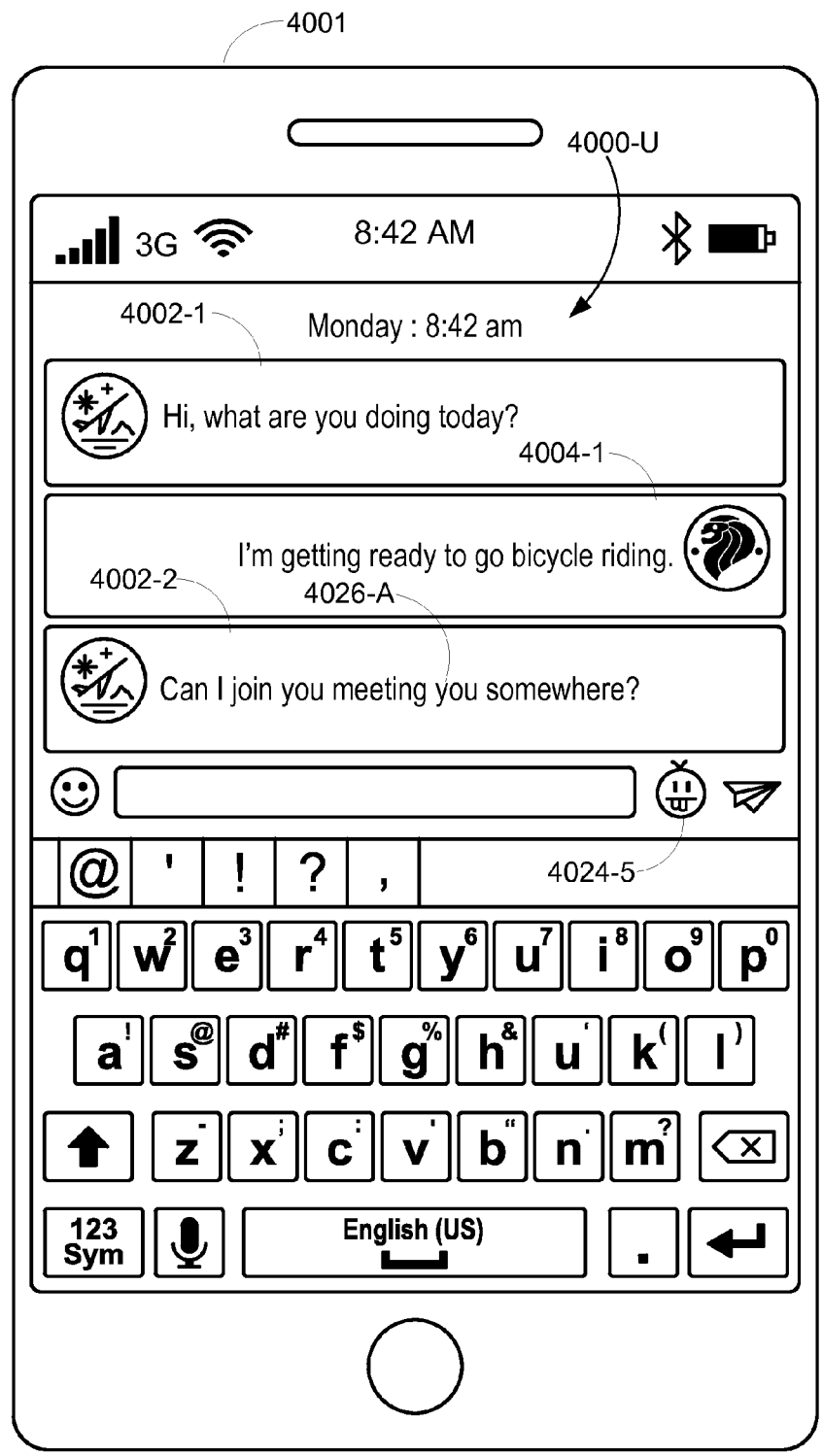

While text 4026-E is displayed in the message 4002-2, User A may make an input with respect to the message 4002-2 (e.g., make a tap gesture on the message 4002-2). In response to the tap on the message 4002-2, the original text 4026-A is displayed in the message 4002-2, as shown in FIG. 4U. FIG. 4U illustrates user interface 4000-U, which includes original text 4026-A displayed in the message 4002-2 after User A has made the input with respect to the message 4002-2. In some implementations, the display of the original text 4026-A is temporary. For example, the original text 4026-A is displayed for five seconds after User A's input with respect to the message 4002-2, after which text 4026-E is re-displayed in message 4002-2.

Figure 4V:
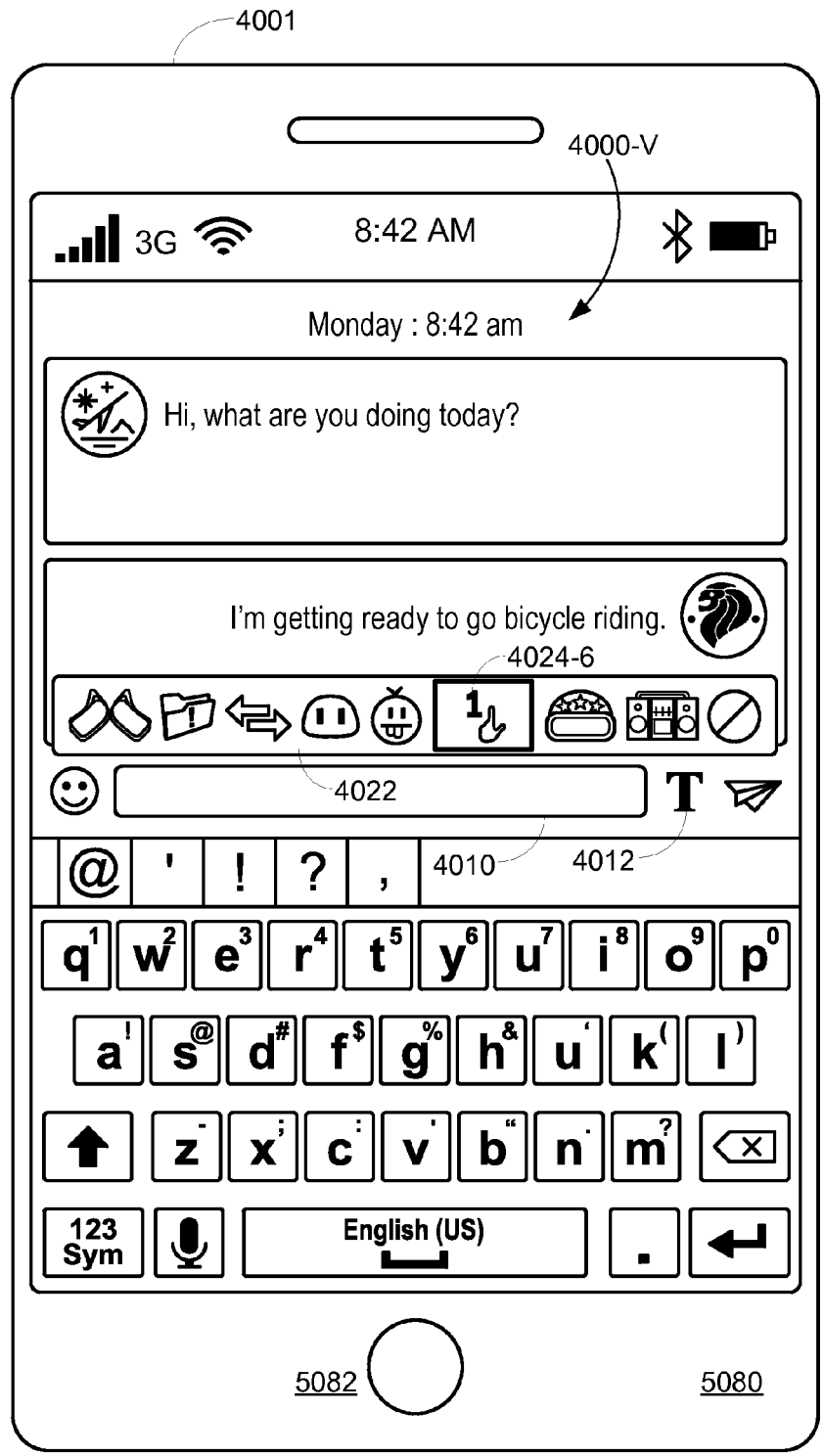

Returning to, and continuing from FIG. 4A, FIG. 4V illustrates messaging user interface 4000-V, which includes the pop-up 4022 of text effects icons 4024 displayed after User A activated the text effects icon 4012. User A selects the "one at a time" icon 4024-6 (e.g., by tapping on the icon). In response to User A selecting the "one at a time" icon 4024-6, the text effects icon 4012 is replaced on-screen with the "one at a time" icon 4024-6 to indicate that the "one at a time" effect is active for the input field 4010.

Figure 4W:
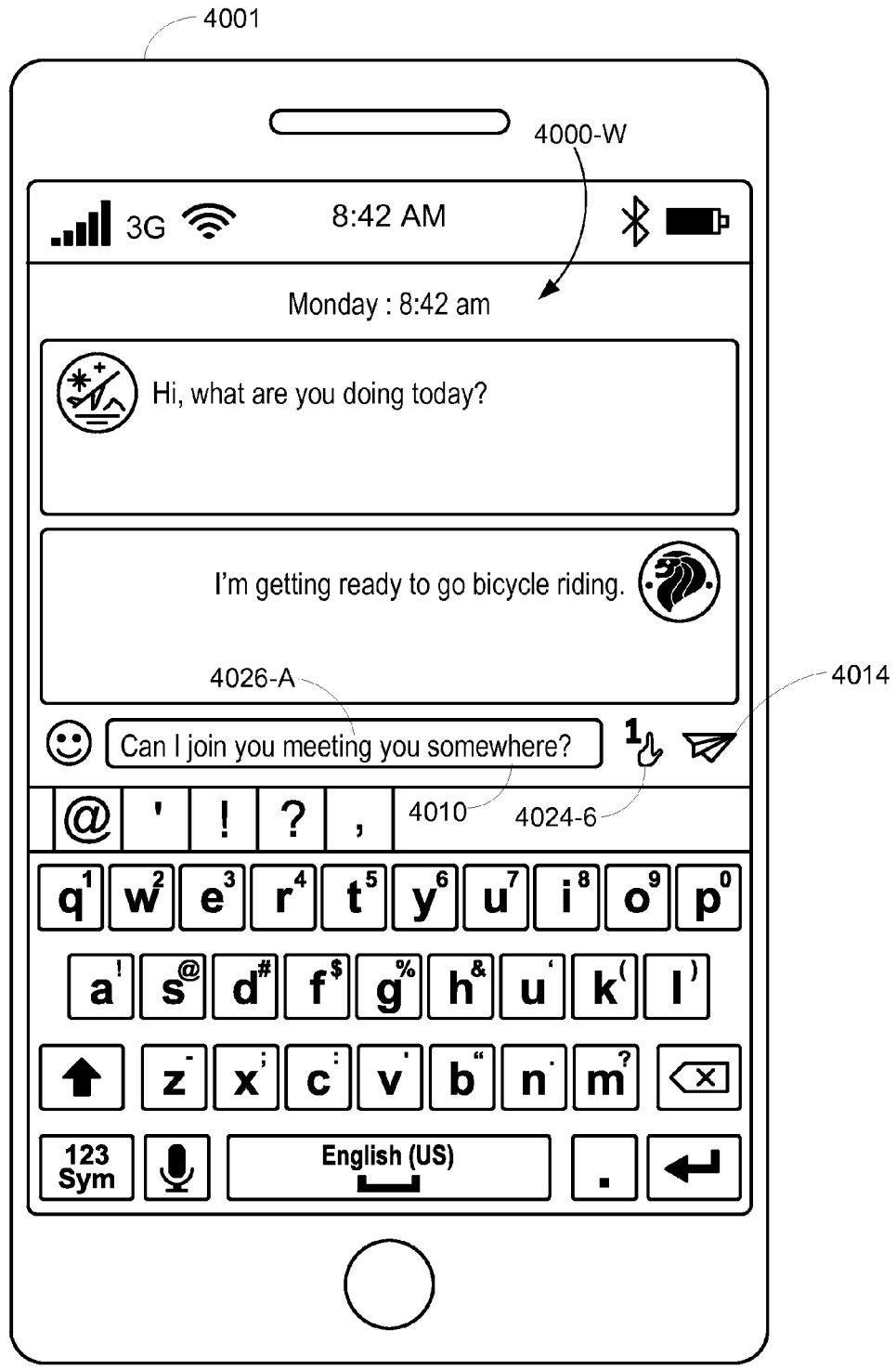

FIG. 4W illustrates user interface 4000-W, which shows "one at a time" icon 4024-6 in place of text effects icon 4010, indicating that the "one at a time" effect is active. FIG. 4W also shows text 4026-A input by User A into input field 4010. With the "one at a time" effect active and original text 4026-A "Can I join you meeting you somewhere?" input in the input field 4010, User A activates the send icon 4014 to send the text 4026-A as a message 4002-2, with the "one at a time" effect applied, as a message to the server system 106, which sends the message to User B's device.

Figure 4X:
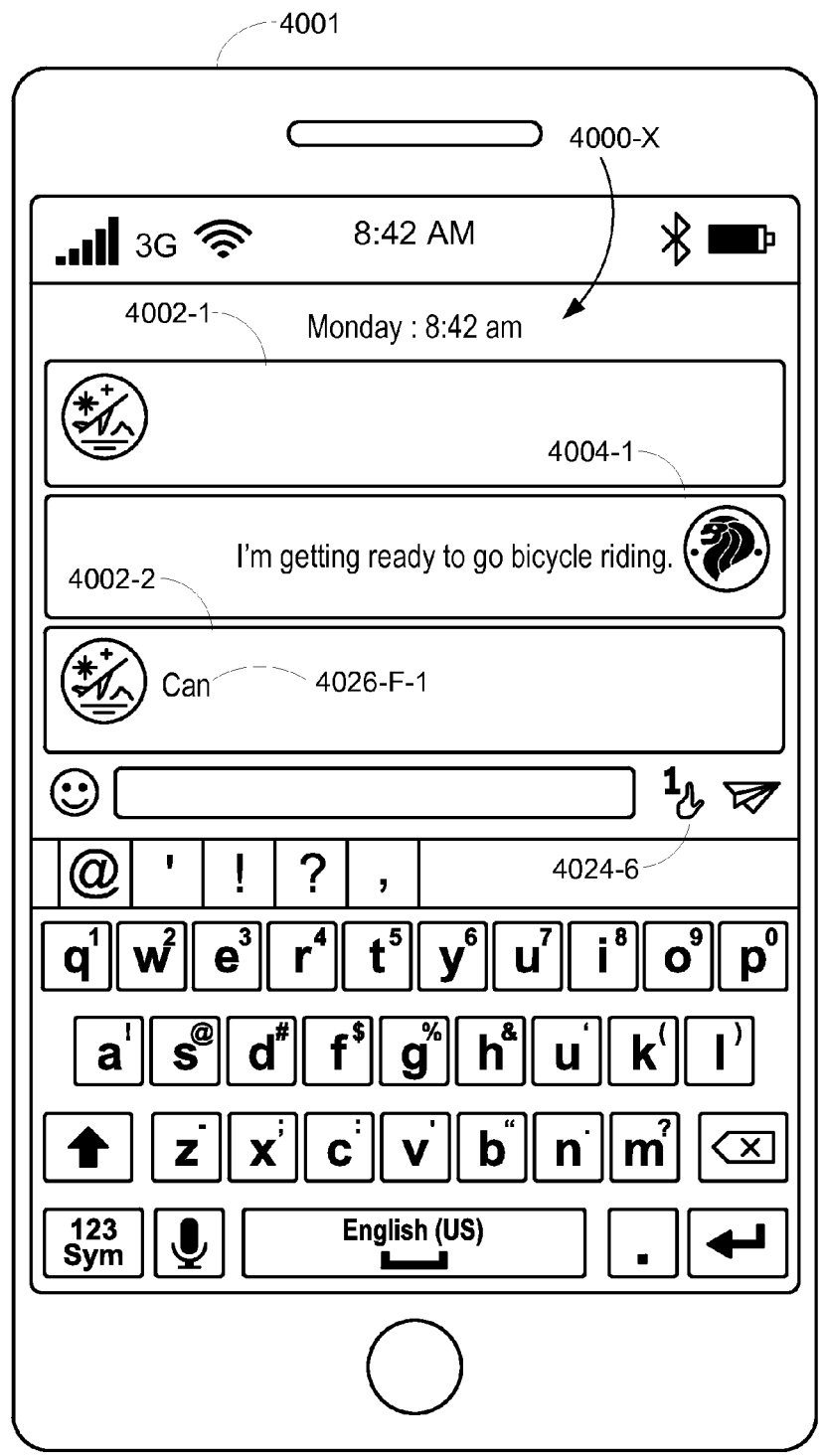
Figure 5Y:
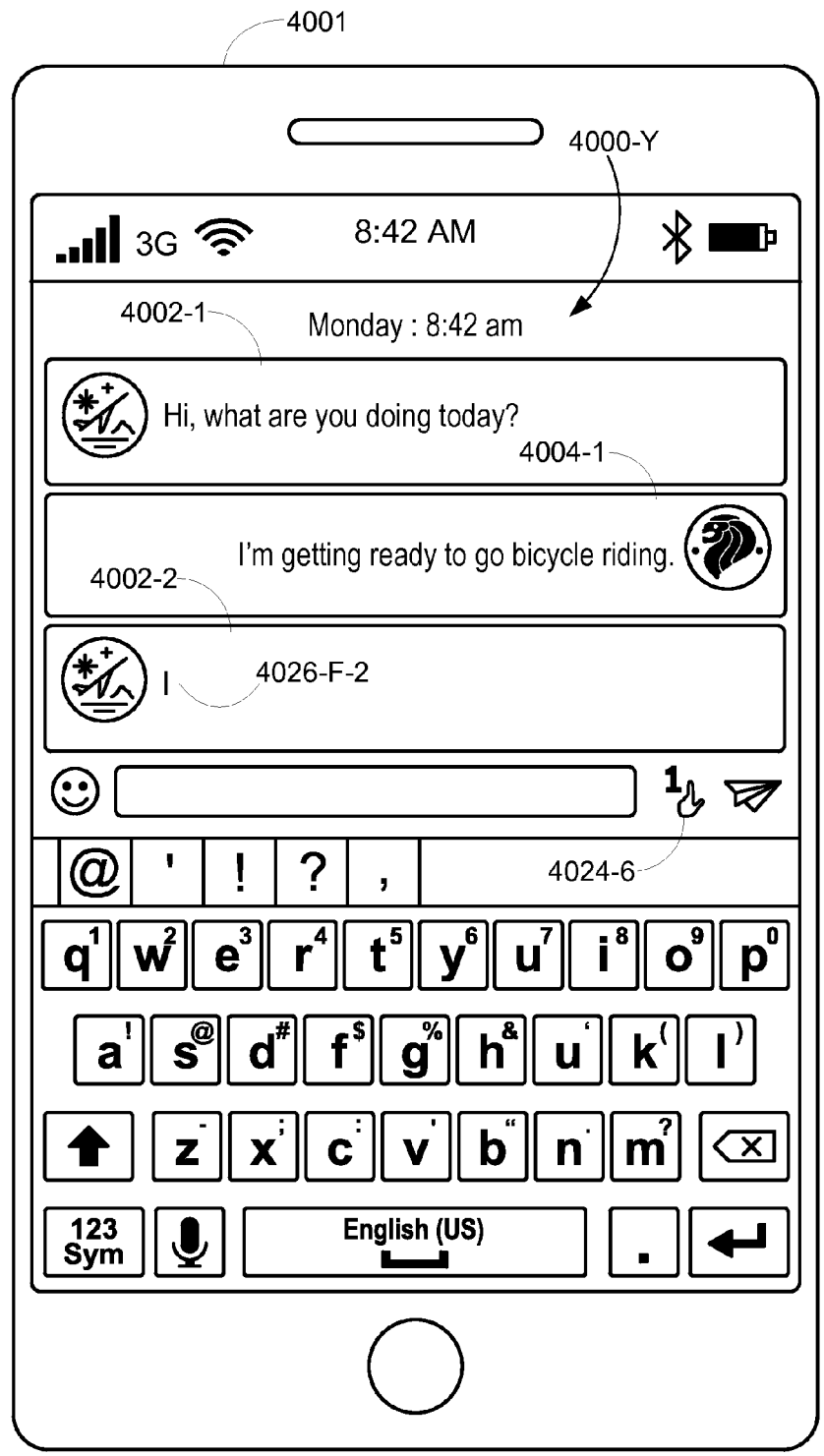
FIG. 5A, FIG. 5B, and FIG. 5C illustrate a method of displaying text with text effects in accordance with some implementations.

FIG. 4X illustrates user interface 4000-X, after the message 4002-2 is sent. At User A's device 4001, the sent message 4002-2 is displayed in another balloon. The text 4026 is displayed in the message 4002-2 in accordance with the "one at a time" effect, and thus is displayed as text 4026-F, in which the words in the original text 4026-A are displayed one at a time. In some implementations, a word of the original text 4026-A (e.g., "Can") is displayed for a predefined amount of time (e.g., 200 milliseconds, 500 milliseconds), and then the next word of the original text 4026-A (e.g., "I") is displayed for the predefined amount of time, and so on, automatically. In some implementations, a word of the original text 4026-A (e.g., "Can") is displayed, and then the next word of the original text 4026-A (e.g., "I") is displayed in response to a user input with respect to the message 4002-2 (e.g., a tap gesture on the message 4002-2) or the predefined amount of time has elapsed, whichever occurs first, and so on. In FIG. 4X, the text 4026-F-1 includes the word "Can" from the original text 4026-A.

While text 4026-F-1 is displayed in the message 4002-2, User A may make an input with respect to the message 4002-2 (e.g., make a tap gesture on the message 4002-2), or a predefined amount of time has elapsed. In response to the tap on the message 4002-2 or elapse of the predefined amount of time, text 4026-F-2 is displayed in the message 4002-2, as shown in FIG. 4Y. FIG. 4Y illustrates user interface 4000-U, which includes text 4026-F-2 displayed in the message 4002-2 after User A has made the input with respect to the message 4002-2 or elapse of the predefined amount of time. Text 4026-F-2 includes the word "I" from the original text 4026-A. Thus, in response to the input by User A or elapse of the predefined amount of time, "I" (the next word after "Can") is displayed. With another input with respect to the message 4002-2 by User A or another elapse of the predefined amount of time, the next word in the original text 4026-A ("join") is displayed. In some implementations, each user input with respect to the message 4002-2 or elapse of the predefined amount of time replaces the displayed word with the next word in the original text 4026-A. In some other implementations, each user input with respect to the message 4002-2 or elapse of the predefined amount of time adds the next word in the original text 4026-A to the words already displayed (e.g., "Can," then "Can I," then "Can I join," and so on.

Figure 4Z:
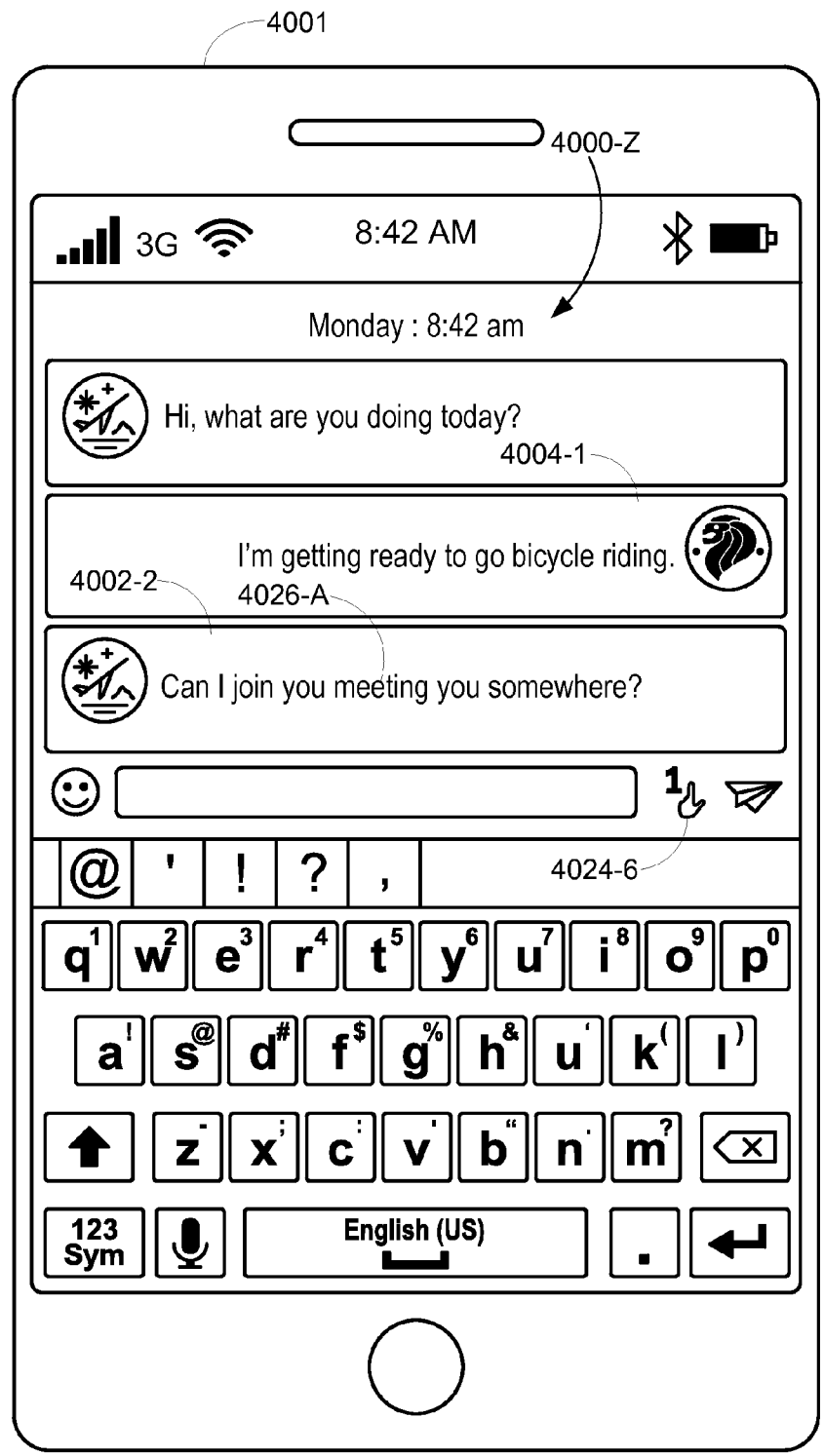
Figure 4A:
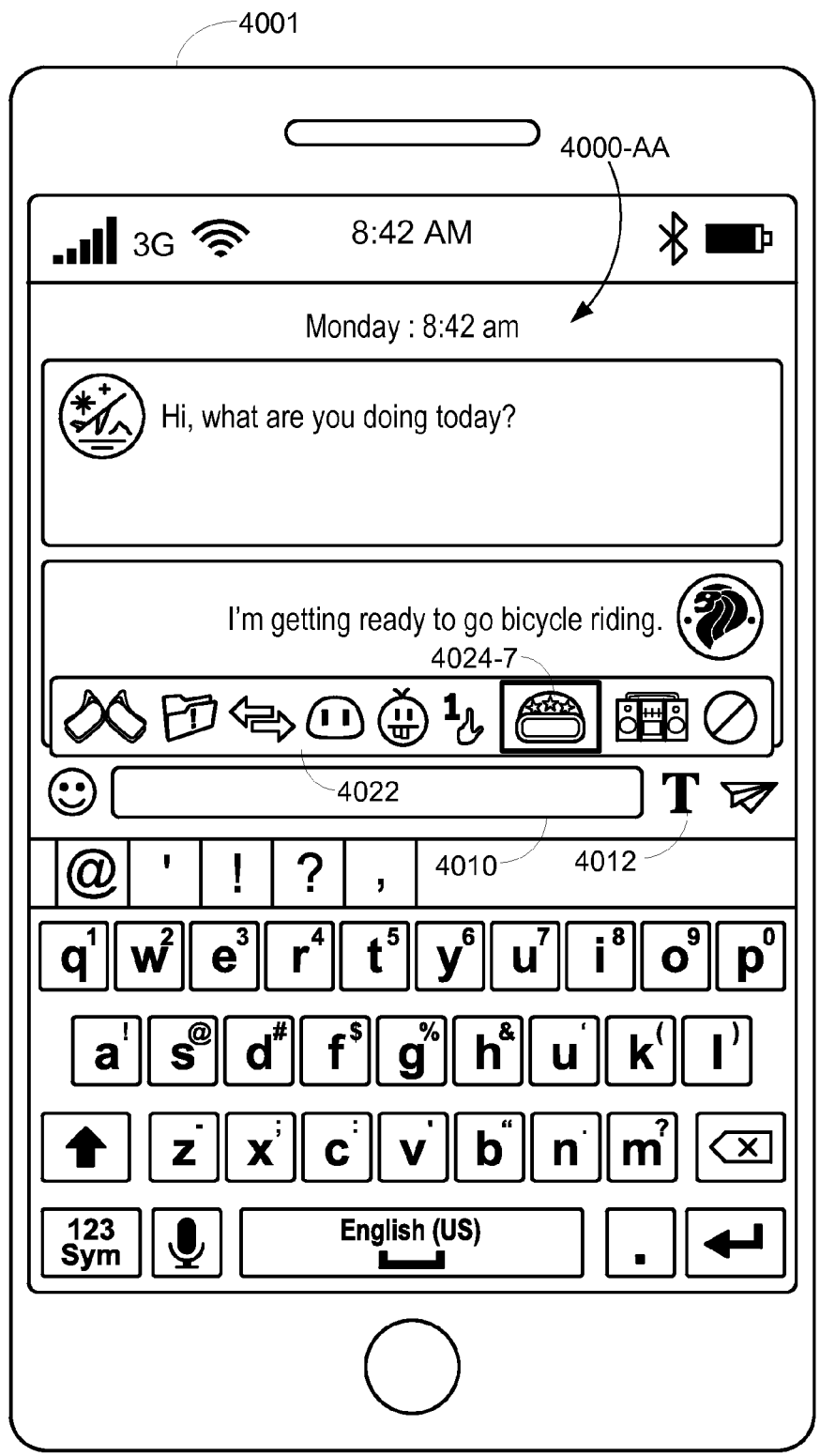
Figure 4B:
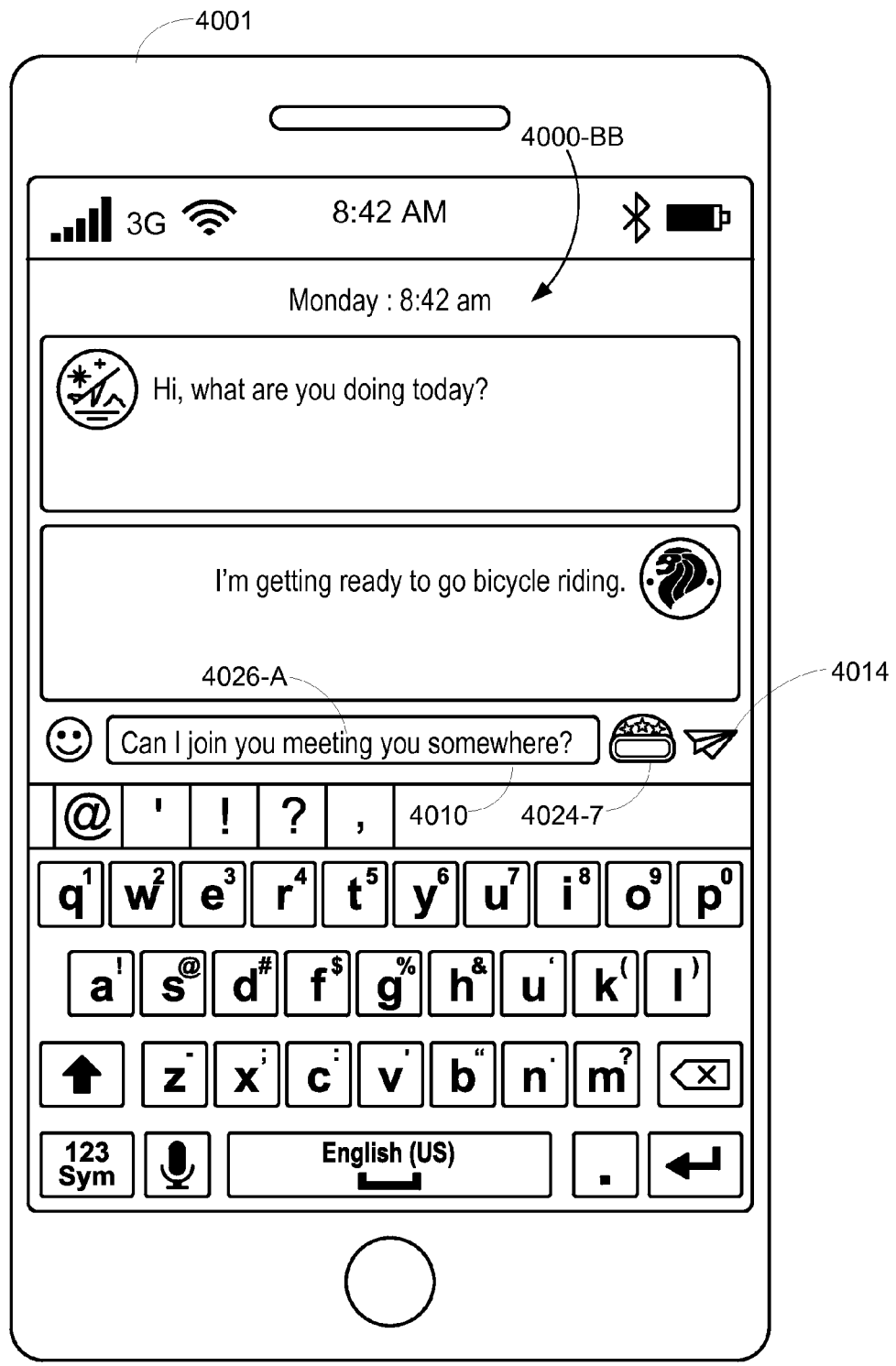
Figure 4C:
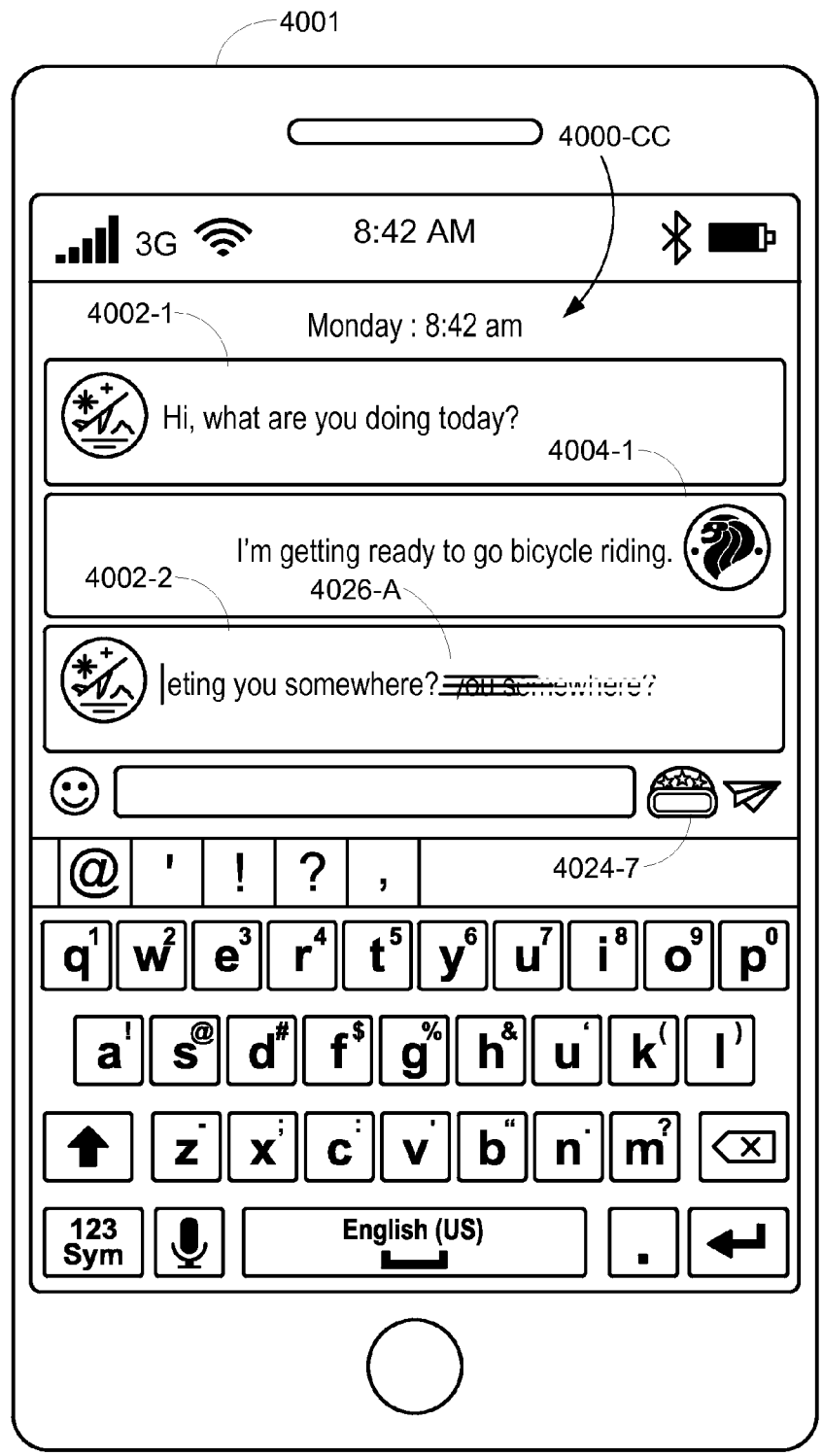
Figure 4D:
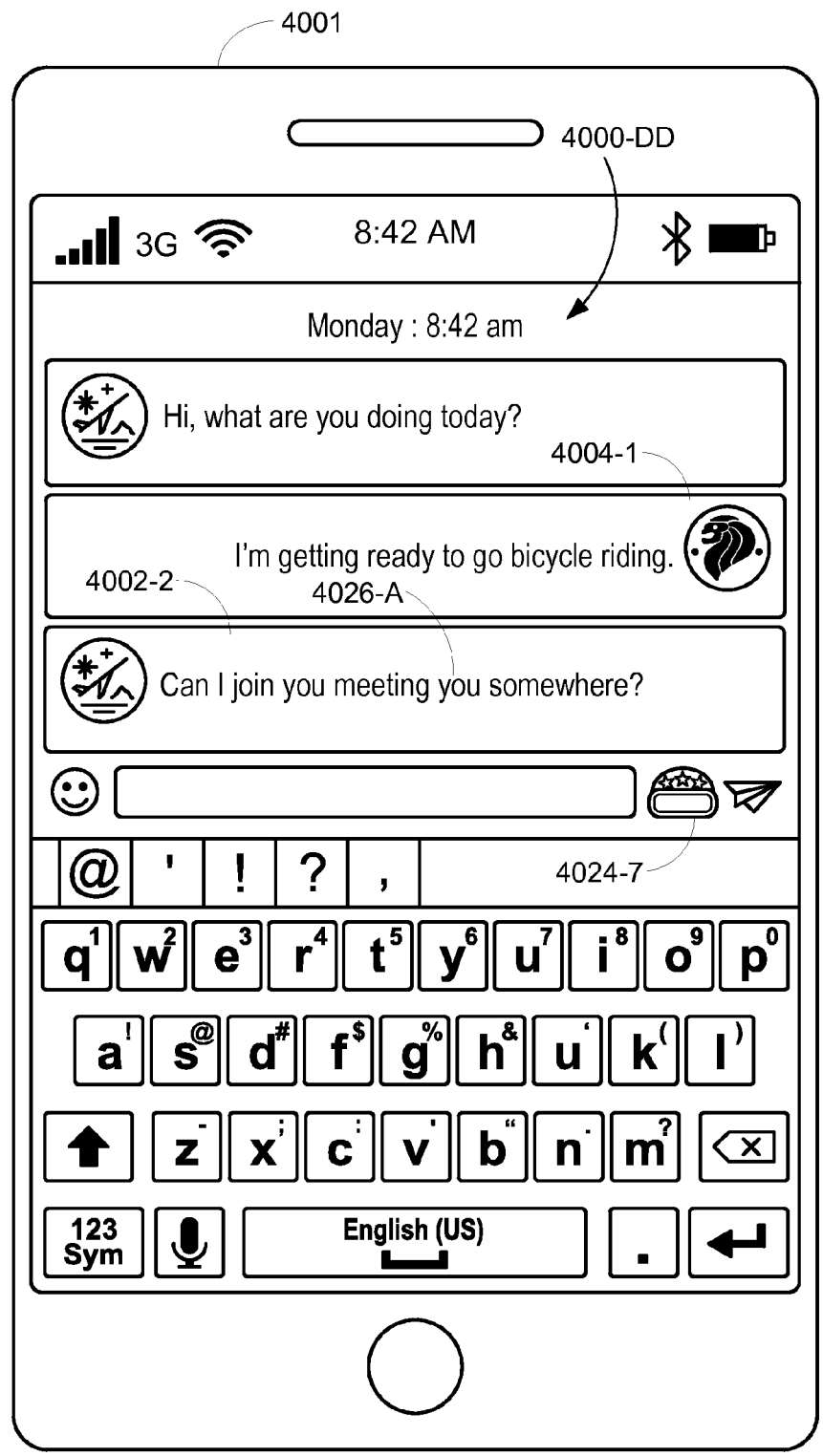
Figure 4E:
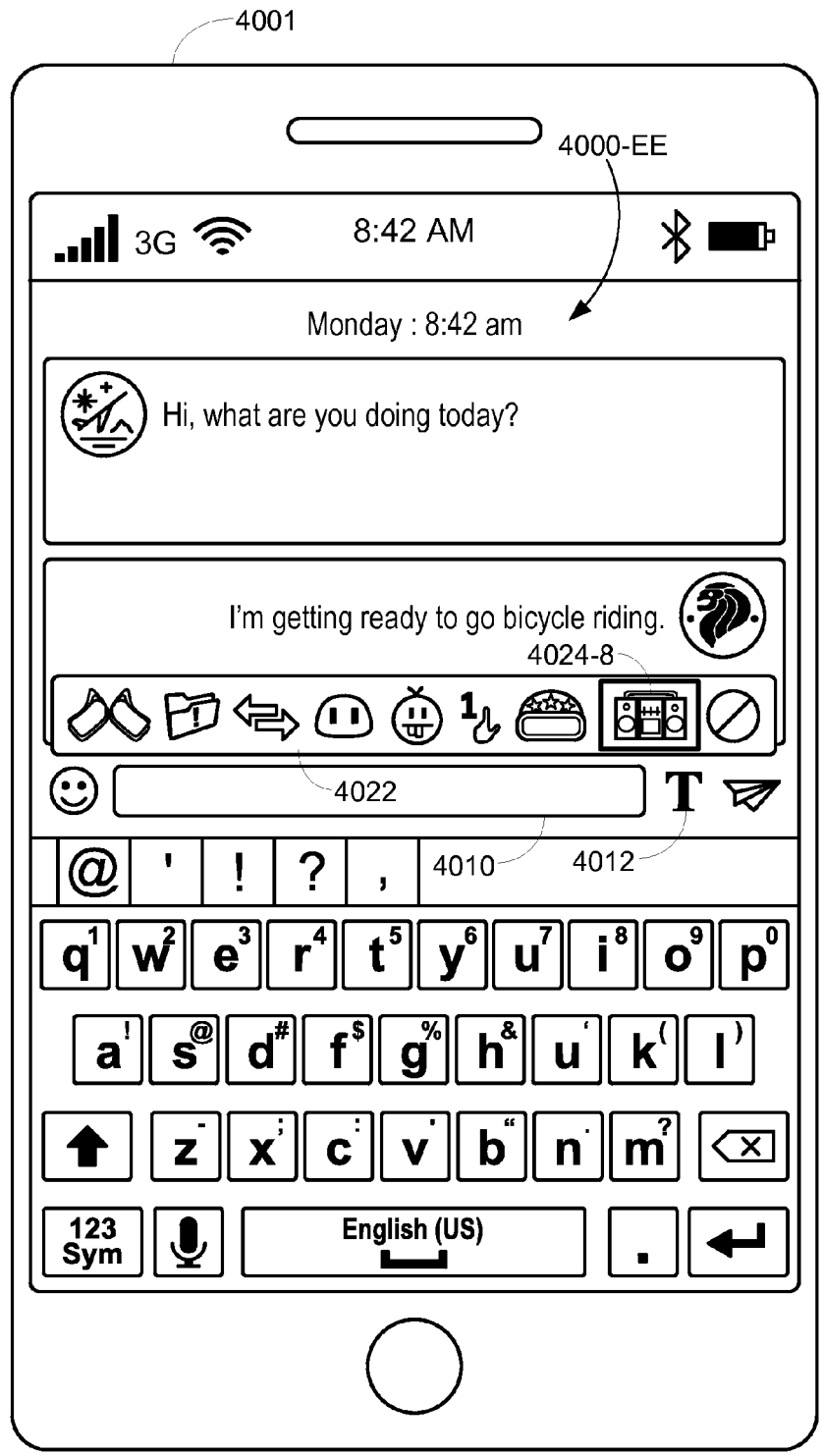
Figure 4F:
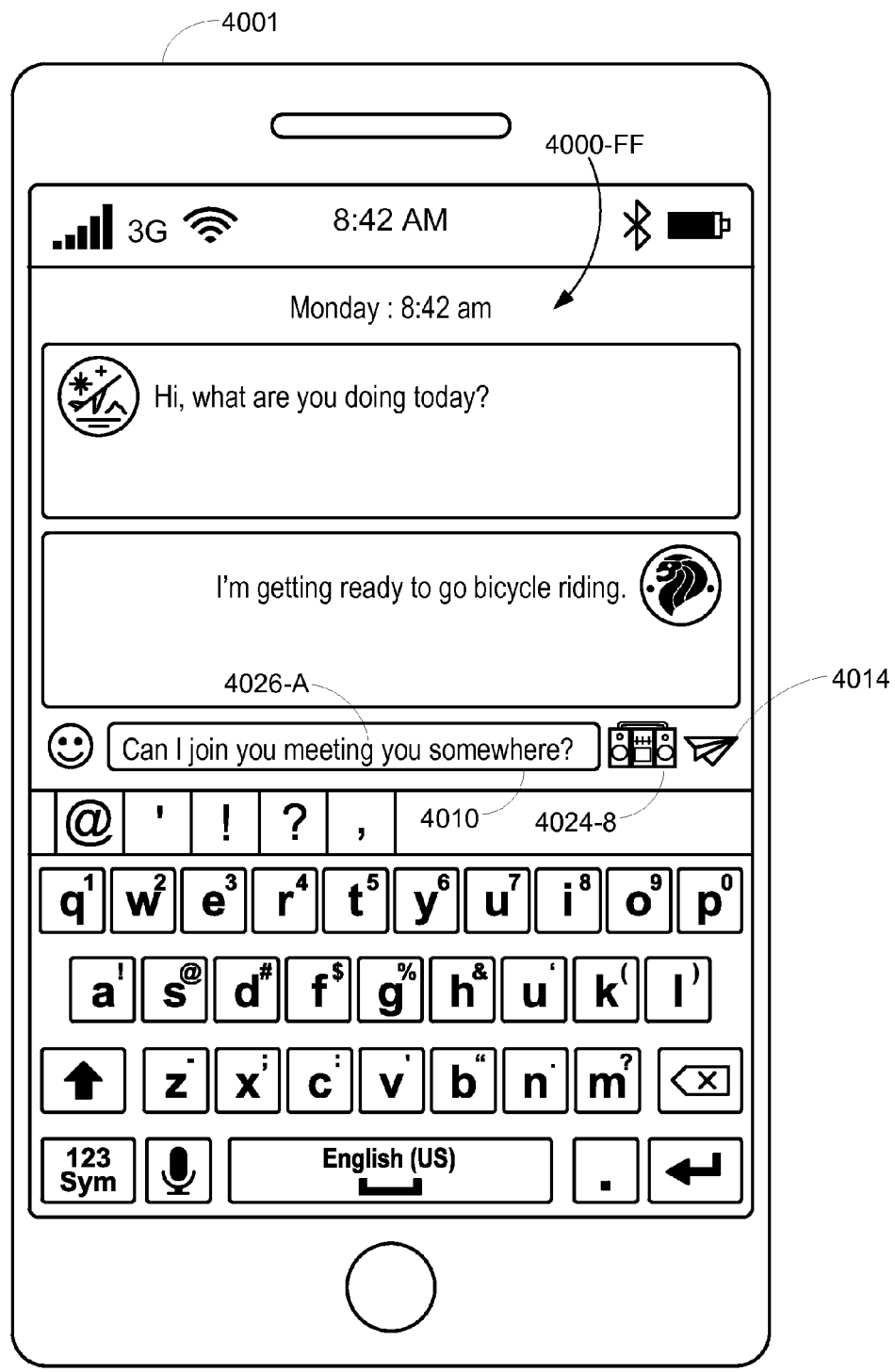
Figure 4G:
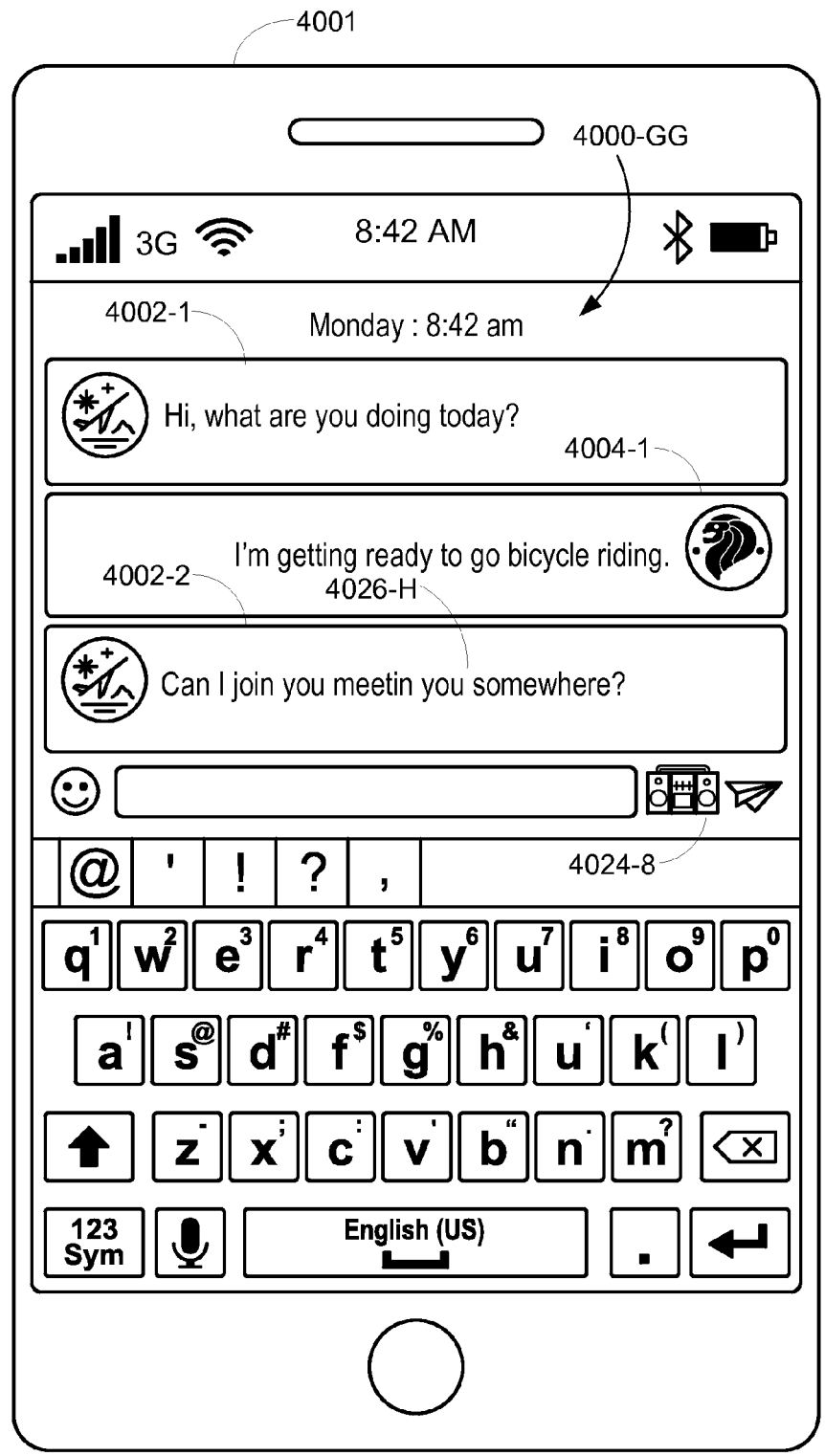
Figure 4H:
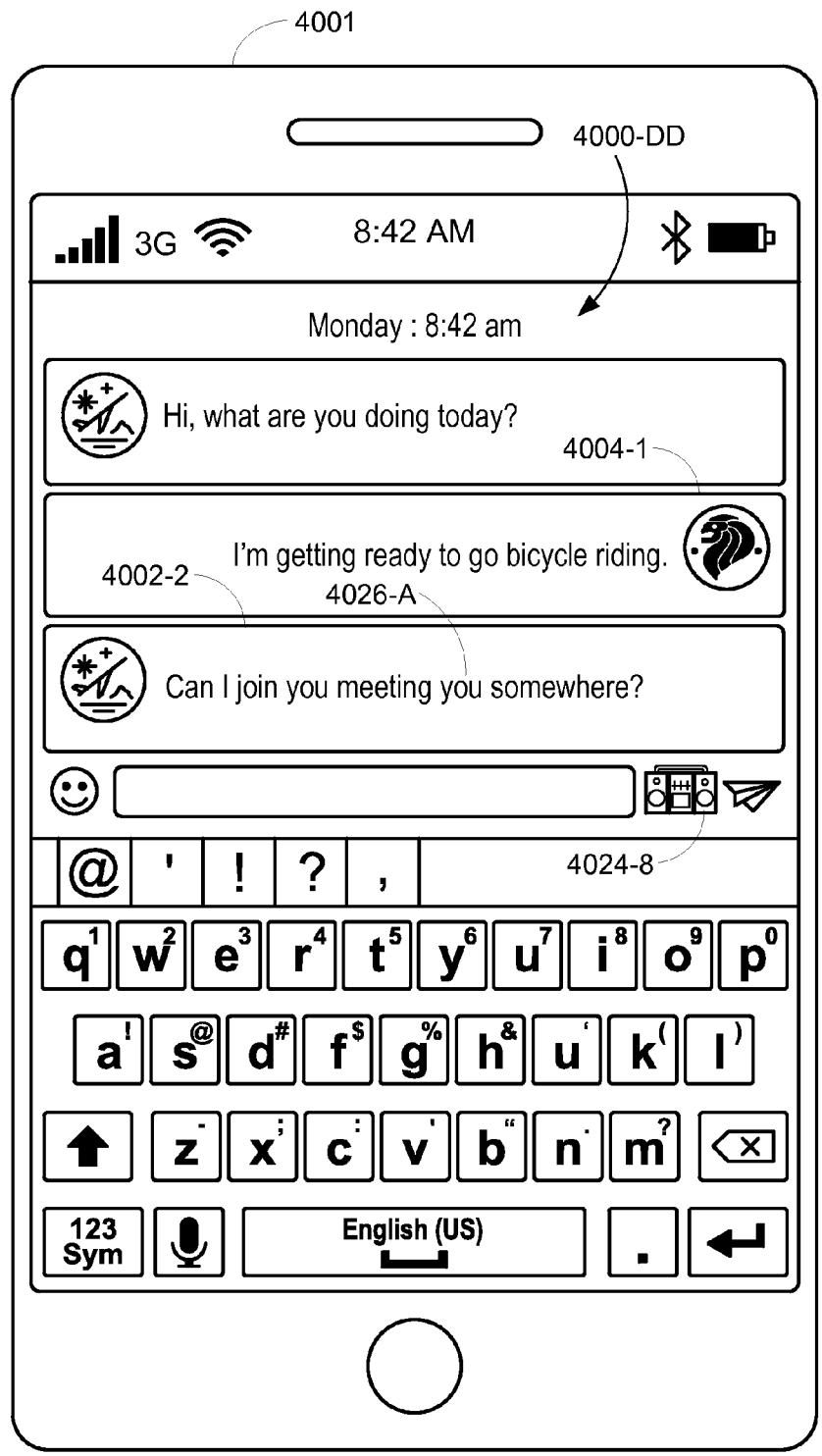
Figure 4I:
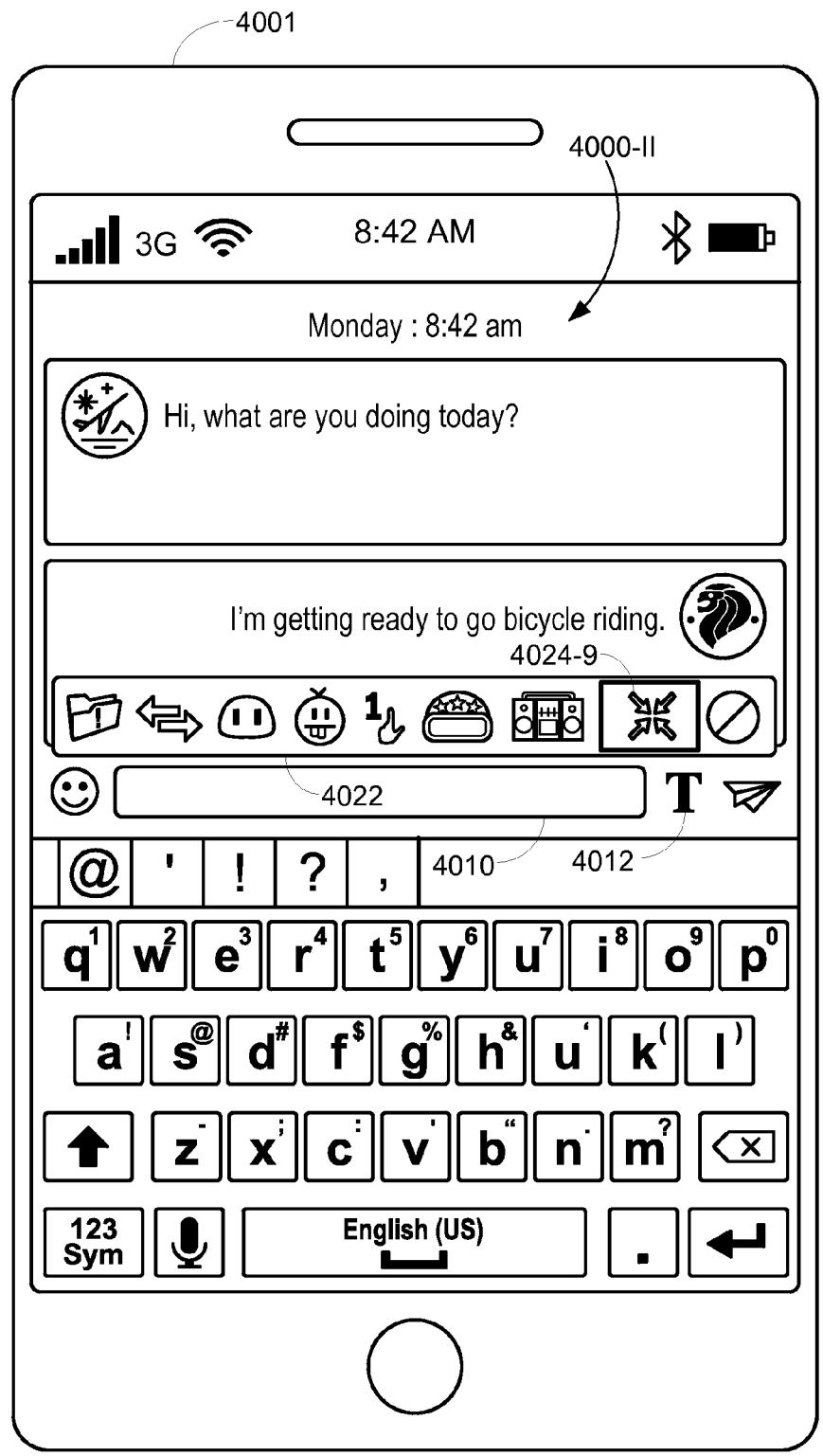
Figure 4J:
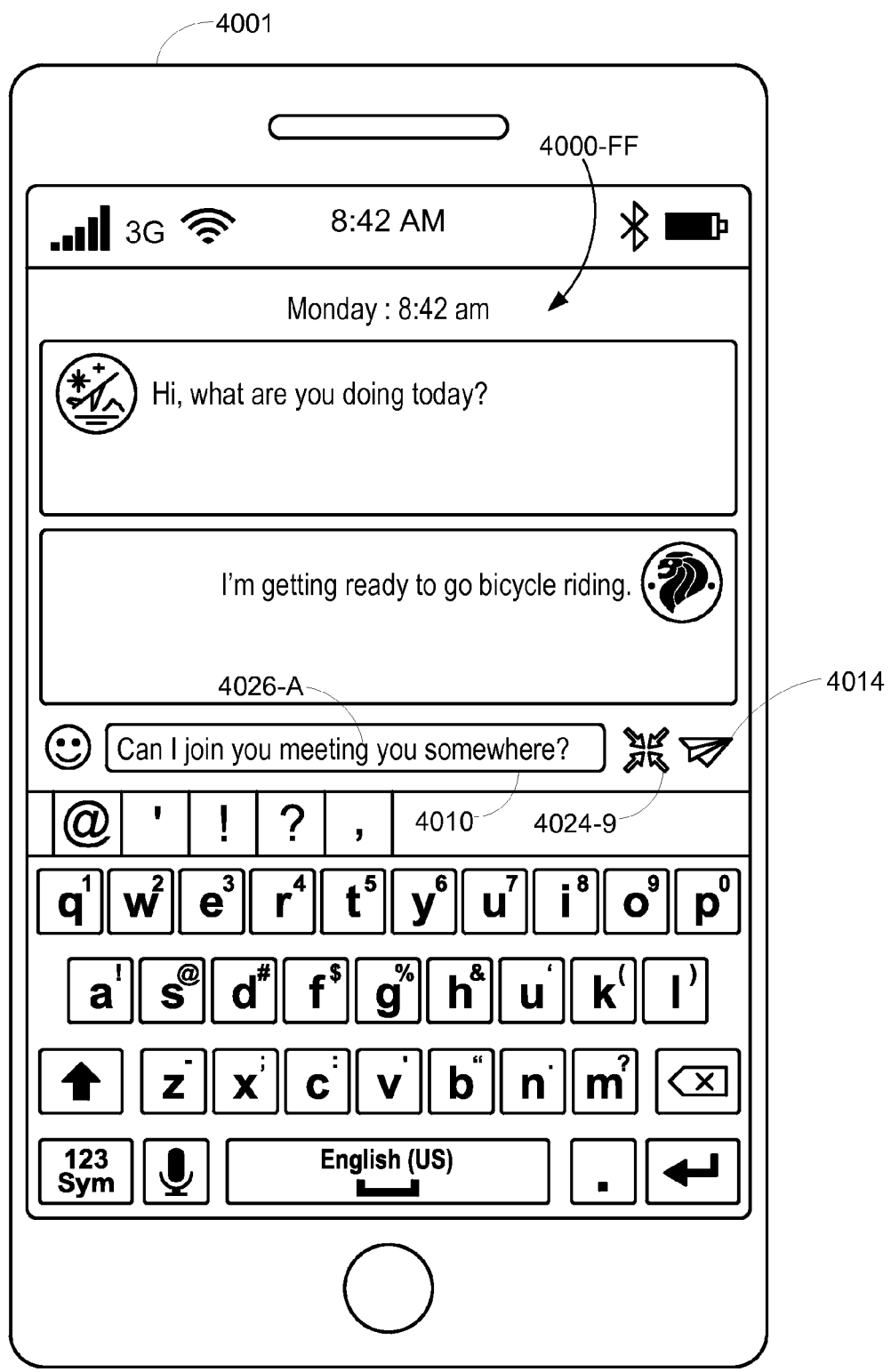
Figure 4K:
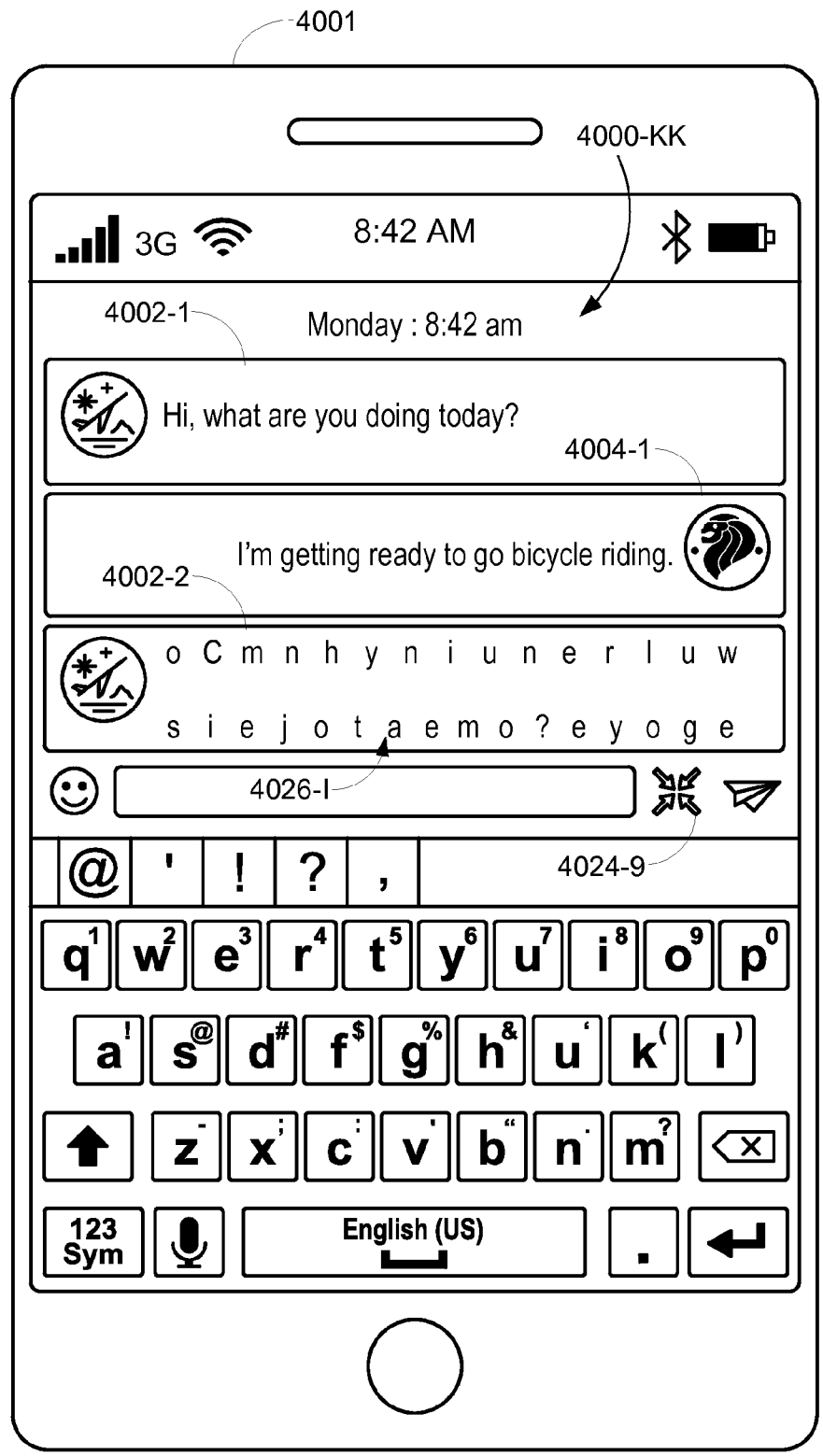
Figure 4L:
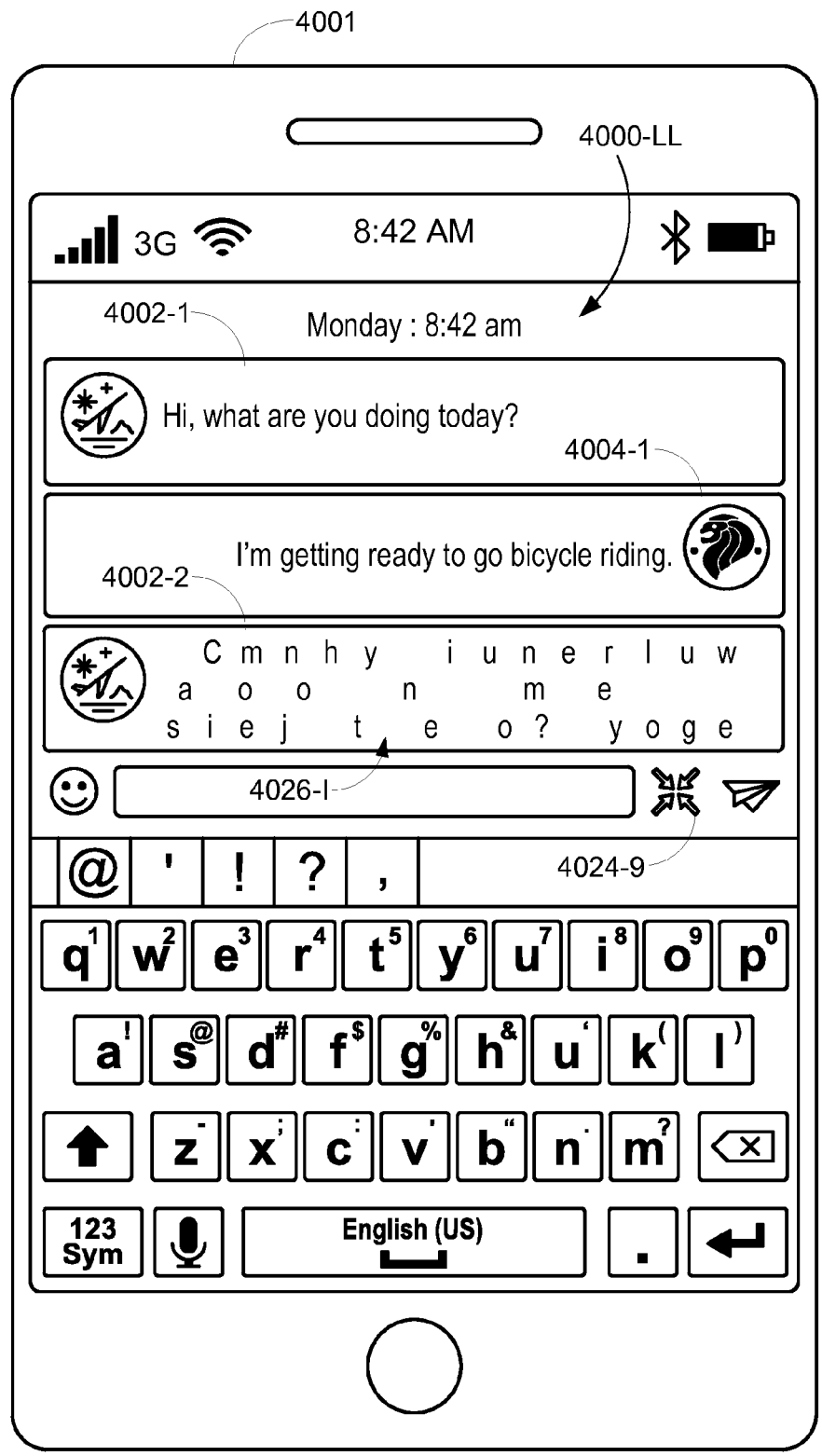
Figure 4M:
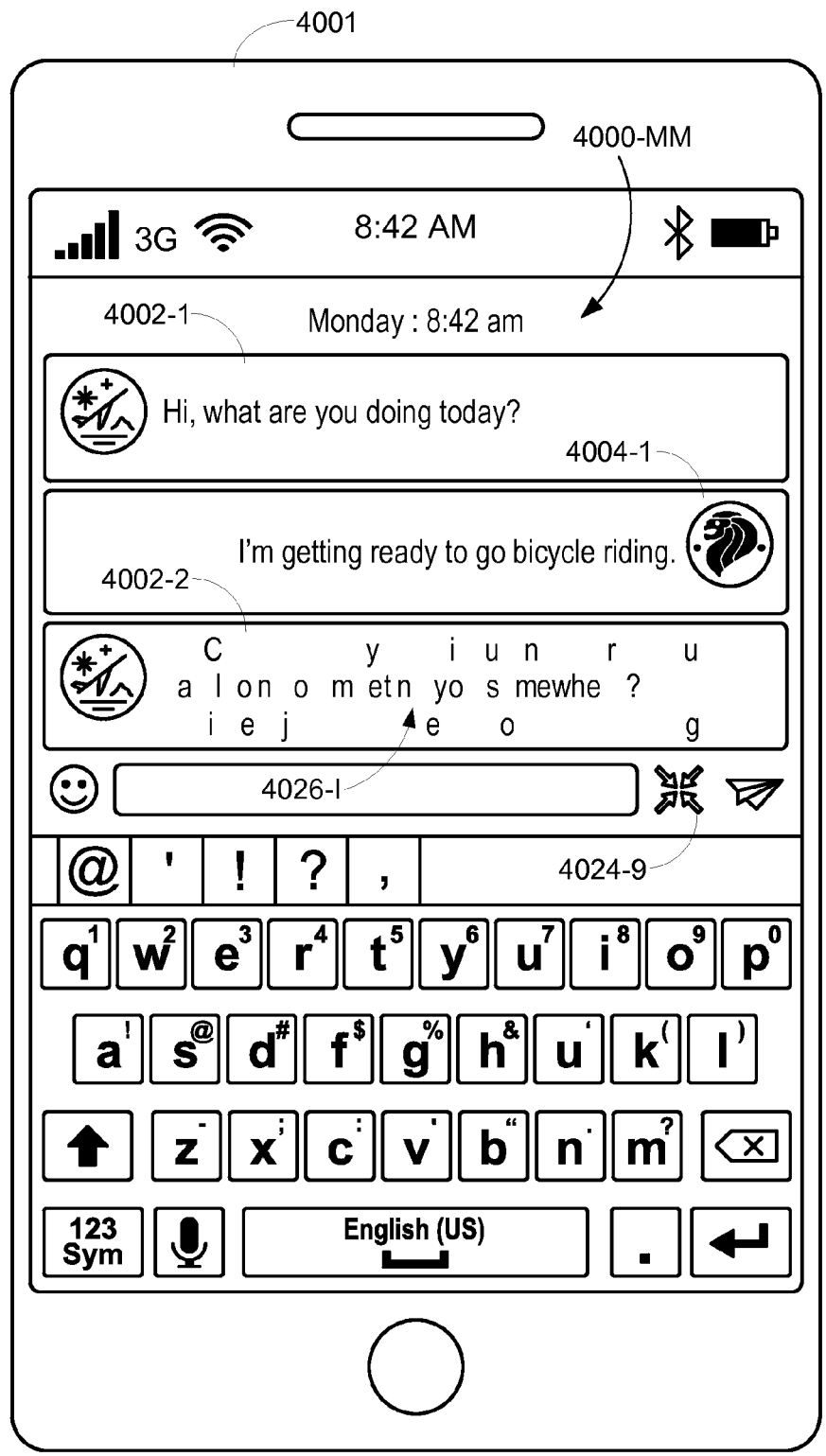
Figure 4N:
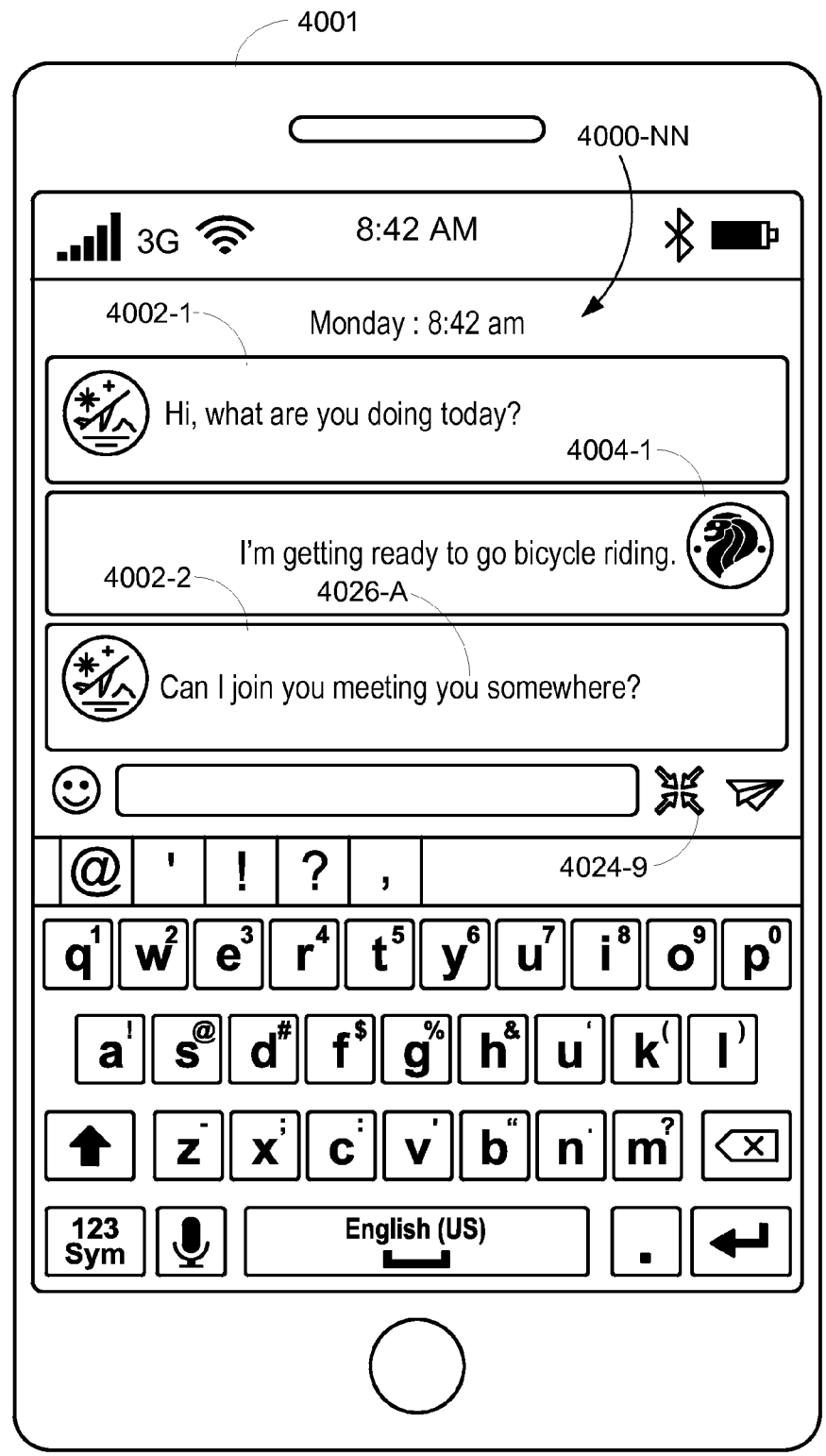
Figure 4O:
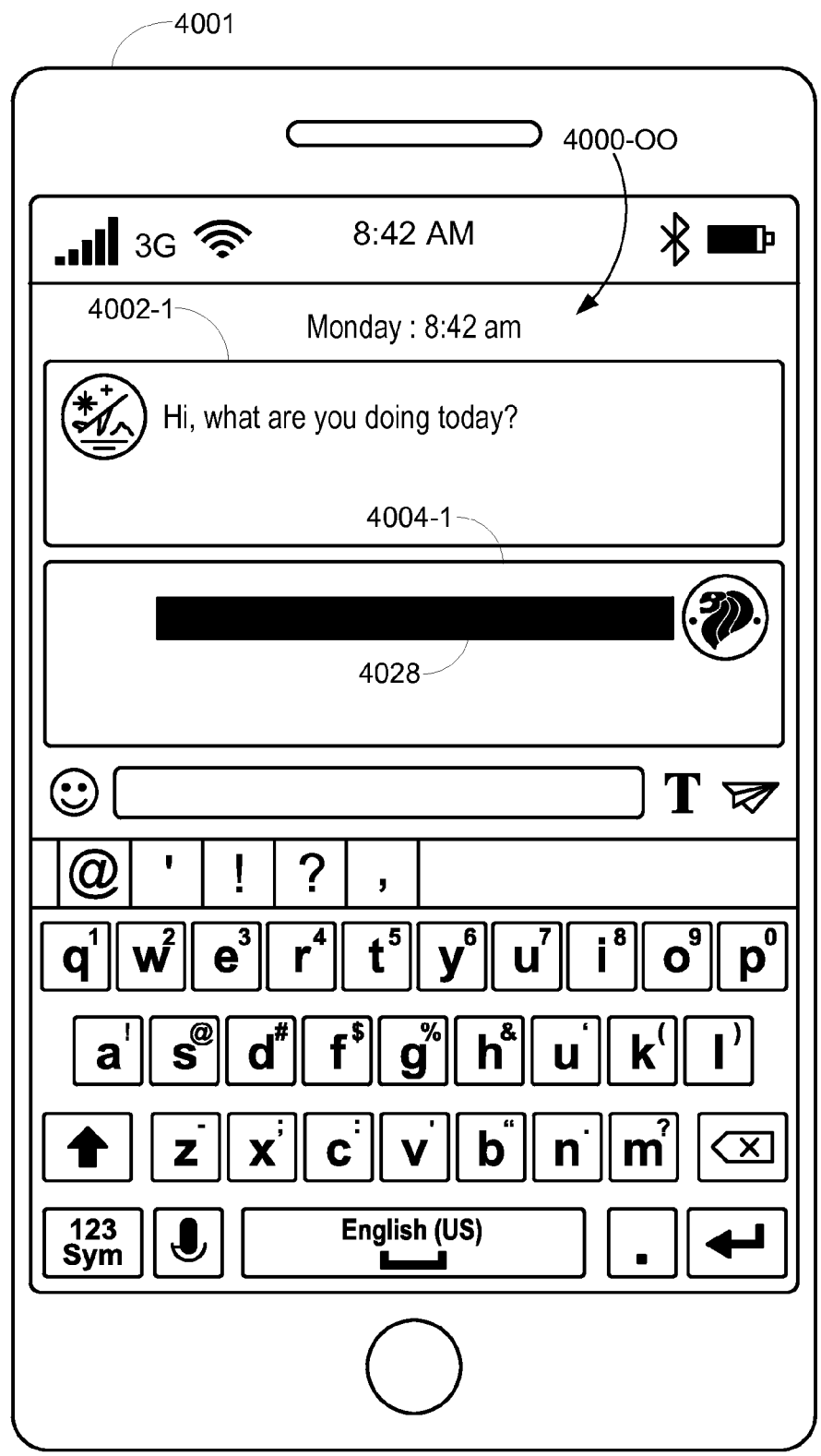
Figure 4P:
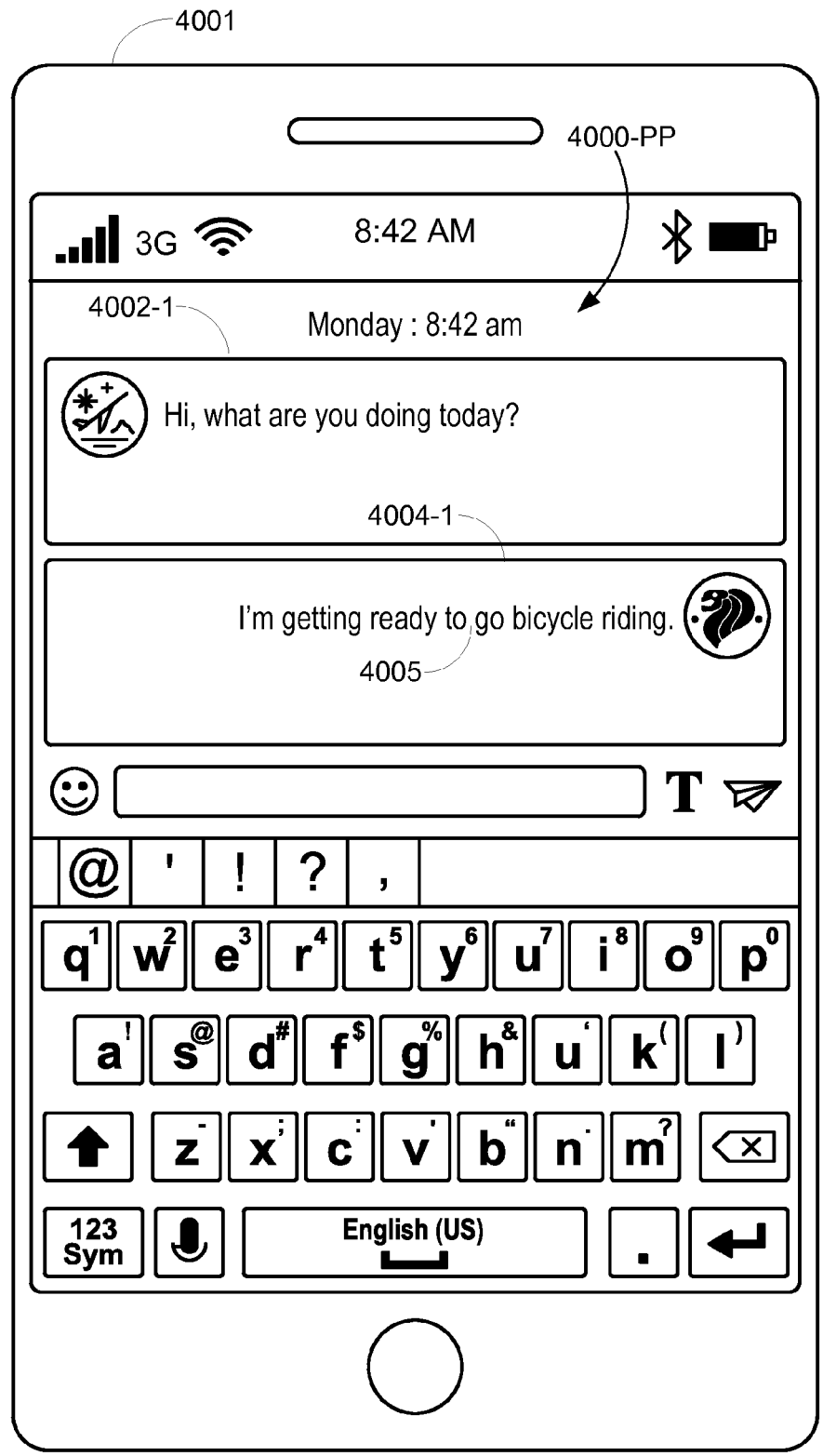

In some implementations, after a certain number of user inputs with respect to the message 4002-2 (e.g., tap gestures on the message 4002-2) or after the words in the original text 4026-A have each been individually displayed, the entire original text 4026-A is displayed in the message 4002-2, as shown in FIG. 4Z. FIG. 4Z illustrates user interface 4000-Z, which includes original text 4026-A displayed in the message 4002-2 after User A has made a certain number of inputs with respect to the message 4002-2 or after the words in the original text 4026-A have each been individually displayed. In some implementations, the number of inputs (from the first word in original text 4026-A) to activate display of the entire original text 4026-A is the number of words in the original text 4026-A. In some implementations, the display of the original text 4026-A is temporary. For example, the original text 4026-A is displayed for five seconds after User A's input with respect to the message 4002-2, after which one word at a time from the original text 4026-A is again displayed in message 4002-2.

Returning to, and continuing from FIG. 4A, FIG. 4AA illustrates messaging user interface 4000-AA, which includes the pop-up 4022 of text effects icons 4024 displayed after User A activated the text effects icon 4012. User A selects the "marquee" icon 4024-7 (e.g., by tapping on the icon). In response to User A selecting the "marquee" icon 4024-7, the text effects icon 4012 is replaced on-screen with the "marquee" icon 4024-7 to indicate that the "marquee" effect is active for the input field 4010.

FIG. 4BB illustrates user interface 4000-BB, which shows "marquee" icon 4024-7 in place of text effects icon 4010, indicating that the "marquee" effect is active. FIG. 4BB also shows text 4026-A input by User A into input field 4010. With the "marquee" effect active and original text 4026-A "Can I join you meeting you somewhere?" input in the input field 4010, User A activates the send icon 4014 to send the text 4026-A as a message 4002-2, with the "marquee" effect applied, as a message to the server system 106, which sends the message to User B's device.

FIG. 4CC illustrates user interface 4000-CC, after the message 4002-2 is sent. At User A's device 4001, the sent message 4002-2 is displayed in another balloon. The text 4026 is displayed in the message 4002-2 in accordance with the "marquee" effect, and thus the original text 4026-A is displayed with, for example, scrolling (e.g., as in text scrolling on a scoreboard or a stock ticker); the original text 4026-A is displayed with a scrolling animation.

While text 4026-A is displayed with scrolling in the message 4002-2, User A may make an input with respect to the message 4002-2 (e.g., make a tap gesture on the message 4002-2). In response to the tap on the message 4002-2, the original text 4026-A is displayed in the message 4002-2 without scrolling, as shown in FIG. 4DD. FIG. 4DD illustrates user interface 4000-DD, which includes original text 4026-A displayed in the message 4002-2, with the scrolling stopped, after User A has made the input with respect to the message 4002-2. In some implementations, the display of the original text 4026-A without the scrolling is temporary. For example, the scrolling stops for five seconds after User A's input with respect to the message 4002-2, after which the scrolling is resumed.

Returning to, and continuing from FIG. 4A, FIG. 4EE illustrates messaging user interface 4000-EE, which includes the pop-up 4022 of text effects icons 4024 displayed after User A activated the text effects icon 4012. User A selects the "rapper style" icon 4024-8 (e.g., by tapping on the icon). In response to User A selecting the "rapper style" icon 4024-8, the text effects icon 4012 is replaced on-screen with the "rapper style" icon 4024-8 to indicate that the "rapper style" effect is active for the input field 4010.

FIG. 4FF illustrates user interface 4000-FF, which shows "rapper style" icon 4024-8 in place of text effects icon 4010, indicating that the "rapper style" effect is active. FIG. 4FF also shows text 4026-A input by User A into input field 4010. With the "rapper style" effect active and original text 4026-A "Can I join you meeting you somewhere?" input in the input field 4010, User A activates the send icon 4014 to send the text 4026-A as a message 4002-2, with the "rapper style" effect applied, as a message to the server system 106, which sends the message to User B's device.

FIG. 4GG illustrates user interface 4000-GG, after the message 4002-2 is sent. At User A's device 4001, the sent message 4002-2 is displayed in another balloon. The text 4026 is displayed in the message 4002-2 in accordance with the "rapper style" effect, and thus is displayed as text 4026-H, in which for each of one or more words in the original text 4026-A, characters are added, substituted, or removed. Thus, in FIG. 4GG, the text 4026-H is "Can I join you meetin you somewhere?" (the ending "g" in "meeting" is removed). In some implementations, the additions, substitutions, and removals are done in accordance with one or more predefined rules or a predefined grammar. The rules or grammar may be predefined so that the resulting text mimics the verbal style of rappers or hip-hop artists. For example, the grammar may specify that the upper case "S" is substituted with a dollar sign "$," that certain characters or character combinations are substituted for their all-upper-case counterparts, and that for certain characters or character combinations one or more characters are removed or one or more characters are added after the certain character or character combination. As another example, the predefined rules or grammar may specify that each word has an "izzle" added to the end of the word, in order to mimic the verbal style of the artist Snoop Dogg. In some implementations, punctuation characters are left as they are.

While text 4026-H is displayed in the message 4002-2, User A may make an input with respect to the message 4002-2 (e.g., make a tap gesture on the message 4002-2). In response to the tap on the message 4002-2, the original text 4026-A is displayed in the message 4002-2, as shown in FIG. 4HH. FIG. 4HH illustrates user interface 4000-HH, which includes original text 4026-A displayed in the message 4002-2 after User A has made the input with respect to the message 4002-2. In some implementations, the display of the original text 4026-A is temporary. For example, the original text 4026-A is displayed for five seconds after User A's input with respect to the message 4002-2, after which text 4026-H is re-displayed in message 4002-2.

Returning to, and continuing from FIG. 4A, FIG. 4II illustrates messaging user interface 4000-II, which includes the pop-up 4022 of text effects icons 4024 displayed after User A activated the text effects icon 4012. User A selects the "spread out" icon 4024-9 (e.g., by tapping on the icon). In response to User A selecting the "spread out" icon 4024-9, the text effects icon 4012 is replaced on-screen with the "spread out" icon 4024-9 to indicate that the "spread out" effect is active for the input field 4010.

FIG. 4JJ illustrates user interface 4000-JJ, which shows "spread out" icon 4024-9 in place of text effects icon 4010, indicating that the "spread out" effect is active. FIG. 4JJ also shows text 4026-A input by User A into input field 4010. With the "spread out" effect active and original text 4026-A "Can I join you meeting you somewhere?" input in the input field 4010, User A activates the send icon 4014 to send the text 4026-A as a message 4002-2, with the "spread out" effect applied, as a message to the server system 106, which sends the message to User B's device.

FIG. 4KK illustrates user interface 4000-KK, after the message 4002-2 is sent. At User A's device 4001, the sent message 4002-2 is displayed in another balloon. The text 4026 is displayed in the message 4002-2 in accordance with the "spread out" effect, and thus is displayed as text 40264, in which the characters of the original text 4026-A are spread apart. For example, the characters may be spread out, in random order, into two rows within the message 4002-2, as shown in FIG. 4KK.

While text 4026-I is displayed in the message 4002-2, User A may make an input with respect to the message 4002-2 (e.g., make a tap gesture on the message 4002-2). In response to the tap on the message 4002-2, the characters in text 4026-I move (e.g., come together) and re-arrange automatically (e.g., in an animation) into the original text 4026-A in the message 4002-2, as shown in FIGS. 4LL-4NN. FIGS. 4LL-4NN illustrates user interfaces 4000-LL thru 4000-NN, which show instances in an animation of the characters in text 4026-I moving and re-arranging into the original text 4026-A after User A has made the input with respect to the message 4002-2. When the animation is completed, the original text 4026-A is displayed (FIG. 4NN) in the message 4002-2. In some implementations, the display of the original text 4026-A is temporary. For example, the original text 4026-A is displayed for five seconds after User A's input with respect to the message 4002-2, after which text 4026-I is re-displayed in message 4002-2 (i.e., the characters spread apart again into text 40264).

The description above describes messages sent by User A, with text effects, viewed at User A's device (i.e., the message sender interacting with messages sent by the message sender), the above text effects and responses to user inputs are applicable to received messages. For example, FIG. 4OO illustrates messaging user interface 4000-OO on the client device 4001, in which message 4004-1 sent by User B and received by User A has the "top secret" text effect applied. In message 4004-1, censoring graphic 4028 obscures text 4005 of the message 4004-1, similar to the text effect applied to text 4026 as shown in FIG. 4H.

While the censoring graphic 4028 is displayed in the message 4004-1, User A makes an input with respect to the message 4004-1 (e.g., make a tap gesture on the message 4004-1). In response to the tap on the message 4004-1, the original text 4026-A is displayed in the message 4004-1, as shown in FIG. 4PP; the censoring graphic 4028 is removed. FIG. 4PP illustrates user interface 4000-PP, which includes original text 4026-A displayed in the message 4004-1 after User A has made the input with respect to the message 4004-1, similar to the user input response as shown in FIG. 4I. In some implementations, the removal of the censoring graphic 4028 is temporary. For example, the censoring graphic 4028 is removed for five seconds after User A's input with respect to the message 4004-1, after which the censoring graphic 4028 is re-displayed and re-obscures the text 4005. Thus, the descriptions of the implementations with respect to FIGS. 4A-4NN above are applicable to received messages also.

In some implementations, in the message 4002-2, when there is a transition from displaying a non-original message text (e.g., text 4026-B, 4026-C, etc.) to displaying the original message text (e.g., text 4026-A), an animation of the transition, showing characters flying into place to reveal the original text 4026-A, is displayed.

It should be appreciated that the text effects described above and their names are exemplary. Other names for the same text effects may be given, and other text effects, as well as variants of the text effects described above, are possible.

Figure 5A:
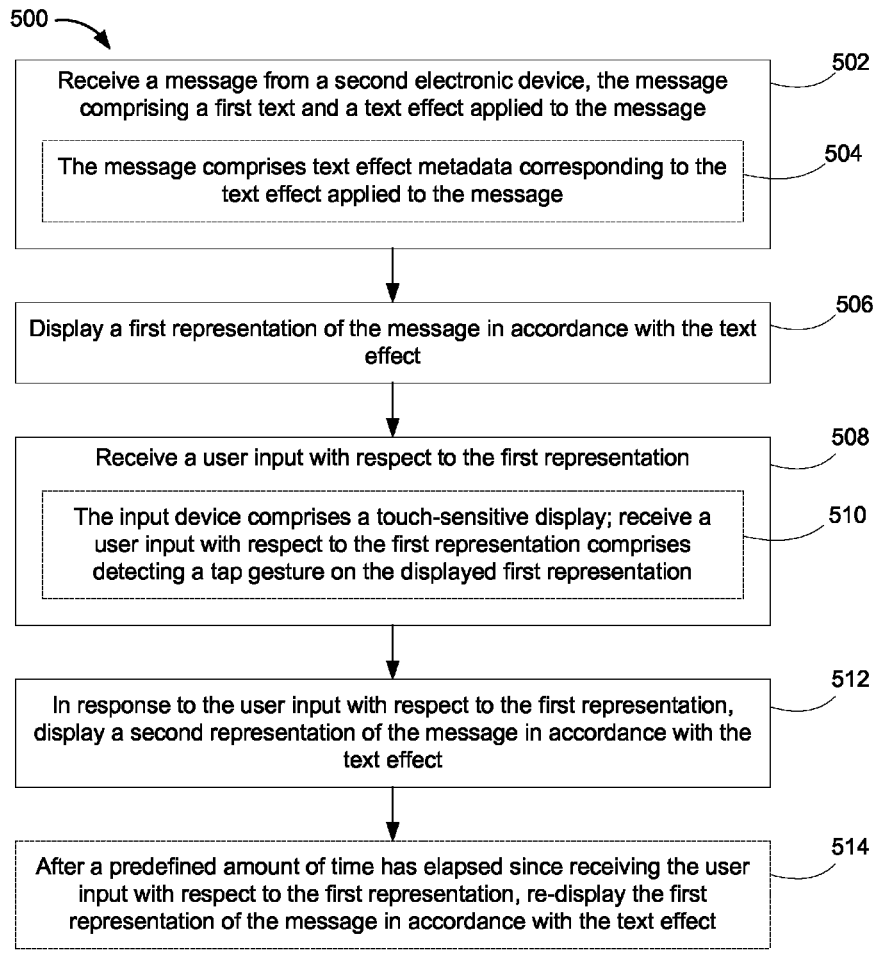
Figure 5B:
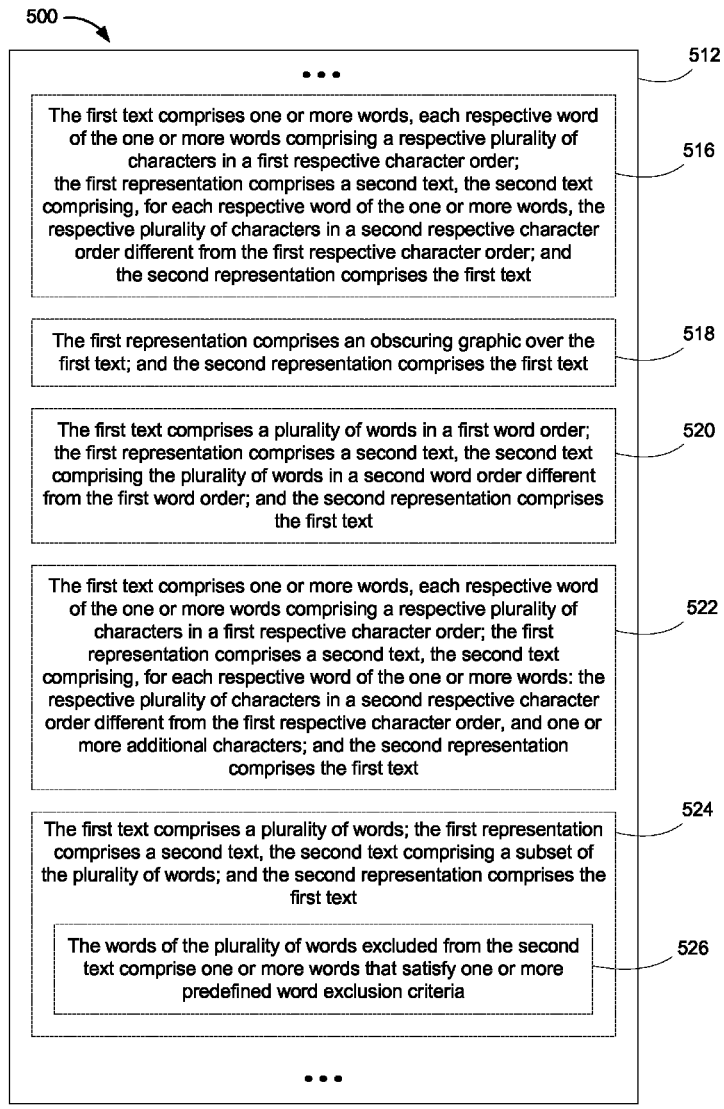
Figure 5C:
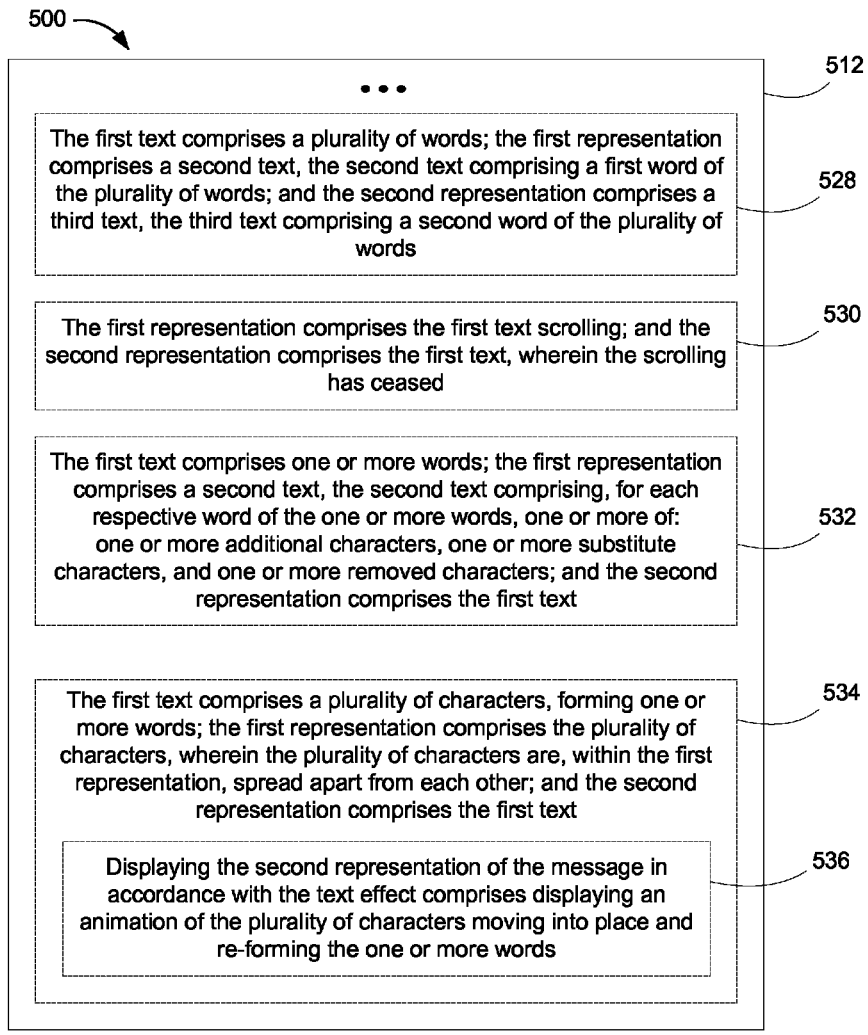

FIGS. 5A-5C are flow diagrams illustrating a method 500 of displaying text with text effects on an electronic device (e.g., client device 102) in accordance with some implementations. FIGS. 5A-5C correspond to instructions stored in a computer memory or a computer readable storage medium (e.g., memory 206). In some implementations, the method 500 is performed at a first electronic device with a display and an input device (e.g., client device 102).

The device receives (502) a message from a second electronic device. The message includes a first text and a text effect applied to the message. For example, FIG. 4OO shows a message 4004-1 received by the messaging module 110 on the device 4001. The message 4004-1 includes text 4005. The "top secret" text effect is applied to the message 4004-1.

The device displays (506) a first representation of the message in accordance with the text effect. As shown in FIG. 4OO, for example, in accordance with the "top secret" text effect, the messaging module 110 displays the message 4004-1 with text 4005 obscured by a censoring graphic 4028.

The device receives (508) a user input with respect to the first representation. For example, User A makes an input (e.g., performs a gesture, such as a tap gesture) with respect to the message 4004-1 (e.g., the gesture is performed on the message 4004-1). The device 4001 receives and detects the user input (e.g., the gesture performed by User A). In some implementations, the user input with respect to the first representation is a non-editing input (e.g., an input that does not input or edit a message or message text). For example, the user input does not input text into input field 4010, or edit text in input field 4010 or in a message 4002 or 4004. In some implementations, the messaging module 110 is configured to not allow editing of text in messages that have been sent. Thus, user inputs with respect to the first representation of a message (that has been sent) do not edit the message or the message text.

In response to the user input with respect to the first representation, the device (512) displays a second representation of the message in accordance with the text effect. As shown in FIG. 4PP, for example, in accordance with the "top secret" text effect, or more particularly, how the messaging module 110 responds to user input while the "top secret" text effect is applied to the message, the messaging module 110 displays the message 4004-1 with text 4005 and without the censoring graphic 4028.

In some implementations, the message includes text effect metadata corresponding to the text effect applied to the message (504). The message 4004-1 includes the text 4005 and text effect metadata (e.g., metadata 242). The messaging module 110 displays the message 4004-1 in accordance with the "top secret" text effect based on the metadata indicating the "top secret" effect has been applied to the message 4004-1.

In some implementations, the input device includes a touch-sensitive display, and receiving a user input with respect to the first representation includes detecting a tap gesture on the displayed first representation (510). For example, the device 4001 includes a touch screen. User A makes the user input with respect to the message 4004-1 by tapping on the touch screen at the location of the message 4004-1. The device 4001 detects the tap by User A as a tap gesture on the message 4004-1.

In some implementations, after a predefined amount of time has elapsed since receiving the user input with respect to the first representation, the device re-displays (514) the first representation of the message in accordance with the text effect. For example, after a predefined amount of time has elapsed from User A's tap gesture on the message 4004-1, the message 4004-1 is again displayed with the censoring graphic 4028.

In some implementations, the first text includes one or more words, each respective word of the one or more words including a respective plurality of characters in a first respective character order; the first representation includes a second text, the second text including, for each respective word of the one or more words, the respective plurality of characters in a second respective character order different from the first respective character order; and the second representation includes the first text (516). For example, the original message text (e.g., text 4026-A or text 4005) of a message includes one or more multi-character words. For each multi-character word, the characters are in an ordering. When the message is displayed in accordance with the "character jumble" effect, the characters in the words in the message text are rearranged into different orders on a word-by-word basis, as shown in FIGS. 4C-4E for example. In response to the user input with respect to the message, the original message text is displayed; the original character orderings are restored.

In some implementations, the first representation includes an obscuring graphic over the first text, and the second representation includes the first text (518). For example, when a message is displayed in accordance with the "top secret" effect, the message text is obscured by a censoring graphic 4028, as shown in FIGS. 4G-4I and 400-4PP for example. In response to the user input with respect to the message, the original message text is displayed and is not obscured by the censoring graphic 4028; the censoring graphic 4028 is removed.

In some implementations, the first text includes a plurality of words in a first word order; the first representation includes a second text, the second text including the plurality of words in a second word order different from the first word order; and the second representation includes the first text (520). For example, the original message text of a message (e.g., text 4026-A or text 4005) includes multiple words in one order (e.g., an order as composed by the user who composed the message). When the message is displayed in accordance with the "reverse" effect, the words in the message text are presented in reverse order order, as shown in FIGS. 4K-4M for example, or more generally, re-ordered randomly or in accordance with one or more predefined rules. In response to the user input with respect to the message, the original message text is displayed; the original word order is restored.

In some implementations, the first text includes one or more words, each respective word of the one or more words including a respective plurality of characters in a first respective character order; the first representation includes a second text, the second text including, for each respective word of the one or more words: the respective plurality of characters in a second respective character order different from the first respective character order, and one or more additional characters; and the second representation includes the first text (522). For example, the original message text (e.g., text 4026-A or text 4005) of a message may include one or more multi-character words. For each multi-character word, the characters are in an ordering. When the message is displayed in accordance with the "pig latin" effect, the original message text is converted into Pig Latin. In some implementations, the Pig Latin conversion includes, for a word with a leading non-silent consonant, moving the leading consonant to the end of the word (i.e., the characters in the word is a different order than in the original message text) and adding an "ay" suffix to the re-ordered word, as shown in FIGS. 4O-4Q for example. In response to the user input with respect to the message, the original message text is displayed; the Pig Latin conversion is undone.

In some implementations, the first text includes a plurality of words; the first representation includes a second text, the second text including a subset of the plurality of words; and the second representation includes the first text (524). In some implementations, the words of the plurality of words excluded from the second text include one or more words that satisfy one or more predefined word exclusion criteria (526). For example, the original message text (e.g., text 4026-A or text 4005) of a message includes multiple words. When the message is displayed in accordance with the "toddler talk" effect, some of the words in the original message text are removed. Words that meet one or more word exclusion criteria are removed. For example, words that belong in predefined categories (e.g., a word is a connector word, an article, a pronoun, or a preposition) are removed, as shown in FIGS. 4S-4U for example. In response to the user input with respect to the message, the original message text is displayed; the removed words are restored.

In some implementations, the first text includes a plurality of words; the first representation includes a second text, the second text including a first word of the plurality of words; and the second representation includes a third text, the third text including a second word of the plurality of words (528). For example, the original message text (e.g., text 4026-A or text 4005) of a message includes multiple words. When the message is displayed in accordance with the "one at a time" effect, words of the original message text are displayed or presented one at a time (e.g., one per tap on the message, words displayed one at a time automatically with a predefined amount of time between words). In response to the user input with respect to the message or elapse of a predefined amount of time, the next word appears, as shown in FIGS. 4W-4Z for example. For example, one word is displayed, and then that word is replaced by the next word with a tap or elapse of the predefined amount of time, and so on one word at a time, and then when each words has been individually displayed, the entire message text is displayed. As another example, one word of the message text is displayed. Then the next word is added with a tap on the message or elapse of the predefined amount of time, so that two words are displayed. Then the next word is added with the next tap or another elapse of the predefined amount of time, and so on until the entire message text is displayed.

In some implementations, the first representation includes the first text scrolling, and the second representation includes the first text, wherein the scrolling has ceased (530). For example, when a message is displayed in accordance with the "marquee" effect, the message text is scrolled (e.g., as in text scrolling on a scoreboard or a stock ticker), as shown in FIGS. 4BB-4DD for example. In response to the user input with respect to the message, the original message text is displayed without the scrolling, i.e., the scrolling stops.

In some implementations, the first text includes one or more words; the first representation includes a second text, the second text including, for each respective word of the one or more words, one or more of: one or more additional characters, one or more substitute characters, and one or more removed characters; and the second representation includes the first text (532). For example, the original message text (e.g., text 4026-A or text 4005) of a message includes multiple words. When the message is displayed in accordance with the "rapper style" effect, each of one or more words of the original message text are converted by adding characters, substituting characters, and/or removing characters, as shown in FIGS. 4FF-4HH for example. In some implementations, the conversion is performed in accordance with one or more predefined rules or a predefined grammar. For example, the rules or grammar may be predefined so that the resulting text mimics the verbal style associated with rappers or hip-hop artists generally or with a specific rapper or hip-hop artist. In response to the user input with respect to the message, the original message text is displayed; the conversion is undone. More generally, the original message text may be converted by character addition, substitution, and/or in accordance with one or more predefined rules or a predefined grammar.

In some implementations, the first text includes a plurality of characters, forming one or more words; the first representation includes the plurality of characters, wherein the plurality of characters are, within the first representation, spread apart from each other; and the second representation includes the first text (534). In some implementations, displaying the second representation of the message in accordance with the text effect includes displaying an animation of the plurality of characters moving into place and re-forming the one or more words (536). For example, the original message text (e.g., text 4026-A or text 4005) of a message includes multiple characters. When the message is displayed in accordance with the "spread out" effect, the characters of the original message text spread apart from each other, as shown in FIGS. 4JJ-4NN for example. In response to the user input with respect to the message, the original message text is displayed; characters move and re-form the original message text. The movement of the characters to re-form the original message text may be displayed as an animation.

Figure 6:
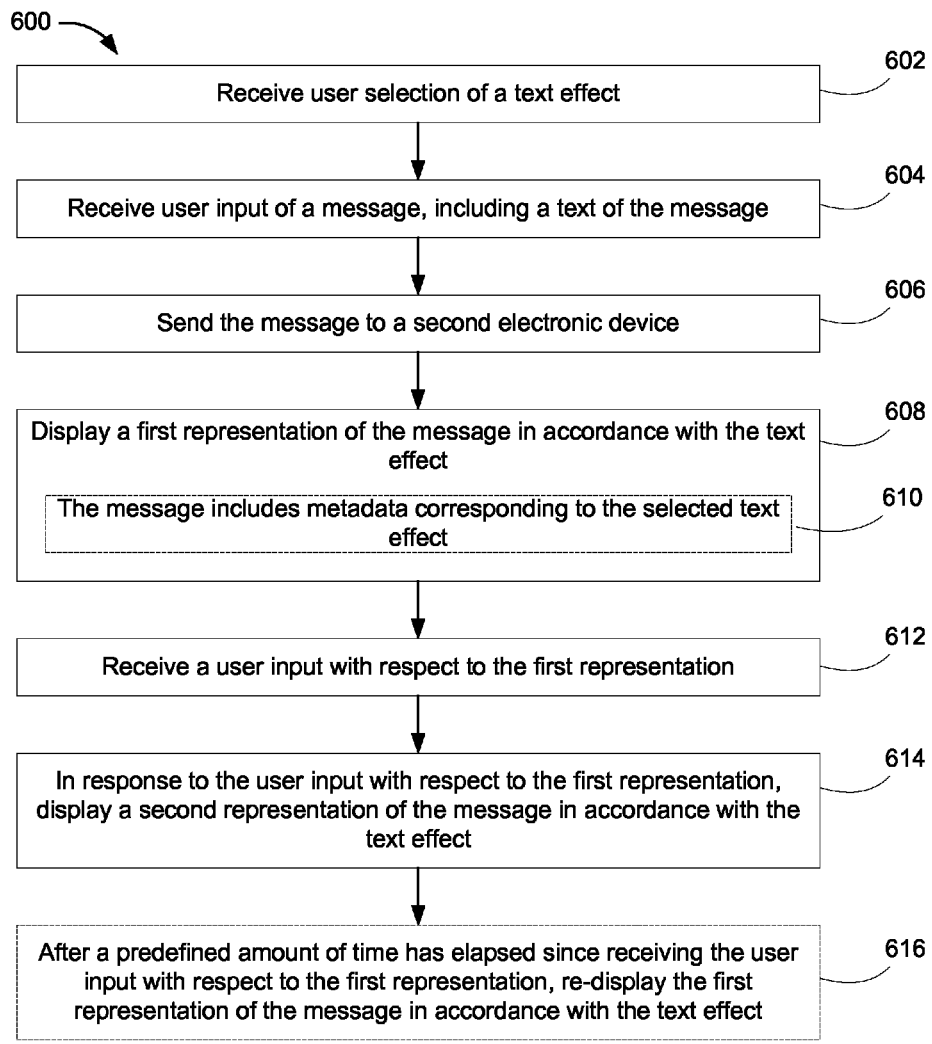
FIG. 6 illustrates a method of displaying text with text effects in accordance with some implementations.

FIG. 6 is a flow diagram illustrating a method of displaying text with text effects on an electronic device (e.g., client device 102) in accordance with some implementations. FIG. 6 corresponds to instructions stored in a computer memory or a computer readable storage medium (e.g., memory 206). In some implementations, the method 500 is performed at a first electronic device with a display and an input device (e.g., client device 102).

The device receives (602) user selection of a text effect. As shown in FIG. 4B-4C, for example, User A selects the "character jumble" icon 4024-1 from the pop-up 4022. The device 4001 receives the selection.

The device receives (604) user input of a message, including a text of the message. User A inputs the message text 4026 for a message 4002-2 into input field 4010.

It should be appreciated that the user may select the text effect before or after inputting the text into the input field 4010. As long as the message has not been sent yet, the user may select a text effect, change the text effect, or cancel the text effect for text input in the input field 4010.

The device sends (606) the message to a second electronic device. When the User A activates the send icon 4014, the message 4002-2 is sent from the device 4001 to the server system 106, which sends the message to the destination device.

The device displays (608) a first representation of the message in accordance with the text effect. At the device of the message sender, the sent message is displayed in accordance with the selected text effect. For example, if the selected text effect is "character jumble," the sent message 4002-2 is displayed with the characters in the words in message text 4026 rearranged, as shown in FIGS. 4C-4D for example.

The device receives (612) a user input with respect to the first representation. For example, User A makes an input (e.g., performs a gesture, such as a tap gesture) with respect to the message 4002-2 (e.g., the gesture is performed on the message 4002-2). The device 4001 receives and detects the user input (e.g., the gesture performed by User A). In some implementations, the user input with respect to the first representation is a non-editing input (e.g., an input that does not input or edit a message or message text). For example, the user input does not input text into input field 4010, or edit text in input field 4010 or in a message 4002 or 4004. In some implementations, the messaging module 110 is configured to not allow editing of text in messages that have been sent. Thus, user inputs with respect to the first representation of a message (that has been sent) do not edit the message or the message text.

In response to the user input with respect to the first representation, the device displays (614) a second representation of the message in accordance with the text effect. In response to the user input, the message text 4026 is displayed differently. For example, the original message text 4026-A is displayed, as shown in FIG. 4E for example.

In some implementations, the message includes metadata corresponding to the selected text effect (610). The message 4002-2 is sent with text effect metadata (e.g., text effect metadata 242) generated by the text effects module 230 when the message 4002-2 is sent with a text effect selected by User A. The text effect metadata indicates what text effect is applied to the message 4002-2.

In some implementations, after a predefined amount of time has elapsed since receiving the user input with respect to the first representation, the device re-displays (616) the first representation of the message in accordance with the text effect. For example, from FIG. 4E, after a predefined amount of time has elapsed from User A's tap gesture on the message 4002-2, the message 4002-2 is again displayed with the characters in the words in text 4026 reordered as in FIG. 4D.

It should be appreciated that the user interfaces illustrated in the drawings and described above are exemplary. Many variations on the user interfaces illustrated in the drawings and described above are possible. For example, positions of icons and buttons within an interface may differ from what is shown in the drawings. Icons and buttons that are shown may be omitted, and icons and buttons that are not shown may be included. Backgrounds may differ from what is shown in the drawings. The arrangement of areas and objects within an interface may differ from what is shown in the drawings.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a first electronic device with a touch-sensitive display:

receiving a message from a second electronic device, the message comprising an original multi-word first text and text effect metadata identifying a text effect associated with the message;

displaying a first representation of the original multi-word first text in accordance with the text effect in a messaging application, wherein the messaging application includes a plurality of content items including the first representation;

receiving a user input on the displayed first representation in the form of a tap gesture on the touch-sensitive display; and in response to the user input with respect to the first representation:

transiently replacing only the displayed first representation with a display of the original multi-word first text for a predetermined time period, wherein all other content items in the plurality of content items are not replaced, and without further user intervention, upon completion of the predetermined time period, restoring display of the first representation.

2. The method of claim 1, wherein:

each respective word of the original multi-word first text comprises a respective plurality of characters in a first respective character order;

the first representation comprises a second text, the second text comprising, for each respective word of the original multi-word first text, the respective plurality of characters in a second respective character order different from the first respective character order.

3. The method of claim 1, wherein:

the first representation comprises an obscuring graphic over the original multi-word first text.

4. The method of claim 1, wherein:

the original multi-word first text comprises a plurality of words in a first word order;

the first representation comprises a second text, the second text comprising the plurality of words in a second word order different from the first word order.

5. The method of claim 1, wherein:

each respective word of the original multi-word first text comprises a respective plurality of characters in a first respective character order;

the first representation comprises a second text, the second text comprising, for each respective word of the original multi-word first text:

the respective plurality of characters in a second respective character order different from the first respective character order; and one or more additional characters.

6. The method of claim 1, wherein:

the first representation comprises a second text, the second text comprising a subset of the words of the original multi-word first text.

7. The method of claim 6, wherein the words excluded from the second text comprise one or more words that satisfy one or more predefined word exclusion criteria.

8. The method of claim 1, wherein:

the first representation comprises a second text, the second text comprising a first word of the original multi-word first text; and the second representation comprises a third text, the third text comprising a second word of the original multi-word first text.

9. The method of claim 1, wherein:

the first representation comprises a first text scrolling; and the original multi-word first text is displayed statically during the predetermined time period.

10. The method of claim 1, wherein:

the first representation comprises a second text, the second text comprising, for each respective word of the original multi-word first text, one or more of:

one or more additional characters, one or more substitute characters, and one or more removed characters.

11. The method of claim 1, wherein:

the first representation comprises a plurality of characters found in the original multi-word first text, wherein the plurality of characters are, within the first representation, in the same order found in the original multi-word first text and spread apart from each other relative to the original multi-word first text.

12. The method of claim 1, wherein the first representation comprises a plurality of characters found in the original multi-word first text in a scrambled order relative to their order in the original multi-word first text, and the transiently replacing comprises displaying an animation of the plurality of characters moving into place and re-forming the words of the original multi-word first text.

13. An electronic device, comprising:

a touch-sensitive display;

one or more processors;

a memory; and one or more programs, wherein the one or more programs are stored in the memory and are configured to be executed by the one or more processors, the one or more programs including instructions for:

receiving a message from a second electronic device, the message comprising an original multi-word first text and text effect metadata identifying a text effect associated with the message;

displaying a first representation of the original multi-word first text in accordance with the text effect in a messaging application, wherein the messaging application includes a plurality of content items including the first representation;

receiving a user input on the displayed first representation; and in response to the user input with respect to the first representation in the form of a tap gesture on the touch-sensitive display:

transiently replacing the displayed first representation with a display of the original multi-word first text for a predetermined time period, wherein all other content items in the plurality of content items are not replaced, and without further user intervention, upon completion of the predetermined time period, restoring display of the first representation.

14. A non-transitory computer-readable storage medium storing one or more programs, the one or more programs comprising instructions which, when executed by an electronic device with a touch-sensitive display, cause the device to:

receive a message from a second electronic device, the message comprising an original multi-word first text and text effect metadata identifying a text effect associated with the message;

display a first representation of the original multi-word first text in accordance with the text effect in a messaging application, wherein the messaging application includes a plurality of content items including the first representation;

receive a user input on the displayed first representation in the form of a tap gesture on the touch-sensitive display; and in response to the user input with respect to the first representation:

transiently replace the displayed first representation with a display of the original multi-word first text for a predetermined time period, wherein all other content items in the plurality of content items are not replaced, and without further user intervention, upon completion of the predetermined time period, restore display of the first representation.

15. A method, comprising:

at a first electronic device with a display and an input device:

receiving user selection of a text effect;

receiving user input of a text of an original multi-word first text;

associating the text effect with the original multi-word first text thereby forming a message, the message comprising text effect metadata identifying the text effect;

sending formatting instructions to display the original multi-word first text in accordance with the text effect to a second electronic device in a messaging application, wherein the messaging application includes a plurality of content items including the first representation;

receiving a user input with respect to the first representation in the form of a tap gesture on a touch-sensitive display associated with the second electronic device; and in response to the user input with respect to the first representation, providing instructions to the second electronic device to:

transiently replace the displayed first representation with a display of the original multi-word first text for a predetermined time period, wherein all other content items in the plurality of content items are not replaced, and without further user intervention, upon completion of the predetermined time period, restore display of the first representation.

16. The method of claim 15, wherein:

each respective word of the original multi-word first text comprises a corresponding plurality of characters in a first respective character order; and the first representation comprises a second text, the second text comprising, for each respective word of the original multi-word first text, the corresponding plurality of characters in a second respective character order different from the first respective character order.

17. The method of claim 15, wherein the first representation comprises an obscuring graphic over the original multi-word first text.

* * * * *